US012726521B2

(12) United States Patent
Crabtree et al.

(10) Patent No.: US 12,726,521 B2
(45) Date of Patent: Sep. 1, 2026

(54) SYSTEM AND METHOD FOR MANIPULATION OF SECURE DATA

(71) Applicant: QOMPLX LLC, Reston, VA (US)

(72) Inventors: Jason Crabtree, Vienna, VA (US); Andrew Sellers, Monument, CO (US)

(73) Assignee: QOMPLX LLC, Reston, VA (US)

( * ) Notice: Subject to any disclaimer, the term of this patent is extended or adjusted under 35 U.S.C. 154(b) by 201 days.

(21) Appl. No.: 18/444,770

(22) Filed: Feb. 19, 2024

(65) Prior Publication Data

US 2024/0195841 A1 Jun. 13, 2024

Related U.S. Application Data

(63) Continuation of application No. 17/001,459, filed on Aug. 24, 2020, now abandoned, which is a continuation-in-part of application No. 16/983,233, filed on Aug. 3, 2020, now abandoned, which is a continuation-in-part of application No. 15/931,534, filed on May 13, 2020, now abandoned, which is a continuation-in-part of application No. 16/777,270, filed on Jan. 30, 2020, now Pat. No. 11,025,674, which is a continuation-in-part of application No.
(Continued)

(51) Int. Cl.
*H04L 9/40* (2022.01)
*G06F 16/2458* (2019.01)
*G06F 16/951* (2019.01)

(52) U.S. Cl.
CPC .......... *H04L 63/20* (2013.01); *G06F 16/2477* (2019.01); *G06F 16/951* (2019.01); *H04L 63/1425* (2013.01); *H04L 63/1441* (2013.01)

(58) Field of Classification Search
CPC . H04L 63/20; H04L 63/1425; H04L 63/1441; G06F 16/2477; G06F 16/951; G06N 3/045
See application file for complete search history.

(56) References Cited

U.S. PATENT DOCUMENTS 5,669,000 A 9/1997 Jessen et al.
6,256,544 B1 7/2001 Weissinger
(Continued)

FOREIGN PATENT DOCUMENTS

EP 0163534 B1 9/1992
WO 2001063534 A2 8/2001
(Continued)

*Primary Examiner* — Mohammed Waliullah
(74) *Attorney, Agent, or Firm* — NK Patent Law

(57) ABSTRACT

A system and method for movement and manipulation of secure data. The system and method combine the ability to restrict and control the transport and processing of data based on specified directives and provide rich auditable provenance to support evidentiary requirements. The system may additionally automatically optimize data routes and specify processing hardware based on data residency, sovereignty, or localization restrictions, constraints, or economic considerations, furthermore, protect sensitive data from compromise by generating and integrating digital tokens and employing observability sensors, processing flows, and analytics on devices in the data transport, storage and compute chain to provide a secure method of data transport and utilization within applications.

19 Claims, 37 Drawing Sheets

Related U.S. Application Data

16/720,383, filed on Dec. 19, 2019, now Pat. No. 10,944,795, which is a continuation of application No. 15/823,363, filed on Nov. 27, 2017, now Pat. No. 10,560,483, which is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, which is a continuation-in-part of application No. 14/925,974, filed on Oct. 28, 2015, now abandoned, said application No. 15/655,113 is a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, said application No. 15/931,534 is a continuation-in-part of application No. 15/683,765, filed on Aug. 22, 2017, now abandoned, which is a continuation-in-part of application No. 15/409,510, filed on Jan. 18, 2017, now abandoned, which is a continuation-in-part of application No. 15/379,899, filed on Dec. 15, 2016, now abandoned, which is a continuation-in-part of application No. 15/376,657, filed on Dec. 13, 2016, now Pat. No. 10,402,906, which is a continuation-in-part of application No. 15/237,625, filed on Aug. 15, 2016, now Pat. No. 10,248,910, said application No. 15/931,534 is a continuation-in-part of application No. 16/718,906, filed on Dec. 18, 2019, now Pat. No. 11,055,140, which is a continuation of application No. 15/879,182, filed on Jan. 24, 2018, now Pat. No. 10,514,954, which is a continuation-in-part of application No. 15/850,037, filed on Dec. 21, 2017, now abandoned, which is a continuation-in-part of application No. 15/673,368, filed on Aug. 9, 2017, now abandoned, which is a continuation-in-part of application No. 15/376,657, filed on Dec. 13, 2016, now Pat. No. 10,402,906, said application No. 15/850,037 is a continuation-in-part of application No. 15/489,716, filed on Apr. 17, 2017, now abandoned, which is a continuation-in-part of application No. 15/409,510, filed on Jan. 18, 2017, now abandoned, said application No. 15/931,534 is a continuation-in-part of application No. 15/905,041, filed on Feb. 26, 2018, now Pat. No. 10,706,063, which is a continuation-in-part of application No. 15/237,625, filed on Aug. 15, 2016, now Pat. No. 10,248,910, said application No. 15/931,534 is a continuation-in-part of application No. 16/191,054, filed on Nov. 14, 2018, now Pat. No. 10,681,074, which is a continuation-in-part of application No. 15/655,113, filed on Jul. 20, 2017, now Pat. No. 10,735,456, said application No. 15/931,534 is a continuation-in-part of application No. 16/654,309, filed on Oct. 16, 2019, now abandoned, which is a continuation-in-part of application No. 15/847,443, filed on Dec. 19, 2017, now abandoned, which is a continuation-in-part of application No. 15/790,457, filed on Oct. 23, 2017, now Pat. No. 10,884,999, and a continuation-in-part of application No. 15/790,327, filed on Oct. 23, 2017, now Pat. No. 10,860,951, and a continuation-in-part of application No. 15/616,427, filed on Jun. 7, 2017, now abandoned, and a continuation-in-part of application No. 15/141,752, filed on Apr. 28, 2016, now Pat. No. 10,860,962, said application No. 15/847,443 is a continuation-in-part of application No. 15/489,716, filed on Apr. 17, 2017, now abandoned, and a continuation-in-part of application No. 15/616,427, filed on Jun. 7, 2017, now abandoned, said application No. 15/931,534 is a continuation-in-part of application No. 16/660,727, filed on Oct. 22, 2019, now Pat. No. 10,938,683, which is a continuation of application No. 15/229,476, filed on Aug. 5, 2016, now Pat. No. 10,454,791, which is a continuation-in-part of application No. 15/206,195, filed on Jul. 8, 2016, now abandoned, said application No. 17/001,459 is a continuation-in-part of application No. 16/945,698, filed on Jul. 31, 2020, now abandoned, which is a continuation-in-part of application No. 15/931,534, filed on May 13, 2020, now abandoned, and a continuation-in-part of application No. 16/864,133, filed on Apr. 30, 2020, now Pat. No. 11,494,665, which is a continuation-in-part of application No. 15/847,443, filed on Dec. 19, 2017, now abandoned, said application No. 16/945,698 is a continuation-in-part of application No. 16/915,176, filed on Jun. 29, 2020, now abandoned, which is a continuation-in-part of application No. 15/847,443, filed on Dec. 19, 2017, now abandoned, and a continuation-in-part of application No. 15/891,329, filed on Feb. 7, 2018, now abandoned, which is a continuation-in-part of application No. 15/860,980, filed on Jan. 3, 2018, now abandoned, which is a continuation-in-part of application No. 15/850,037, filed on Dec. 21, 2017, now abandoned, and a continuation-in-part of application No. 15/788,002, filed on Oct. 19, 2017, now abandoned, and a continuation-in-part of application No. 15/787,601, filed on Oct. 18, 2017, now Pat. No. 10,860,660, and a continuation-in-part of application No. 15/616,427, filed on Jun. 7, 2017, now abandoned, said application No. 16/915,176 is a continuation-in-part of application No. 15/905,041, filed on Feb. 26, 2018, now Pat. No. 10,706,063.

(60) Provisional application No. 62/568,298, filed on Oct. 4, 2017, provisional application No. 62/568,291, filed on Oct. 4, 2017, provisional application No. 62/568,305, filed on Oct. 4, 2017, provisional application No. 62/568,312, filed on Oct. 4, 2017.

(56) References Cited

U.S. PATENT DOCUMENTS

| | | | |
|---|---|---|---|
| 6,477,572 | B1 | 11/2002 | Elderton et al. |
| 7,072,863 | B1 | 7/2006 | Phillips et al. |
| 7,171,515 | B2 | 1/2007 | Ohta et al. |
| 7,530,105 | B2 | 5/2009 | Gilbert et al. |
| 7,657,406 | B2 | 2/2010 | Tolone et al. |

(56) References Cited

U.S. PATENT DOCUMENTS 7,698,213 B2 4/2010 Lancaster
7,739,653 B2 6/2010 Venolia
8,065,257 B2 11/2011 Kuecuekyan
8,145,761 B2 3/2012 Liu et al.
8,156,029 B2 4/2012 Szydlo et al.
8,180,854 B2 5/2012 Schneider
8,281,121 B2 10/2012 Nath et al.
8,615,800 B2 12/2013 Baddour et al.
8,677,473 B2 3/2014 Dennerline et al.
8,788,254 B2 7/2014 Peloski
8,788,306 B2 7/2014 Delurgio et al.
8,793,758 B2 7/2014 Raleigh et al.
8,856,936 B2 10/2014 Ray et al.
8,914,878 B2 12/2014 Burns et al.
8,990,392 B1 3/2015 Stamos
8,997,233 B2 3/2015 Green et al.
9,020,802 B1 4/2015 Florissi et al.
9,092,616 B2 7/2015 Kumar et al.
9,122,694 B1 9/2015 Dukes et al.
9,134,966 B2 9/2015 Brock et al.
9,137,131 B1 9/2015 Sarukkai et al.
9,141,360 B1 9/2015 Chen et al.
9,231,962 B1 1/2016 Yen et al.
9,299,029 B1 3/2016 Kim
9,319,430 B2 4/2016 Bell, Jr. et al.
9,350,550 B2 5/2016 Nix
9,357,381 B2 5/2016 Cho et al.
9,384,345 B2 7/2016 Dixon et al.
9,426,118 B2 8/2016 Kim
9,451,462 B2 9/2016 Kim et al.
9,503,470 B2 11/2016 Gertner et al.
9,571,510 B1 2/2017 Shen et al.
9,602,530 B2 3/2017 Ellis et al.
9,654,495 B2 5/2017 Hubbard et al.
9,672,355 B2 6/2017 Titonis et al.
9,686,308 B1 6/2017 Srivastava
9,762,443 B2 9/2017 Dickey
9,887,933 B2 2/2018 Lawrence, III
9,946,517 B2 4/2018 Talby et al.
9,967,334 B2 5/2018 Ford
10,061,635 B2 8/2018 Ellwein
10,200,233 B2 2/2019 Anderson et al.
10,210,246 B2 2/2019 Stojanovic et al.
10,210,255 B2 2/2019 Crabtree et al.
10,216,485 B2 2/2019 Misra et al.
10,242,406 B2 3/2019 Kumar et al.
10,248,910 B2 4/2019 Crabtree et al.
10,262,321 B1 4/2019 Ramanathan et al.
10,318,882 B2 6/2019 Brueckner et al.
10,320,828 B1 6/2019 Derbeko et al.
10,367,829 B2 7/2019 Huang et al.
10,454,791 B2 10/2019 Crabtree et al.
10,511,498 B1 12/2019 Narayan et al.
10,831,838 B2 11/2020 Kraning et al.
11,017,096 B2 5/2021 Tsokos et al.
2004/0010491 A1 1/2004 Riedinger
2004/0255167 A1 12/2004 Knight
2005/0000165 A1 1/2005 Dischinat et al.
2005/0289072 A1 12/2005 Sabharwal
2006/0149575 A1 7/2006 Varadarajan et al.
2007/0012161 A1 1/2007 Lyles
2007/0021955 A1 1/2007 Tolone et al.
2007/0043656 A1 2/2007 Lancaster
2007/0226796 A1 9/2007 Gilbert et al.
2008/0027690 A1 1/2008 Watts
2008/0172353 A1 7/2008 Lim et al.
2009/0006156 A1 1/2009 Hunt et al.
2009/0064088 A1 3/2009 Barcia et al.
2009/0089227 A1 4/2009 Sturrock et al.
2009/0222562 A1 9/2009 Liu et al.
2009/0293128 A1 11/2009 Lippmann et al.
2010/0042846 A1 2/2010 Trotter et al.
2010/0180337 A1 7/2010 Bajekal
2010/0185579 A1 7/2010 Hong et al.
2010/0205588 A1 8/2010 Yu et al.
2010/0228693 A1 9/2010 Dawson et al.
2011/0060821 A1 3/2011 Loizeaux et al.
2011/0154341 A1 6/2011 Pueyo et al.
2011/0208681 A1 8/2011 Kuecuekyan
2012/0030757 A1 2/2012 Baikalov et al.
2012/0266244 A1 10/2012 Green et al.
2012/0303396 A1 11/2012 Winkler et al.
2013/0041921 A1 2/2013 Cooper et al.
2013/0073062 A1 3/2013 Smith et al.
2013/0091252 A1* 4/2013 Pizzorni ................ H04L 69/329
709/219
2013/0111592 A1 5/2013 Zhu et al.
2013/0117852 A1 5/2013 Stute
2013/0132149 A1 5/2013 Wei et al.
2013/0191416 A1 7/2013 Lee et al.
2013/0246996 A1 9/2013 Duggal et al.
2013/0304623 A1 11/2013 Kumar et al.
2013/0346354 A1 12/2013 Mizell et al.
2013/0347116 A1 12/2013 Flores et al.
2014/0074826 A1 3/2014 Cooper et al.
2014/0156806 A1 6/2014 Karpistsenko et al.
2014/0199664 A1 7/2014 Sadeh-Koniecpol et al.
2014/0237599 A1 8/2014 Gertner et al.
2014/0244612 A1 8/2014 Bhasin et al.
2014/0245443 A1 8/2014 Chakraborty
2014/0274022 A1 9/2014 Bell et al.
2014/0279762 A1 9/2014 Xaypanya et al.
2014/0358911 A1 12/2014 McCarthy et al.
2014/0359552 A1 12/2014 Misra et al.
2014/0365938 A1 12/2014 Black et al.
2015/0020199 A1 1/2015 Neil et al.
2015/0095303 A1 4/2015 Sonmez et al.
2015/0106941 A1 4/2015 Muller et al.
2015/0127628 A1* 5/2015 Rathod .............. G06Q 30/0251
707/710
2015/0149979 A1 5/2015 Talby et al.
2015/0163242 A1 6/2015 Laidlaw et al.
2015/0169294 A1 6/2015 Brock et al.
2015/0186427 A1 7/2015 Logothetis et al.
2015/0195192 A1 7/2015 Vasseur et al.
2015/0236935 A1 8/2015 Bassett
2015/0339263 A1 11/2015 Ata et al.
2015/0347414 A1 12/2015 Xiao et al.
2015/0371224 A1 12/2015 Lingappa
2015/0379072 A1 12/2015 Dirac et al.
2015/0379424 A1 12/2015 Dirac et al.
2016/0004858 A1 1/2016 Chen et al.
2016/0006629 A1 1/2016 Ianakiev et al.
2016/0028758 A1 1/2016 Ellis et al.
2016/0078361 A1 3/2016 Brueckner et al.
2016/0080399 A1 3/2016 Harris et al.
2016/0092557 A1 3/2016 Stojanovic et al.
2016/0099960 A1 4/2016 Gerritz et al.
2016/0105454 A1 4/2016 Li et al.
2016/0140446 A1 5/2016 Adderly et al.
2016/0140519 A1 5/2016 Trepca et al.
2016/0164905 A1 6/2016 Wood et al.
2016/0179945 A1 6/2016 Lastra Diaz et al.
2016/0203448 A1 7/2016 Metnick et al.
2016/0241580 A1 8/2016 Watters et al.
2016/0241581 A1 8/2016 Watters et al.
2016/0275123 A1 9/2016 Lin et al.
2016/0285732 A1 9/2016 Brech et al.
2016/0342606 A1 11/2016 Mouel et al.
2016/0350442 A1 12/2016 Crosby
2016/0364307 A1 12/2016 Garg et al.
2017/0019678 A1 1/2017 Kim et al.
2017/0063896 A1 3/2017 Muddu et al.
2017/0083380 A1 3/2017 Bishop et al.
2017/0126712 A1 5/2017 Crabtree et al.
2017/0139763 A1 5/2017 Ellwein
2017/0149802 A1 5/2017 Huang et al.
2017/0193110 A1 7/2017 Crabtree et al.
2017/0206360 A1 7/2017 Brucker et al.
2017/0214701 A1 7/2017 Hasan
2017/0322959 A1 11/2017 Tidwell et al.
2017/0323089 A1 11/2017 Duggal et al.
2018/0144243 A1 5/2018 Hsieh et al.
2018/0197128 A1 7/2018 Carstens et al.

(56) References Cited

U.S. PATENT DOCUMENTS

| | | | |
|---|---|---|---|
| 2018/0288085 | A1 | 10/2018 | Hailpern et al. |
| 2018/0288087 | A1 | 10/2018 | Hittel et al. |
| 2018/0300930 | A1 | 10/2018 | Kennedy et al. |
| 2019/0082305 | A1 | 3/2019 | Proctor |
| 2019/0095533 | A1 | 3/2019 | Levine et al. |

FOREIGN PATENT DOCUMENTS

| | | | |
|---|---|---|---|
| WO | 2014159150 | A1 | 10/2014 |
| WO | 2015094545 | A1 | 6/2015 |
| WO | 2017075543 | A1 | 5/2017 |

* cited by examiner

Cloud
201
Client Interface
105
Automated Planning Service Module
130
252
Financial Markets Functions Library
Monte-Carlo Risk
Numeric Analysis Libraries
Deep Learning Libraries
Contract Manipulation
Money Manipulation
Monte Carlo Search
Quant Approach Securities Library
Information Theory Statistics Engine
251
253
255
257
254
256
259
258
135
Distributed Extensible High Bandwidth Cloud Interface
110
Connector Module
Messaging Service
135a
Interactive Brokers
235
Market Plugins
236
Ecommerce Messaging
237
Email Reader
238
Video Data Converter
239
Observation and State Estimation Service
140
Action Outcome Simulation Module
125
160
General Transformer Service Module
155
Directed Computational Graph Module
155a
Distributed Data Pipeline
Decomposable Transformer Service Module
150
145
GraphStack Service
Graph Data Store
245
246
Robust Scripting Engine
280
Computational Clustering Module
120
Multidimensional Time Series Data Store
221
Distributive Scripting Engine
222
Math Libraries
200

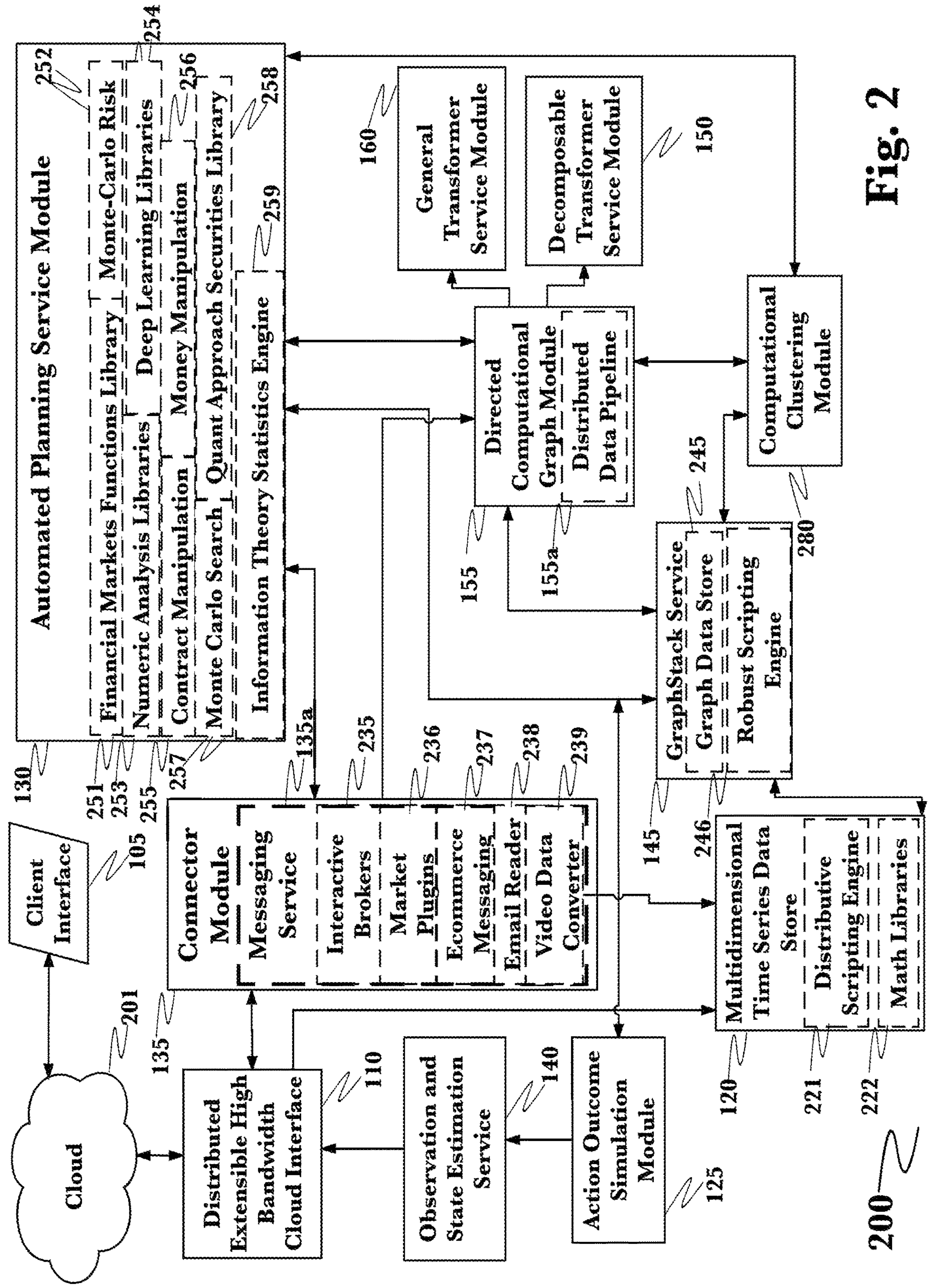

Fig. 2

500
501
P.O.
502a
Cluster A
511a
P.M.
512a
Activity Actor A1
512b
Activity Actor A2
510
Messaging System
521a
Service Actor A
521b
Service Actor B
522a
Service A
522b
Service B
Connect.
710
630
D.C. Svc.
610
Stream
620
Batch Continuously collect information on publicly-known vulnerabilities

1201

1202

Incorporate vulnerability info into CPG

1203

Analyze CPG to identify correlations between exposure and actual vulnerabilities

1204

Produce baseline vulnerability score

1200

Receive time-series event data

1401

1402

Receive CPG graph model

1403

Event occurs

1404

Log event into time-series data

1405

Check event against CPG

1406

Check impact assesssment score for affected resources

1407

Check baseline score to form recommendation

1400

Network is continuously monitored in real-time

1601

1602

New connection is detected

1603

CPG is updated with new connection

1604

Network resiliency score is checked

1605

Blast radius for new connection is checked

1606

If connection indicates a threat or rogue device, send alert with contextual information

1600

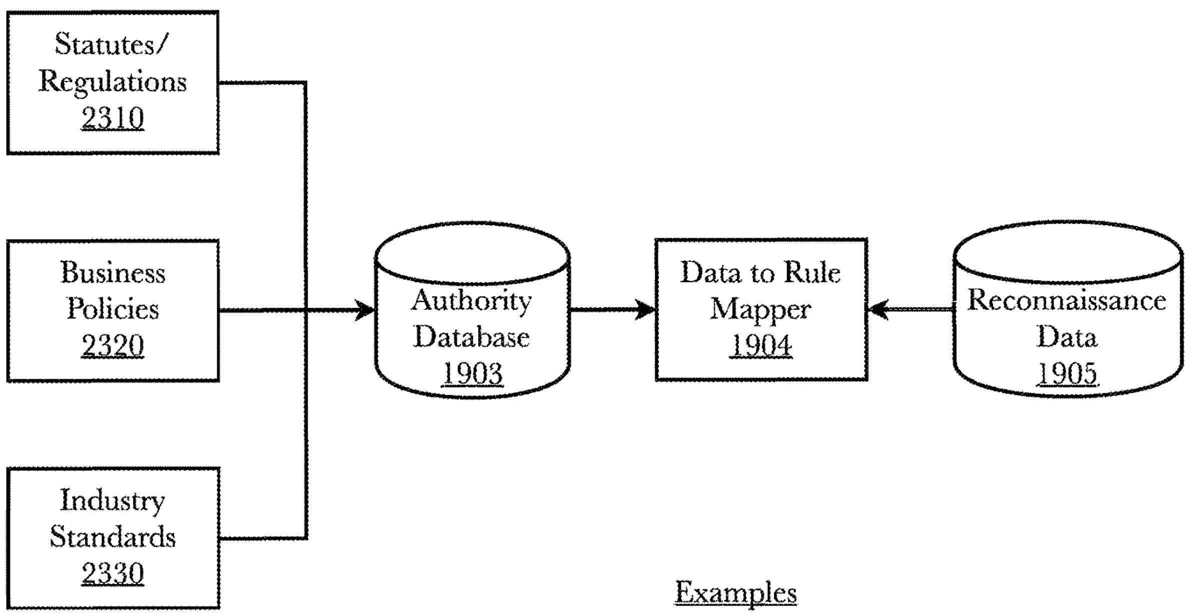

Examples

| Authority | Rule | Data Point Received | Tagged with Impact |
|---|---|---|---|
| 2311 GDPR Article 33, paragraph 1 | Notify cognizant authority within 72 hours breach | Data breach reported online | Possible fines |
| 2321 Corporate Policy | Do not access corp systems using personal computers | Employee account accessed using non-business computer | Possible data theft; security breach |
| 2331 Industry Standards | No open ports accessible outside of network perimeter | Open ports detected | Possible data loss |

Fig. 23

SYSTEM AND METHOD FOR MANIPULATION OF SECURE DATA

CROSS-REFERENCE TO RELATED APPLICATIONS

Priority is claimed in the application data sheet to the following patents or patent applications, each of which is expressly incorporated herein by reference in its entirety:

Ser. No. 17/001,459
Ser. No. 16/983,233
Ser. No. 15/931,534
Ser. No. 16/777,270
Ser. No. 16/720,383
Ser. No. 15/823,363
Ser. No. 15/725,274
Ser. No. 15/655,113
Ser. No. 15/616,427
Ser. No. 14/925,974
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536
Ser. No. 16/718,906
Ser. No. 15/879,182
Ser. No. 15/850,037
Ser. No. 15/673,368
Ser. No. 15/376,657
Ser. No. 15/489,716
Ser. No. 15/409,510
Ser. No. 15/379,899
Ser. No. 16/660,727
Ser. No. 15/229,476
Ser. No. 16/654,309
Ser. No. 15/847,443
Ser. No. 15/790,457
Ser. No. 15/790,327
62/568,291
62/568,298
Ser. No. 16/191,054
Ser. No. 15/905,041
Ser. No. 15/683,765
Ser. No. 16/945,698
Ser. No. 16/915,176
Ser. No. 15/891,329
Ser. No. 15/860,980
Ser. No. 15/788,002
Ser. No. 15/787,601
62/568,312
62/568,305
Ser. No. 16/864,133

BACKGROUND OF THE INVENTION

Field of the Invention

The disclosure relates to the field of computers and network management, and more particularly to the field of data processing, transport, and analysis.

Discussion of the State of the Art

In our age of modern computing, the global economy is underpinned by massive collections of digital information sets, aptly named big data. This data drives financial markets, governments, retail, and healthcare industries to name a few. A significant portion is sensitive in nature and regulated by governing bodies such as countries, corporations, legal institutions, and unions. These regulated data sets must adhere to strict locality, residency, and sovereignty rules when processed and transmitted. Furthermore, they must be fully auditable for accountability, evidentiary means, and other analytical processes.

Big data is enabled by an equally vast network of integrated computing hardware and software platforms, namely the Internet. The combination and complexity of platforms and their communication protocols poses a challenge to the secure processing, transmission, and use of regulated data sets. Up to this point, there is no comprehensive solution that can ensure strict policy compliance with regards to the creation, transfer, analysis, and use of regulated data through today's complex infrastructure, communication protocols, and varying digital information vehicles.

What is needed is a system and method for secure data transport, management, and analysis which supports a continuous compliance and a legality assessment mechanism to address pressing issues such as Health Insurance Portability and Accountability Act (HIPAA), General Data Protection Regulation (GDPR), California Consumer Privacy Act (CCPA), and other emerging compliance frameworks. A system that can further prevent the unauthorized use and access of regulated information from a risk avoidance, mitigation, and evidence/provenance compliance perspective.

SUMMARY OF THE INVENTION

Accordingly, the inventor has developed a system and method for secure policy-controlled processing and auditing on regulated data sets utilizing metadata and a plurality of analytics. The system and method combine the ability to restrict and control the transport and processing of data based on specified directives and provide rich auditable provenance to support evidential requirements. The system and method may additionally automatically optimize data routes and specify processing hardware based on data residency, sovereignty, or localization restrictions, furthermore, protect sensitive data from compromise by algorithmically generating digital tokens and employ sensors on all devices in the chain to provide a secure means of data transport.

According to a preferred embodiment, a system for manipulation of secure data is disclosed, comprising: a computing system comprising a non-volatile storage device, a memory, and a processor; an authority database stored on the non-volatile storage device; a network analyzer comprising a first plurality of programming instructions stored in the memory of, and operating on the processor of, the computing system, wherein the first plurality of programming instructions, when operating on the processor of the computing system, cause the computing system to: monitor and collect computing system metadata comprising information about the hardware and software on the computing system; and send the computing system metadata to the ledger engine; a data packet manager comprising a second plurality of programming instructions stored in the memory of, and operating on the processor of, the computing system, wherein the second plurality of programming instructions, when operating on the processor of the computing system, cause the computing system to: identify a protocol data unit on the network; amend the protocol data unit to allow enforcement of where computation or persistence of the protocol data unit occurs in the network; tokenize the protocol data unit to provide security against unauthorized use; extract protocol data unit metadata from the protocol data unit, the protocol data unit comprising a source and a destination; send the protocol data unit metadata to a ledger engine; receive an optimal pathway or rejection from the automated planning service; and when an optimal pathway is received, transmit the protocol data unit along the optimal pathway; and when a rejection is received, reject further transmission of the protocol data unit; a ledger engine comprising a third plurality of programming instructions stored in the memory of, and operating on the processor of, the computing system, wherein the third plurality of programming instructions, when operating on the processor of the computing system, cause the computing system to: receive the protocol data unit metadata; retrieve a regulatory guideline from the authority database pertaining to the protocol data unit based on the protocol data unit metadata; extract a rule from the regulatory guideline applicable to the protocol data unit based on the protocol data unit metadata; retrieve administrative metadata from the source of the protocol data unit, the administrative data comprising an access log; receive the computing system metadata; store the protocol data unit metadata, the administrative metadata, the computing system metadata, and the rule on the non-volatile storage device; a distributed computational graph engine comprising a fourth plurality of programming instructions stored in the memory of, and operating on the processor of, the computing system, wherein the fourth plurality of programming instructions, when operating on the processor of the computing system, cause the computing system to: create a distributed computational graph comprising vertices representing metadata attributes and edges representing mapped rules; retrieve the protocol data unit metadata, the administrative metadata, the computing system metadata, and the rule from the non-volatile storage; wherein the protocol data unit metadata, the administrative metadata, the computing system metadata, and the rule, are cached for a specified time period in the memory of the computing system, and can be accessed from that cache until the time period has passed; update the distributed computational graph with the protocol data unit metadata, the administrative metadata, the computing system metadata, and the rule from the non-volatile storage; store the distributed computational graph on the non-volatile storage device; an automated planning service comprising a fifth plurality of programming instructions stored in the memory of, and operating on the processor of, the computing system, wherein the fifth plurality of programming instructions, when operating on the processor of the computing system, cause the computing system to: retrieve the distributed computational graph from the non-volatile storage device; compute one or more policy compliant pathways for the protocol data unit to travel by running one or more graph traversal algorithms on the distributed computational graph; identify an optimal pathway from the one or more policy compliant pathways; and send the optimal pathway to the data packet manager.

According to another preferred embodiment, a method for manipulation of secure data is disclosed, comprising the steps of: monitoring and collect computing system metadata comprising information about the hardware and software on the computing system, using a network analyzer; sending the computing system metadata to the ledger engine, using a network analyzer; identifying a protocol data unit on the network, using a data packet manager; amending the protocol data unit to allow enforcement of where computation or persistence of the protocol data unit occurs in the network, using a data packet manager; tokenizing the protocol data unit to provide security against unauthorized use, using a data packet manager; extracting protocol data unit metadata from the protocol data unit, the protocol data unit comprising a source and a destination, using a data packet manager; sending the protocol data unit metadata to a ledger engine, using a data packet manager; receiving an optimal pathway or rejection from the automated planning service, using a data packet manager; transmitting the protocol data unit along the optimal pathway when an optimal pathway is received, using a data packet manager; rejecting further transmission of the protocol data unit when a rejection is received, using a data packet manager; receiving the protocol data unit metadata, using a ledger engine; retrieving a regulatory guideline from the authority database pertaining to the protocol data unit based on the protocol data unit metadata, using a ledger engine; extracting a rule from the regulatory guideline applicable to the protocol data unit based on the protocol data unit metadata, using a ledger engine; retrieving administrative metadata from the source of the protocol data unit, the administrative data comprising an access log, using a ledger engine; receiving the computing system metadata, using a ledger engine; storing the protocol data unit metadata, the administrative metadata, the computing system metadata, and the rule on the non-volatile storage device, using a ledger engine; creating a distributed computational graph comprising vertices representing metadata attributes and edges representing mapped rules, using a distributed computational graph engine; retrieving the protocol data unit metadata, the administrative metadata, the computing system metadata, and the rule from the non-volatile storage, using a distributed computational graph engine; wherein the protocol data unit metadata, the administrative metadata, the computing system metadata, and the rule, are cached for a specified time period in the memory of the computing system, and can be accessed from that cache until the time period has passed, using a distributed computational graph engine; updating the distributed computational graph with the protocol data unit metadata, the administrative metadata, the computing system metadata, and the rule from the non-volatile storage, using a distributed computational graph engine; storing the distributed computational graph on the non-volatile storage device, using a distributed computational graph engine; retrieving the distributed computational graph from the non-volatile storage device, using an automated planning service; computing one or more policy compliant pathways for the protocol data unit to travel by running one or more graph traversal algorithms on the distributed computational graph, using an automated planning service; identifying an optimal pathway from the one or more policy compliant pathways, using an automated planning service; and sending the optimal pathway to the data packet manager, using an automated planning service.

According to another preferred embodiment, a computing system for movement and manipulation of secure data employing a ledger engine, the computing system comprising: one or more hardware processors configured for: collecting computing system metadata comprising information about the hardware and software on the computing system; identifying a protocol data unit on the network; amending the protocol data unit to allow enforcement of where computation or persistence of the protocol data unit occurs in the network; tokenizing the protocol data unit to provide security against unauthorized use; extracting protocol data unit metadata from the protocol data unit, the protocol data unit comprising a source and a destination; sending the protocol data unit metadata to a ledger engine; receiving an optimal pathway or rejection from the automated planning service; when an optimal pathway is received, transmitting the protocol data unit along the optimal pathway; when a rejection is received, rejecting further transmission of the protocol data unit; retrieving a regulatory guideline from the authority database pertaining to the protocol data unit based on the protocol data unit metadata; extracting a rule from the regulatory guideline applicable to the protocol data unit based on the protocol data unit metadata; retrieving administrative metadata from the source of the protocol data unit, the administrative data comprising an access log; receiving the computing system metadata; storing the protocol data unit metadata, the administrative metadata, the computing system metadata, and the rule on the non-volatile storage device; updating a distributed computational graph with the protocol data unit metadata, the administrative metadata, the computing system metadata, and the rule from the non-volatile storage; identifying an optimal pathway for the protocol data unit to travel, the optimal pathway selected from one or more computed policy compliant pathways; and sending the optimal pathway to the data packet manager.

According to another preferred embodiment, a computer-implemented method executed on a ledger engine for movement and manipulation of secure data, the computer-implemented method comprising: collecting computing system metadata comprising information about the hardware and software on the computing system; identifying a protocol data unit on the network; amending the protocol data unit to allow enforcement of where computation or persistence of the protocol data unit occurs in the network; tokenizing the protocol data unit to provide security against unauthorized use; extracting protocol data unit metadata from the protocol data unit, the protocol data unit comprising a source and a destination; sending the protocol data unit metadata to a ledger engine; receiving an optimal pathway or rejection from the automated planning service; when an optimal pathway is received, transmitting the protocol data unit along the optimal pathway; when a rejection is received, rejecting further transmission of the protocol data unit; retrieving a regulatory guideline from the authority database pertaining to the protocol data unit based on the protocol data unit metadata; extracting a rule from the regulatory guideline applicable to the protocol data unit based on the protocol data unit metadata; retrieving administrative metadata from the source of the protocol data unit, the administrative data comprising an access log; receiving the computing system metadata; storing the protocol data unit metadata, the administrative metadata, the computing system metadata, and the rule on the non-volatile storage device; updating a distributed computational graph with the protocol data unit metadata, the administrative metadata, the computing system metadata, and the rule from the non-volatile storage; identifying an optimal pathway for the protocol data unit to travel, the optimal pathway selected from one or more computed policy compliant pathways; and sending the optimal pathway to the data packet manager.

According to another preferred embodiment, a system for movement and manipulation of secure data employing a ledger engine, comprising one or more computers with executable instructions that, when executed, cause the system to: collect computing system metadata comprising information about the hardware and software on the computing system; identify a protocol data unit on the network; amend the protocol data unit to allow enforcement of where computation or persistence of the protocol data unit occurs in the network; tokenize the protocol data unit to provide security against unauthorized use; extract protocol data unit metadata from the protocol data unit, the protocol data unit comprising a source and a destination; send the protocol data unit metadata to a ledger engine; receive an optimal pathway or rejection from the automated planning service; when an optimal pathway is received, transmit the protocol data unit along the optimal pathway; when a rejection is received, reject further transmission of the protocol data unit; retrieve a regulatory guideline from the authority database pertaining to the protocol data unit based on the protocol data unit metadata; extract a rule from the regulatory guideline applicable to the protocol data unit based on the protocol data unit metadata; retrieve administrative metadata from the source of the protocol data unit, the administrative data comprising an access log; receive the computing system metadata; store the protocol data unit metadata, the administrative metadata, the computing system metadata, and the rule on the non-volatile storage device; update a distributed computational graph with the protocol data unit metadata, the administrative metadata, the computing system metadata, and the rule from the non-volatile storage; identify an optimal pathway for the protocol data unit to travel, the optimal pathway selected from one or more computed policy compliant pathways; and send the optimal pathway to the data packet manager.

According to another preferred embodiment, non-transitory, computer-readable storage media having computer-executable instructions embodied thereon that, when executed by one or more processors of a computing system employing a ledge engine for movement and manipulation of secure data, cause the computing system to: collect computing system metadata comprising information about the hardware and software on the computing system; identify a protocol data unit on the network; amend the protocol data unit to allow enforcement of where computation or persistence of the protocol data unit occurs in the network; tokenize the protocol data unit to provide security against unauthorized use; extract protocol data unit metadata from the protocol data unit, the protocol data unit comprising a source and a destination; send the protocol data unit metadata to a ledger engine; receive an optimal pathway or rejection from the automated planning service; and when an optimal pathway is received, transmit the protocol data unit along the optimal pathway; and when a rejection is received, reject further transmission of the protocol data unit; retrieve a regulatory guideline from the authority database pertaining to the protocol data unit based on the protocol data unit metadata; extract a rule from the regulatory guideline applicable to the protocol data unit based on the protocol data unit metadata; retrieve administrative metadata from the source of the protocol data unit, the administrative data comprising an access log; receive the computing system metadata; store the protocol data unit metadata, the administrative metadata, the computing system metadata, and the rule on the non-volatile storage device; update a distributed computational graph with the protocol data unit metadata, the administrative metadata, the computing system metadata, and the rule from the non-volatile storage; identify an optimal pathway for the protocol data unit to travel, the optimal pathway selected from one or more computed policy compliant pathways; and send the optimal pathway to the data packet manager.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 2 is a block diagram of an advanced cyber decision platform in an exemplary configuration for use in investment vehicle management.

FIG. 23 is a block diagram showing exemplary operation of a data to rule mapper.

DETAILED DESCRIPTION OF THE INVENTION

Figure 1:
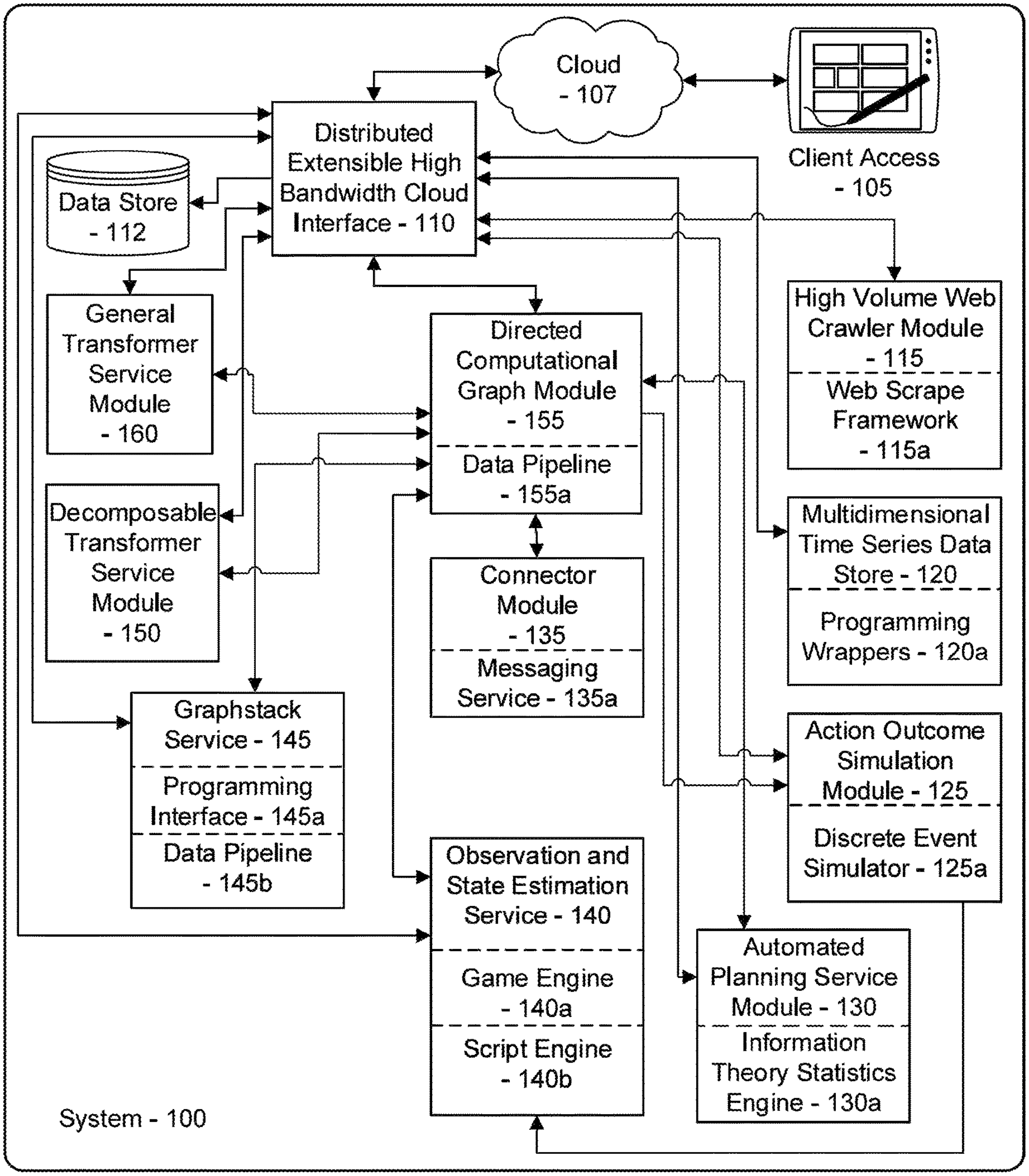
FIG. 1 is a block diagram of an exemplary system architecture for an advanced cyber decision platform.

The inventor has conceived, and reduced to practice, a system and method for manipulation of secure data. The system and method combine the ability to restrict and control the transport and processing of data based specified policies and provide rich auditable provenance. The system and method may additionally automatically optimize data routes and specify processing hardware based on data residency, sovereignty, or localization restrictions, furthermore, protect sensitive data from compromise by algorithmically generating digital tokens and employ sensors on all devices in the chain to provide a secure means of data transport.

It is important to note that current work on provenance focuses on application-specific storage and query efficiency for a given type of data store or transformation engine (e.g. Blockchain, Spark). Additionally, current provenance techniques are unable to address cyclic provenance graphs, which can occur when powerful graphing tools are used for orchestration with multiple children, parents, cycles, and functional decomposition. The lack of a system-wide approach for meta-data management associated with provenance management in polyglot and poly-application database systems is all the more reason a comprehensive solution is needed. The current state of the art's ability to analyze or generate relational data sets is of little practical value without a unified means of persisting and analyzing such data in concert with the broader chains of transformations across multiple data stores and systems. This problem is further enhanced when techniques like tokenization or synthetic data are introduced for privacy and efficiency. Moreover, regulating the routing of data may be of concern for security, legal, political, business, taxation, or other reasons not limited to this discussion.

As an example of the operation of the system, a financial data query originates from the United States to a destination inside Europe. Immediately, a ledger engine, further comprising several virtual and/or physical terminal access points and reconnaissance data, compiles all transactions and metadata associated with this request into an associated ledger. The metadata may include administrative, descriptive, preservative, technical, and use information. A planning service automatically establishes destination routes with consideration to mapped rules from an authority database leveraged through a distributed computational graph. One such rule may entail avoiding physical regions or compromised hardware where cyberattacks are prominent and sensitive financial transactions are prone to interception attempts. This could mean routing through the Trans-Pacific cable rather than the Trans-Atlantic cable to avoid known cable taps as one example. Once a routing decision is reached, a tokenizer algorithmically secures the information before transport. Once the request has reached the European continent, the system may further avoid routes through certain privately owned infrastructure or known vulnerable hardware. Once the process is securely completed the ledger is archived in the ledger data store for future audits and evidentiary compliance.

One further example of the operation of the system may be ensuring the automatic policy compliance of data restrictions with regards to business and legal documents. A legality assessment mechanism receives business documents and performs automatic analyzes using natural language processing to classify and map rules contained in the legal standards. The legality assessment mechanism then works in tandem with the distributed computation graph to automatically and dynamically create rules in the authority database to explicitly modify the logical and physical processing in any tier or tessellation of the networking architecture. Further, the ingesting of documents adds to the multitude of metadata received by the ledger engine thus increasing the provenance capability.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "graph" is a representation of information and relationships, where each primary unit of information makes up a "node" or "vertex" of the graph and the relationship between two nodes makes up an edge of the graph. Nodes can be further qualified by the connection of one or more descriptors or "properties" to that node. For example, given the node "James R," name information for a person, qualifying properties might be "183 cm tall," "DOB Aug. 13, 1965" and "speaks English". Similar to the use of properties to further describe the information in a node, a relationship between two nodes that forms an edge can be qualified using a "label". Thus, given a second node "Thomas G," an edge between "James R" and "Thomas G" that indicates that the two people know each other might be labeled "knows." When graph theory notation (Graph=(Vertices, Edges)) is applied this situation, the set of nodes are used as one parameter of the ordered pair, V and the set of 2 element edge endpoints are used as the second parameter of the ordered pair, E. When the order of the edge endpoints within the pairs of E is not significant, for example, the edge James R, Thomas G is equivalent to Thomas G, James R, the graph is designated as "undirected." Under circumstances when a relationship flows from one node to another in one direction, for example James R is "taller" than Thomas G, the order of the endpoints is significant. Graphs with such edges are designated as "directed." In the distributed computational graph system, transformations within transformation pipeline are represented as directed graph with each transformation comprising a node and the output messages between transformations comprising edges. Distributed computational graph stipulates the potential use of non-linear transformation pipelines which are programmatically linearized. This may also be part of a cyclical support requirement since the system can have limiting logic versus perceptual execution during linearization translation processes. Such linearization can result in exponential growth of resource consumption. The most sensible approach to overcome possibility is to introduce new transformation pipelines just as they are needed, creating only those that are ready to compute. Such method results in transformation graphs which are highly variable in size and node, edge composition as the system processes data streams. Those familiar with the art will realize that a transformation graph may assume many shapes and sizes with a vast topography of edge relationships. The examples given were chosen for illustrative purposes only and represent a small number of the simplest of possibilities. These examples should not be taken to define the possible graphs expected as part of operation of the invention As used herein, "transformation" is a function performed on zero or more streams of input data which results in a single stream of output which may or may not then be used as input for another transformation. Transformations may comprise any combination of machine, human or machine-human interactions Transformations need not change data that enters them, one example of this type of transformation would be a storage transformation which would receive input and then act as a queue for that data for subsequent transformations. As implied above, a specific transformation may generate output data in the absence of input data. A time stamp serves as an example. In the invention, transformations are placed into pipelines such that the output of one transformation may serve as an input for another. These pipelines can consist of two or more transformations with the number of transformations limited only by the resources of the system. Historically, transformation pipelines have been linear with each transformation in the pipeline receiving input from one antecedent and providing output to one subsequent with no branching or iteration. Other pipeline configurations are possible. The invention is designed to permit several of these configurations including, but not limited to: linear, afferent branch, efferent branch and cyclical.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various aspects may preferentially employ one or another of the various data storage subsystems available in the art (or available in the future), the invention should not be construed to be so limited, as any data storage architecture may be used according to the aspects. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

A "data context," as used herein, refers to a set of arguments identifying the location of data. This could be a Rabbit queue, a .csv file in cloud-based storage, or any other such location reference except a single event or record. Activities may pass either events or data contexts to each other for processing. The nature of a pipeline allows for direct information passing between activities, and data locations or files do not need to be predetermined at pipeline start.

A "pipeline," as used herein and interchangeably referred to as a "data pipeline" or a "processing pipeline," refers to a set of data streaming activities and batch activities. Streaming and batch activities can be connected indiscriminately within a pipeline. Events will flow through the streaming activity actors in a reactive way. At the junction of a streaming activity to batch activity, there will exist a StreamBatchProtocol data object. This object is responsible for determining when and if the batch process is run. One or more of three possibilities can be used for processing triggers: regular timing interval, every N events, or optionally an external trigger. The events are held in a queue or similar until processing. Each batch activity may contain a "source" data context (this may be a streaming context if the upstream activities are streaming), and a "destination" data context (which is passed to the next activity). Streaming activities may have an optional "destination" streaming data context (optional meaning: caching/persistence of events vs. ephemeral), though this should not be part of the initial implementation.

A "ledger," as used herein, is an organized collection of transactional metrics relating to the source, use, and destination information of data packets traveling through the computer network. The metrics are not limited to the scope of this embodiment and may include other aspects of consideration. Exemplary metrics may include OSI headers from layers 2, 3, and 4, MAC addresses, host names, IP addresses, ports, and other unique or relational processing and networking information. It should be apparent to one possessing ordinary skill in the art that a ledger could be implemented as an immutable ledger technology. It should further be appreciated that the ledger may be implemented as a traditional database, and that the choice of implementation is dependent upon the embodiment.

As used herein, "tokenizer," "detokenizer," "tokenized," and "token" refer to the process of protecting sensitive data by replacing it with an algorithmically generated number called a token that is intended to perishable (typically single use). An example of commonly used tokenization is to prevent credit card fraud. In the credit card industry, a tokenizer replaces the customer's primary account number with a series of randomly generated numbers, which is called the "token." These tokens can then be passed through the internet or various networks needed to process the payment without the bank details being revealed. The actual account information is protected in a secure token vault.

As used herein, "data restrictions" refer to data residency (where a business, industry body or government specifics that their data is stored in a geographical location of their choice, usually for regulatory or policy reasons), data sovereignty (data stored in a designated location, and is also subject to the laws of the country in which it is physically stored), and data localization (requires that data created within certain borders stay within them).

Conceptual Architecture

FIG. 1 is a block diagram of an advanced cyber decision platform (ACDP) for external network reconnaissance and cybersecurity rating. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information via network 107 and operates a data store 112 such as, but not limited to MONGODB™, COUCHDB™, CASSANDRA™ or REDIS™ according to various arrangements. Much of the business data analyzed by the system both from sources within the confines of the client business, and from cloud based sources, also enter the system through the cloud interface 110, data being passed to the connector module 135 which may possess the API routines **135*a* needed to accept and convert the external data and then pass the normalized information to other analysis and transformation components of the system, the directed computational graph module 155, high volume web crawler module 115, multidimensional time series database (MDTSDB) 120 and the graph stack service 145. The directed computational graph module 155 retrieves one or more streams of data from a plurality of sources, which includes, but is in no way not limited to, a plurality of physical sensors, network service providers, web based questionnaires and surveys, monitoring of electronic infrastructure, crowd sourcing campaigns, and human input device information. Within the directed computational graph module 155, data may be split into two identical streams in a specialized pre-programmed data pipeline 155*a*, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115*a* of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to enterprise network usage data, component and system logs, performance data, network service information captures such as, but not limited to news and financial feeds, and sales and service related customer data. The module is designed to accommodate irregular and high volume surges by dynamically allotting network bandwidth and server processing channels to process the incoming data. Inclusion of programming wrappers 120*a* for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database (MDTSDB) 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145*a*, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any predetermined scripted modifications 145*a* and stores it in a graph-based data store 145*b*** such as GIRAPH™ or a key value pair type data store REDIS™, or RIAK™, among others, all of which are suitable for storing graph-based information.

Results of the transformative analysis process may then be combined with further client directives, and additional business rules and practices relevant to the analysis and situational information external to the already available data in the automated planning service module 130 which also runs powerful information theory 130*a* based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125*a* coupled with the end user facing observation and state estimation service 140 which is highly scriptable 140*b* as circumstances require and has a game engine 140*a* to more realistically stage possible outcomes of business decisions under consideration, allows business decision makers to investigate the probable outcomes of choosing one pending course of action over another based upon analysis of the current available data.

When performing external reconnaissance via a network 107, web crawler 115 may be used to perform a variety of port and service scanning operations on a plurality of hosts. This may be used to target individual network hosts (for example, to examine a specific server or client device) or to broadly scan any number of hosts (such as all hosts within a particular domain, or any number of hosts up to the complete IPv4 address space). Port scanning is primarily used for gathering information about hosts and services connected to a network, using probe messages sent to hosts that prompt a response from that host. Port scanning is generally centered around the transmission control protocol (TCP), and using the information provided in a prompted response a port scan can provide information about network and application layers on the targeted host.

Port scan results can yield information on open, closed, or undetermined ports on a target host. An open port indicates that an application or service is accepting connections on this port (such as ports used for receiving customer web traffic on a web server), and these ports generally disclose the greatest quantity of useful information about the host. A closed port indicates that no application or service is listening for connections on that port, and still provides information about the host such as revealing the operating system of the host, which may be discovered by fingerprinting the TCP/IP stack in a response. Different operating systems exhibit identifiable behaviors when populating TCP fields, and collecting multiple responses and matching the fields against a database of known fingerprints makes it possible to determine the OS of the host even when no ports are open. An undetermined port is one that does not produce a requested response, generally because the port is being filtered by a firewall on the host or between the host and the network (for example, a corporate firewall behind which all internal servers operate).

Scanning may be defined by scope to limit the scan according to two dimensions, hosts and ports. A horizontal scan checks the same port on multiple hosts, often used by attackers to check for an open port on any available hosts to select a target for an attack that exploits a vulnerability using that port. This type of scan is also useful for security audits, to ensure that vulnerabilities are not exposed on any of the target hosts. A vertical scan defines multiple ports to examine on a single host, for example a "vanilla scan" which targets every port of a single host, or a "strobe scan" that targets a small subset of ports on the host. This type of scan is usually performed for vulnerability detection on single systems, and due to the single-host nature is impractical for large network scans. A block scan combines elements of both horizontal and vertical scanning, to scan multiple ports on multiple hosts. This type of scan is useful for a variety of service discovery and data collection tasks, as it allows a broad scan of many hosts (up to the entire Internet, using the complete IPv4 address space) for a number of desired ports in a single sweep.

Large port scans involve quantitative research, and as such may be treated as experimental scientific measurement and are subject to measurement and quality standards to ensure the usefulness of results. To avoid observational errors during measurement, results must be precise (describing a degree of relative proximity between individual measured values), accurate (describing relative proximity of measured values to a reference value), preserve any metadata that accompanies the measured data, avoid misinterpretation of data due to faulty measurement execution, and must be well-calibrated to efficiently expose and address issues of inaccuracy or misinterpretation. In addition to these basic requirements, large volumes of data may lead to unexpected behavior of analysis tools, and extracting a subset to perform initial analysis may help to provide an initial overview before working with the complete data set. Analysis should also be reproducible, as with all experimental science, and should incorporate publicly-available data to add value to the comprehensibility of the research as well as contributing to a "common framework" that may be used to confirm results.

When performing a port scan, web crawler 115 may employ a variety of software suitable for the task, such as Nmap, ZMap, or masscan. Nmap is suitable for large scans as well as scanning individual hosts, and excels in offering a variety of diverse scanning techniques. ZMap is a newer application and unlike Nmap (which is more general-purpose), ZMap is designed specifically with Internet-wide scans as the intent. As a result, ZMap is far less customizable and relies on horizontal port scans for functionality, achieving fast scan times using techniques of probe randomization (randomizing the order in which probes are sent to hosts, minimizing network saturation) and asynchronous design (utilizing stateless operation to send and receive packets in separate processing threads). Masscan uses the same asynchronous operation model of ZMap, as well as probe randomization. In masscan however, a certain degree of statistical randomness is sacrificed to improve computation time for large scans (such as when scanning the entire IPv4 address space), using the BlackRock algorithm. This is a modified implementation of symmetric encryption algorithm DES, with fewer rounds and modulo operations in place of binary ones to allow for arbitrary ranges and achieve faster computation time for large data sets.

Received scan responses may be collected and processed through a plurality of data pipelines 155*a* to analyze the collected information. MDTSDB 120 and graph stack 145 may be used to produce a hybrid graph/time-series database using the analyzed data, forming a graph of Internet-accessible organization resources and their evolving state information over time. Customer-specific profiling and scanning information may be linked to CPG graphs (as described below in detail, referring to FIG. 11) for a particular customer, but this information may be further linked to the base-level graph of internet-accessible resources and information. Depending on customer authorizations and legal or regulatory restrictions and authorizations, techniques used may involve both passive, semi-passive and active scanning and reconnaissance.

FIG. 2 is a block diagram of an advanced cyber decision platform in an exemplary configuration for use in investment vehicle management 200. The advanced cyber decision platform 100 previously disclosed in co-pending application Ser. No. 15/141,752 and applied in a role of cybersecurity in co-pending application Ser. No. 15/237,625, when programmed to operate as quantitative trading decision platform, is very well suited to perform advanced predictive analytics and predictive simulations 202 to produce investment predictions. Much of the trading specific programming functions are added to the automated planning service module 130 of the modified advanced cyber decision platform 100 to specialize it to perform trading analytics. Specialized purpose libraries may include but are not limited to financial markets functions libraries 251, Monte-Carlo risk routines 252, numeric analysis libraries 253, deep learning libraries 254, contract manipulation functions 255, money handling functions 256, Monte-Carlo search libraries 257, and quant approach securities routines 258. Pre-existing deep learning routines including information theory statistics engine 259 may also be used. The invention may also make use of other libraries and capabilities that are known to those skilled in the art as instrumental in the regulated trade of items of worth. Data from a plurality of sources used in trade analysis are retrieved, much of it from remote, cloud resident 201 servers through the system's distributed, extensible high bandwidth cloud interface 110 using the system's connector module 135 which is specifically designed to accept data from a number of information services both public and private through interfaces to those service's applications using its messaging service 135*a* routines, due to case of programming, are augmented with interactive broker functions 235, market data source plugins 236, e-commerce messaging interpreters 237, business-practice aware email reader 238 and programming libraries to extract information from video data sources 239.

Other modules that make up the advanced cyber decision platform may also perform significant analytical transformations on trade related data. These may include the multidimensional time series data store 120 with its robust scripting features which may include a distributive friendly, fault-tolerant, real-time, continuous run prioritizing, programming platform such as, but not limited to Erlang/OTP 221 and a compatible but comprehensive and proven library of math functions of which the C++ math libraries are an example 222, data formalization and ability to capture time series data including irregularly transmitted, burst data; the GraphStack service 145 which transforms data into graphical representations for relational analysis and may use packages for graph format data storage such as Titan 245 or the like and a highly interface accessible programming interface an example of which may be Akka/Spray, although other, similar, combinations may equally serve the same purpose in this role 246 to facilitate optimal data handling; the directed computational graph module 155 and its distributed data pipeline 155*a* supplying related general transformer service module 160 and decomposable transformer module 150 which may efficiently carry out linear, branched, and recursive transformation pipelines during trading data analysis may be programmed with multiple trade related functions involved in predictive analytics of the received trade data. Both possibly during and following predictive analyses carried out by the system, results must be presented to clients 105 in formats best suited to convey the both important results for analysts to make highly informed decisions and, when needed, interim or final data in summary and potentially raw for direct human analysis. Simulations which may use data from a plurality of field spanning sources to predict future trade conditions are accomplished within the action outcome simulation module 125. Data and simulation formatting may be completed or performed by the observation and state estimation service 140 using its case of scripting and gaming engine to produce optimal presentation results.

In cases where there are both large amounts of data to be cleansed and formalized and then intricate transformations such as those that may be associated with deep machine learning, first disclosed in ¶067 of co-pending application Ser. No. 14/925,974, predictive analytics and predictive simulations, distribution of computer resources to a plurality of systems may be routinely required to accomplish these tasks due to the volume of data being handled and acted upon. The advanced cyber decision platform employs a distributed architecture that is highly extensible to meet these needs. A number of the tasks carried out by the system are extremely processor intensive and for these, the highly integrated process of hardware clustering of systems, possibly of a specific hardware architecture particularly suited to the calculations inherent in the task, is desirable, if not required for timely completion. The system includes a computational clustering module 280 to allow the configuration and management of such clusters during application of the advanced cyber decision platform. While the computational clustering module is drawn directly connected to specific co-modules of the advanced cyber decision platform these connections, while logical, are for case of illustration and those skilled in the art will realize that the functions attributed to specific modules of an embodiment may require clustered computing under one use case and not under others. Similarly, the functions designated to a clustered configuration may be role, if not run, dictated. Further, not all use cases or data runs may use clustering.

Figure 2A:
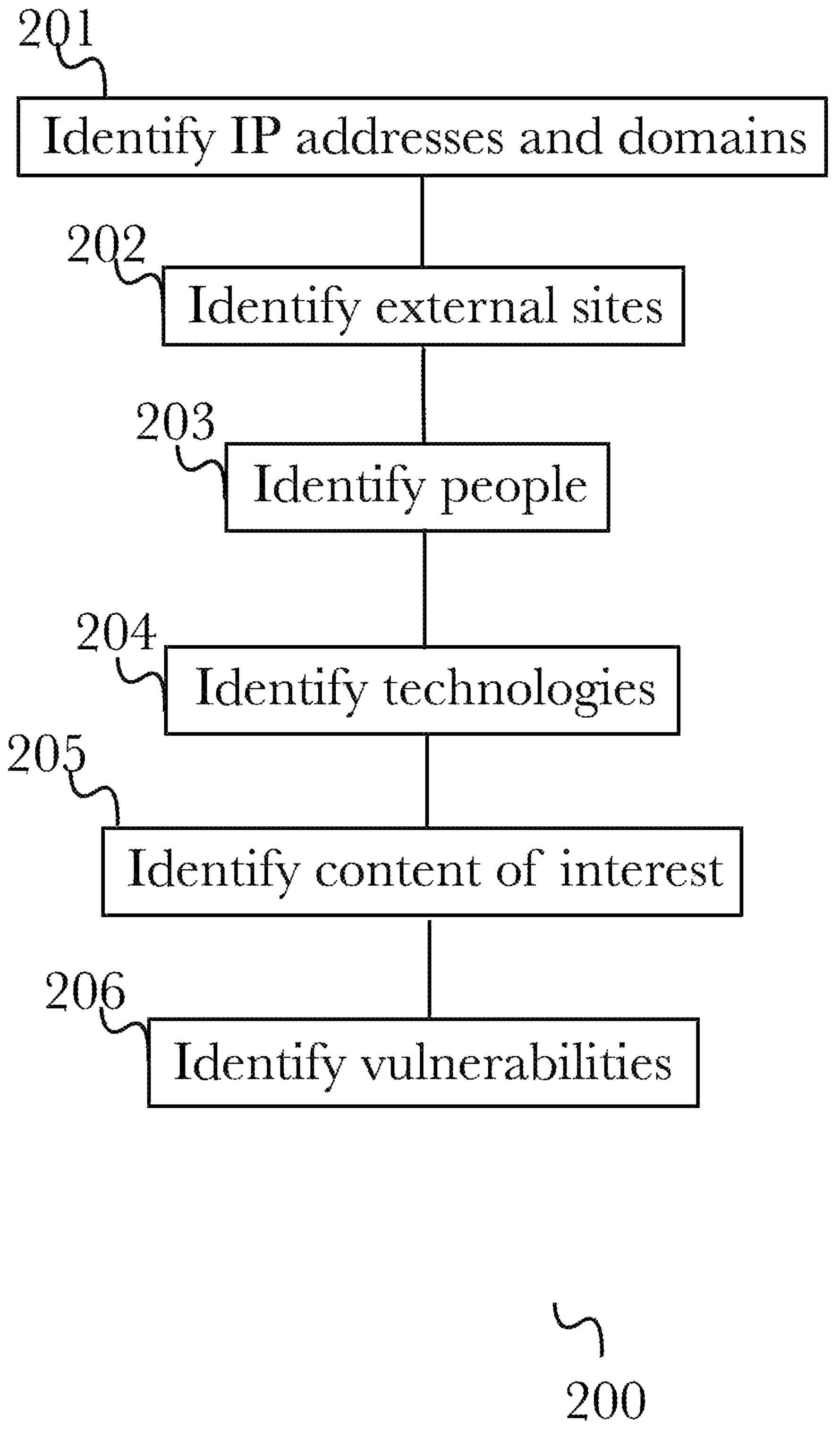
FIG. 2A is a block diagram showing general steps for performing passive network data collection.

FIG. 2A is a block diagram showing general steps 200 for performing passive network reconnaissance. It should be appreciated that the steps illustrated and described may be performed in any order, and that steps may be added or omitted as needed for any particular reconnaissance operation. In a step 201, network address ranges and domains or sub-domains associated with a plurality of targets may be identified, for example to collect information for defining the scope of further scanning operations. In another step 202, external sites may be identified to understand relationships between targets and other third-party content providers, such as trust relationships or authoritative domain name service (DNS) resolution records. In another step 203, individual people or groups may be identified using names, email addresses, phone numbers, or other identifying information that may be useful for a variety of social engineering activities. In another step 204, technologies used may be identified, such as types or versions of hardware or software used by an organization, and this may include collecting and extracting information from job descriptions (for example) to identify technologies in use by an organization (for example, a job description for an administrator familiar with specific database software indicates that the software is in use within the organization). In another step 205, content of interest may be identified, for example including web and email portals, log files, backup or archive files, and other forms of sensitive information that may be contained within HTML comments or client-side scripts, as may be useful for vulnerability discovery and penetration testing activities. In another step 206, publicly-available information may be used to identify vulnerabilities that may be exploited with further active penetration testing.

Figure 2B:
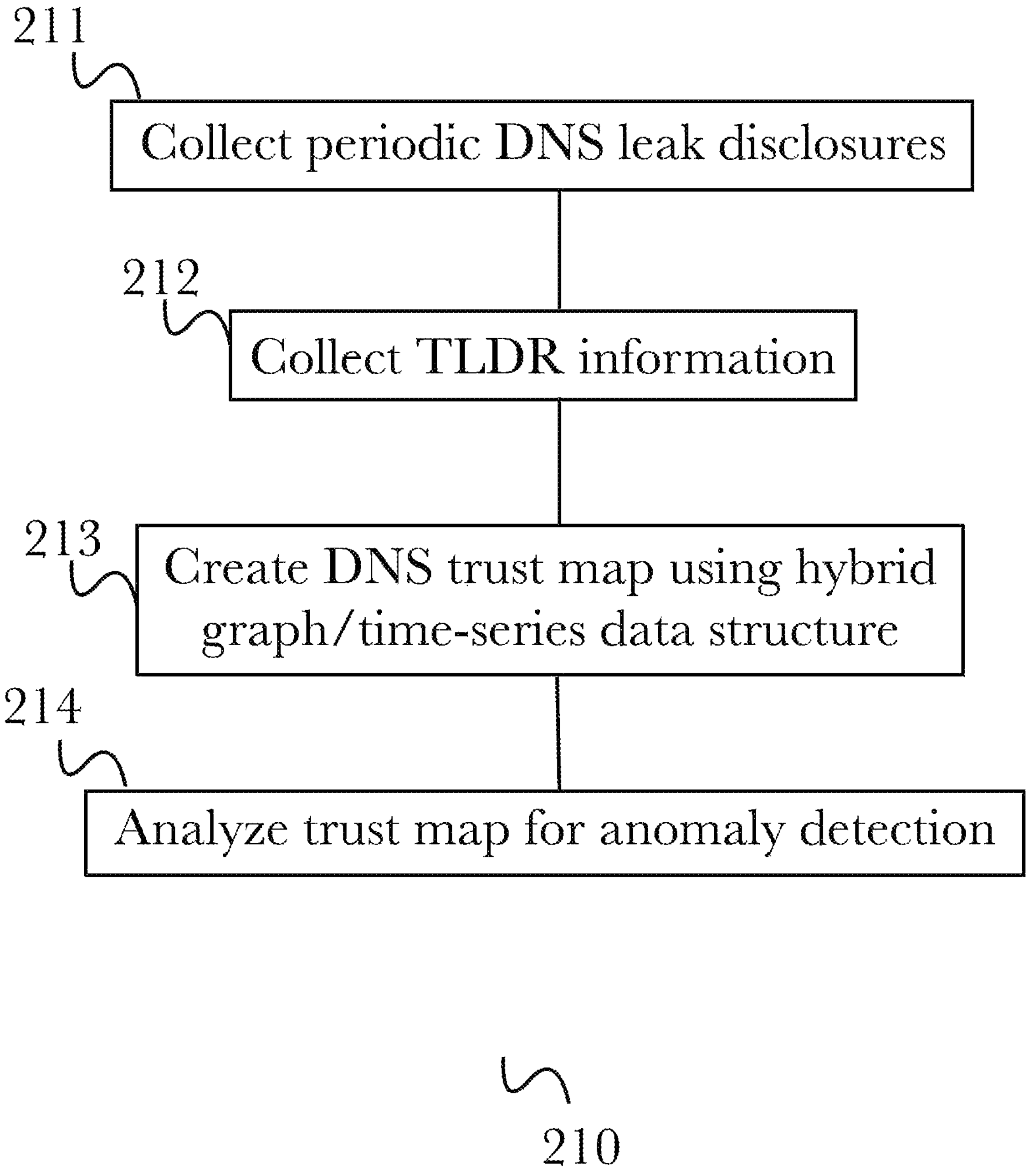
FIG. 2B is a process diagram showing a general flow of a process for performing active reconnaissance using DNS leak information collection.

FIG. 2B is a process diagram showing a general flow of a process 210 for performing active reconnaissance using DNS leak information collection. In an initial step 211, publicly-available DNS leak disclosure information may be collected to maintain current information regarding known leaks and vulnerabilities. In a next step 212, third-level domain (TLDR) information may be collected and used to report domain risk factors, such as domains that do not resolve properly (due to malformed DNS records, for example). In a next step 213, a DNS trust map may be created using a hybrid graph/time-series data structure, using a graph stack service 145 and MDTSDB 120. This trust map may be produced as the output of an extraction process performed by a DCG 155 through a plurality of data pipelines 155*a*, analyzing collected data and mapping data points to produce hybrid structured output representing each data point over time. In a final step 214, the trust map may then be analyzed to identify anomalies, for example using community detection algorithms that may discover when new references are being created, and this may be used to identify vulnerabilities that may arise as a byproduct of the referential nature of a DNS hierarchy. In this manner, DCG pipeline processing and time-series data graphing may be used to identify vulnerabilities that would otherwise be obscured within a large dataset.

Figure 2C:
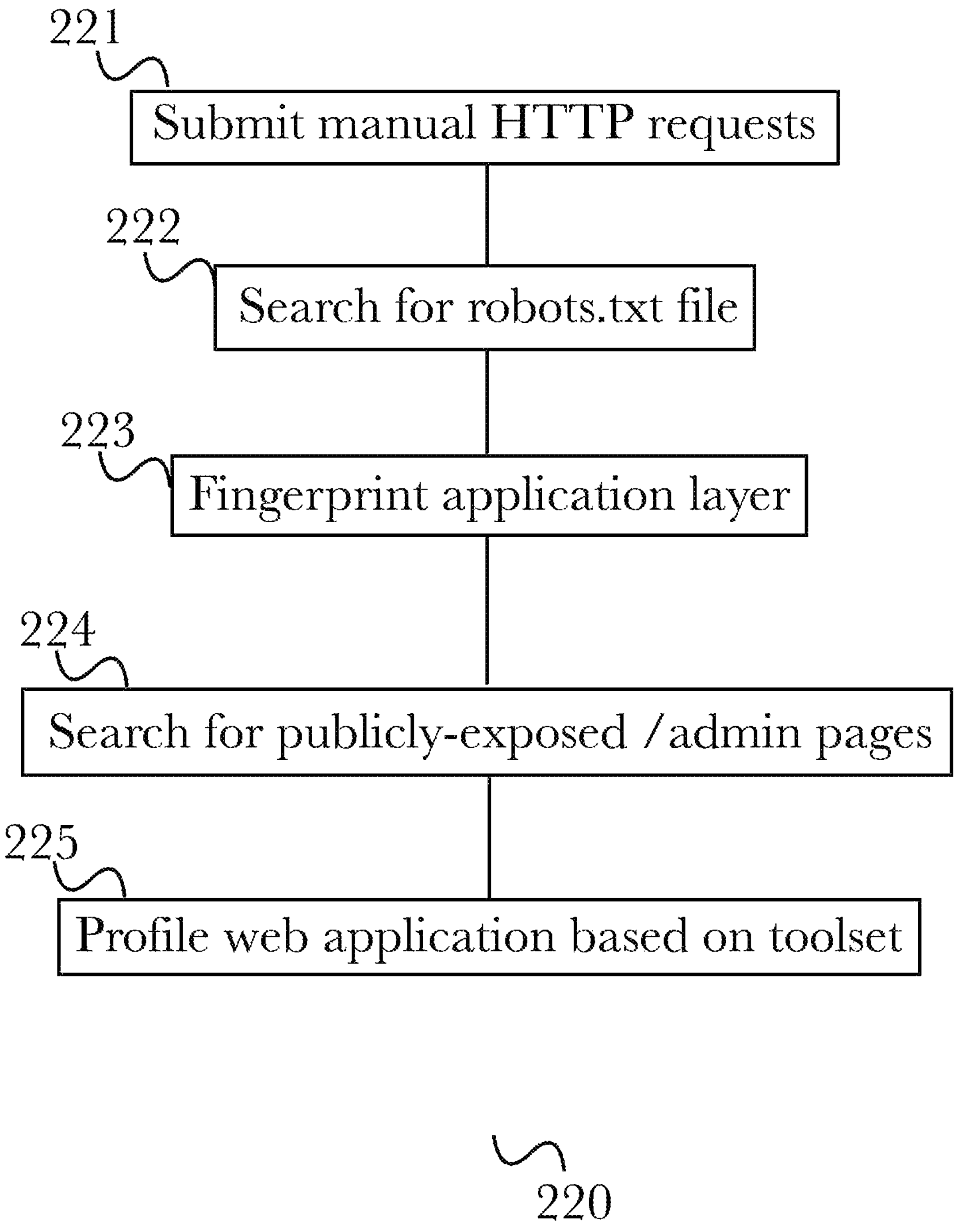
FIG. 2C is a process diagram showing a general flow of a process for performing active reconnaissance using web application and technology reconnaissance.

FIG. 2C is a process diagram showing a general flow of a process 220 for performing active reconnaissance using web application and technology reconnaissance. In an initial step 221, a plurality of manual HTTP requests may be transmitted to a host, for example to determine if a web server is announcing itself, or to obtain an application version number from an HTTP response message. In a next step 222, a robots.txt, used to identify and communicate with web crawlers and other automated "bots," may be searched for to identify portions of an application or site that robots are requested to ignore. In a next step 223, the host application layer may be fingerprinted, for example using file extensions and response message fields to identify characteristic patterns or markers that may be used to identify host or application details. In a next step 224, publicly-exposed/admin pages may be checked, to determine if any administrative portals are exposed and therefore potentially-vulnerable, as well as to potentially determine administration policies or capabilities based on exposed information. In a final step 225, an application may be profiled according to a particular toolset in use, such as WORDPRESS™ (for example) or other specific tools or plugins.

Figure 2D:
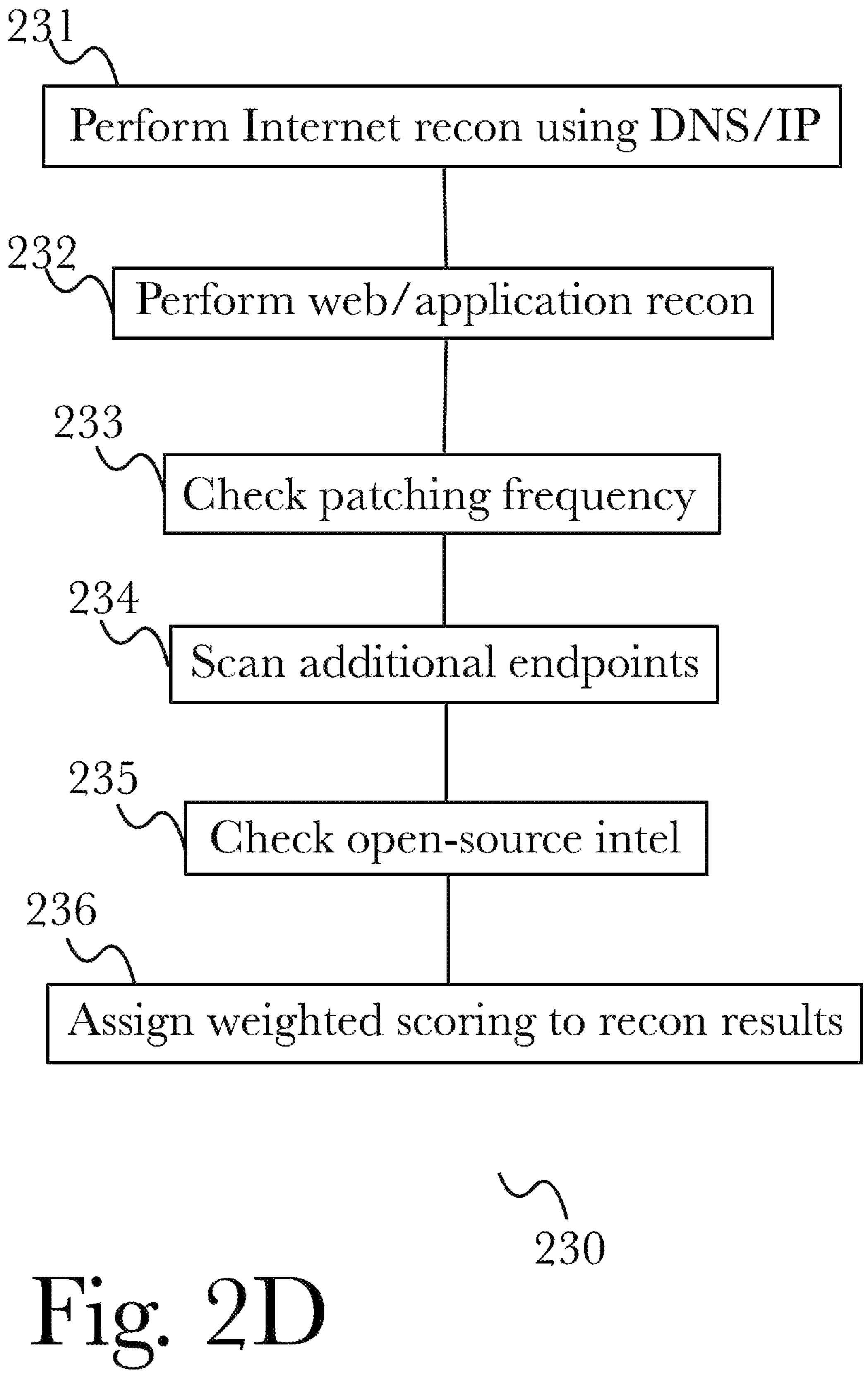
FIG. 2D is a process diagram showing a general flow of a process for producing a cybersecurity rating using reconnaissance data.

FIG. 2D is a process diagram showing a general flow of a process 230 for producing a cybersecurity rating using reconnaissance data. In an initial step 231, external reconnaissance may be performed using DNS and IP information as described above (referring to FIG. 2B), collecting information from DNS records, leak announcements, and publicly-available records to produce a DNS trust map from collected information and the DCG-driven analysis thereof. In a next step 232, web and application recon may be performed (as described in FIG. 2C), collecting information on applications, sites, and publicly-available records. In a next step 233, collected information over time may be analyzed for software version numbers, revealing the patching frequency of target hosts and their respective applications and services. Using a hybrid time-series graph, timestamps may be associated with ongoing changes to reveal these updates over time. In a next step 234, a plurality of additional endpoints may be scanned, such as (for example, including but not limited to) internet-of-things (IOT) devices that may be scanned and fingerprinted, end-user devices such as personal smartphones, tablets, or computers, or social network endpoints such as scraping content from user social media pages or feeds. User devices may be fingerprinted and analyzed similar to organization hosts, and social media content may be retrieved such as collecting sentiment from services like TWITTER™ or LINKEDIN™, or analyzing job description listings and other publicly-available information. In a next step 235, open-source intelligence feeds may be checked, such as company IP address blacklists, search domains, or information leaks (for example, posted to public records such as PASTEBIN™). In a final step 236, collected information from all sources may be scored according to a weighted system, producing an overall cybersecurity rating score based on the information collected and the analysis of that information to reveal additional insights, relationships, and vulnerabilities.

For example, in an exemplary scoring system similar to a credit rating, information from initial Internet recon operations may be assigned a score up to 400 points, along with up to 200 additional points for web/application recon results, 100 points for patch frequency, and 50 points each for additional endpoints and open-source intel results. This yields a weighted score incorporating all available information from all scanned sources, allowing a meaningful and readily-appreciable representation of an organization's overall cybersecurity strength. Additionally, as scanning may be performed repeatedly and results collected into a time-series hybrid data structure, this cybersecurity rating may evolve over time to continuously reflect the current state of the organization, reflecting any recent changes, newly-discovered or announced vulnerabilities, software or hardware updates, newly-added or removed devices or services, and any other changes that may occur.

Figure 3A:
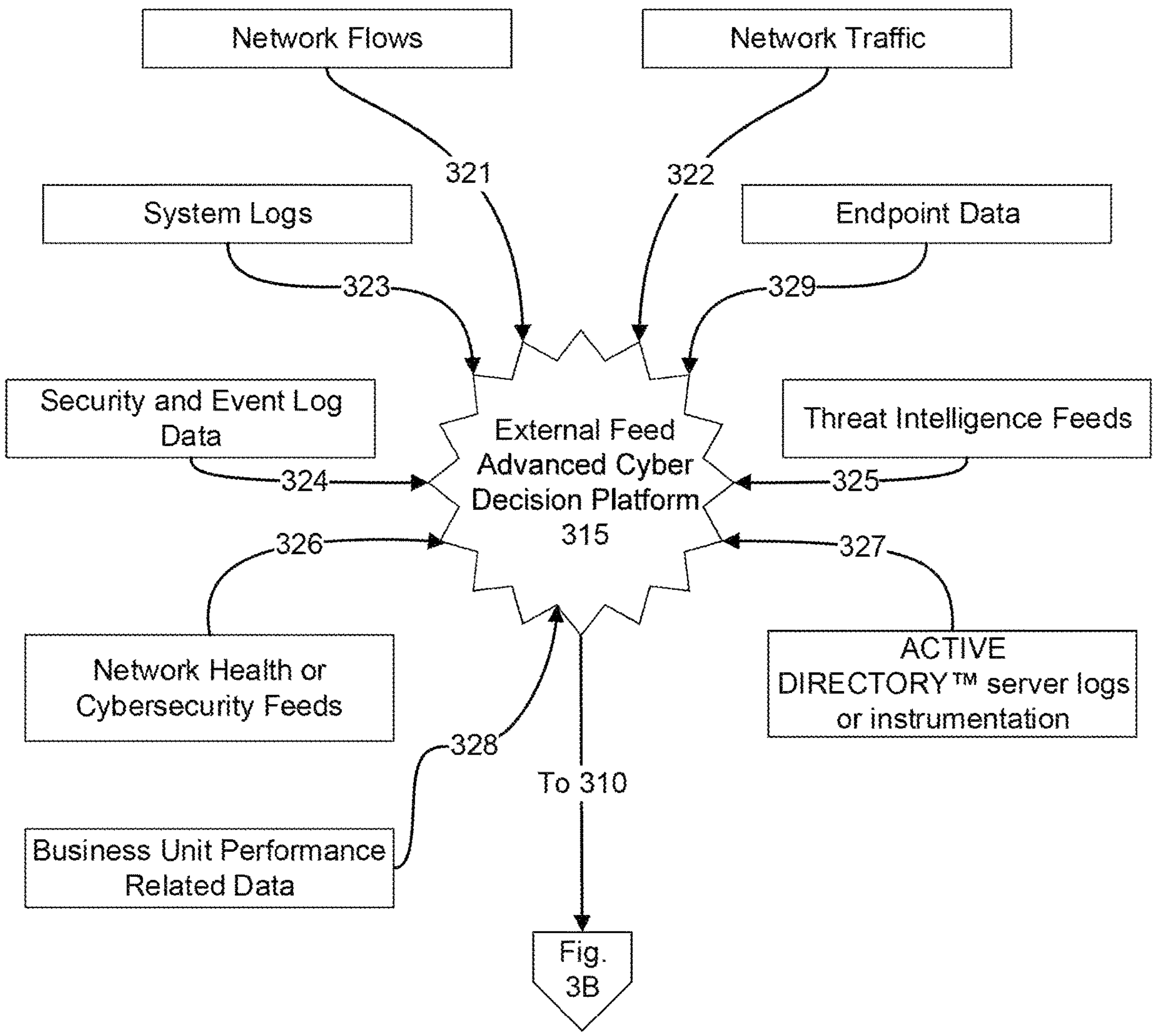
FIGS. 3A and 3B are process diagrams showing business operating system functions in use to mitigate cyberattacks.
Figure 3B:
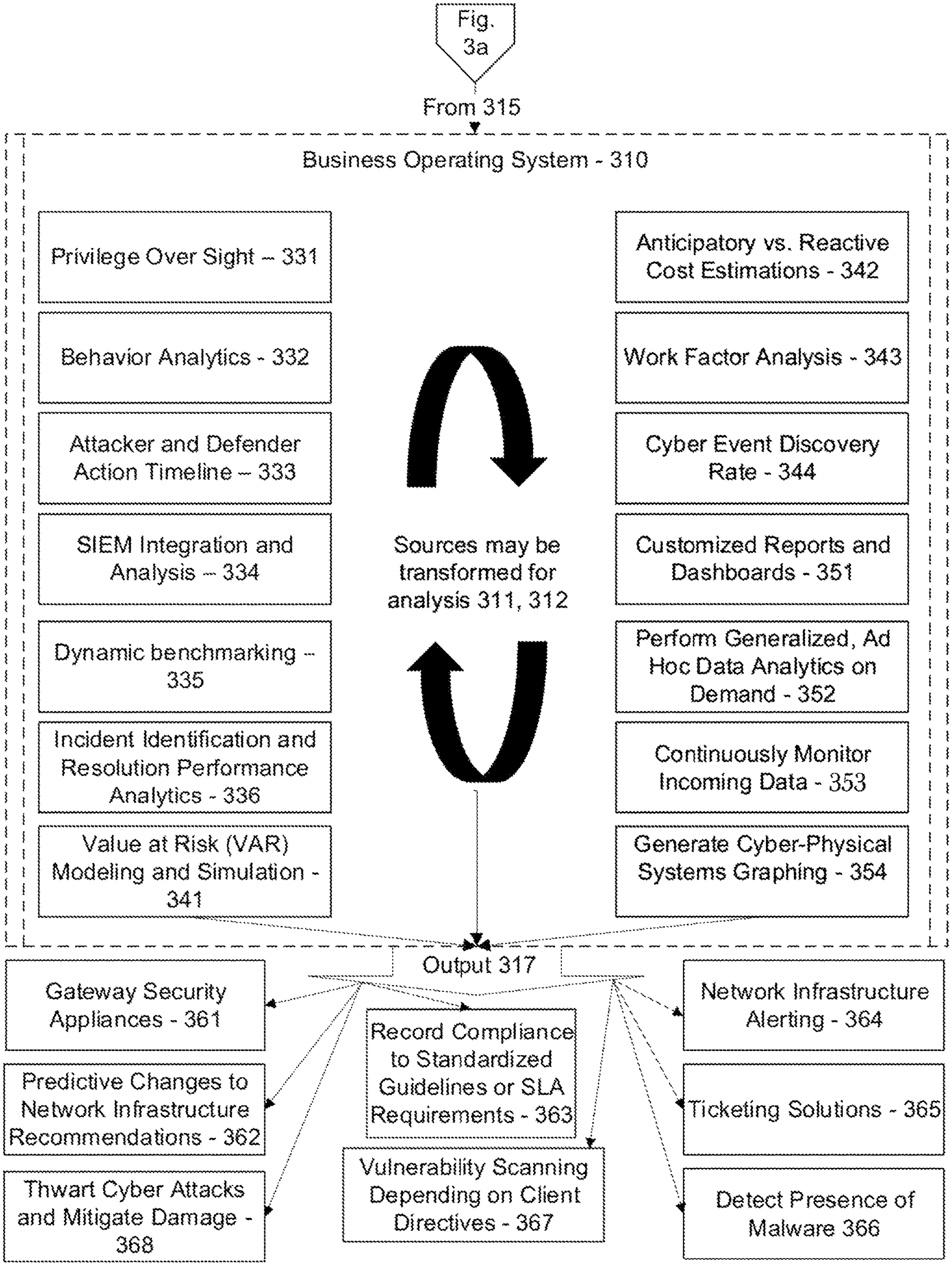

FIGS. 3A and 3B are process diagrams showing further detail regarding the operation of the advanced cyber decision platform. Input network data which may include network flow patterns 321, the origin and destination of each piece of measurable network traffic 322, system logs from servers and workstations on the network 323, endpoint data 329, any security event log data from servers or available security information and event (SIEM) systems 324, external threat intelligence feeds 324, identity or assessment context 325, external network health or cybersecurity feeds 326, Kerberos domain controller or ACTIVE DIRECTORY™ server logs or instrumentation 327, business unit performance related data 328, endpoint data 329, among many other possible data types for which the invention was designed to analyze and integrate, may pass into 315 the advanced cyber decision platform 310 for analysis as part of its cyber security function. These multiple types of data from a plurality of sources may be transformed for analysis 311, 312 using at least one of the specialized cybersecurity, risk assessment or common functions of the advanced cyber decision platform in the role of cybersecurity system, such as, but not limited to network and system user privilege oversight 331, network and system user behavior analytics 332, attacker and defender action timeline 333, SIEM integration and analysis 334, dynamic benchmarking 335, and incident identification and resolution performance analytics

336 among other possible cybersecurity functions; value at risk (VAR) modeling and simulation 341, anticipatory vs. reactive cost estimations of different types of data breaches to establish priorities 342, work factor analysis 343 and cyber event discovery rate 344 as part of the system's risk analytics capabilities; and the ability to format and deliver customized reports and dashboards 351, perform generalized, ad hoc data analytics on demand 352, continuously monitor, process and explore incoming data for subtle changes or diffuse informational threads 353 and generate cyber-physical systems graphing 354 as part of the advanced cyber decision platform's common capabilities. Output 317 can be used to configure network gateway security appliances 361, to assist in preventing network intrusion through predictive change to infrastructure recommendations 362, to alert an enterprise of ongoing cyberattack early in the attack cycle, possibly thwarting it but at least mitigating the damage 362, to record compliance to standardized guidelines or SLA requirements 363, to continuously probe existing network infrastructure and issue alerts to any changes which may make a breach more likely 364, suggest solutions to any domain controller ticketing weaknesses detected 365, detect presence of malware 366, perform one time or continuous vulnerability scanning depending on client directives 367, and thwart or mitigate damage from cyber-attacks 368. These examples are, of course, only a subset of the possible uses of the system, they are exemplary in nature and do not reflect any boundaries in the capabilities of the invention.

Figure 4:
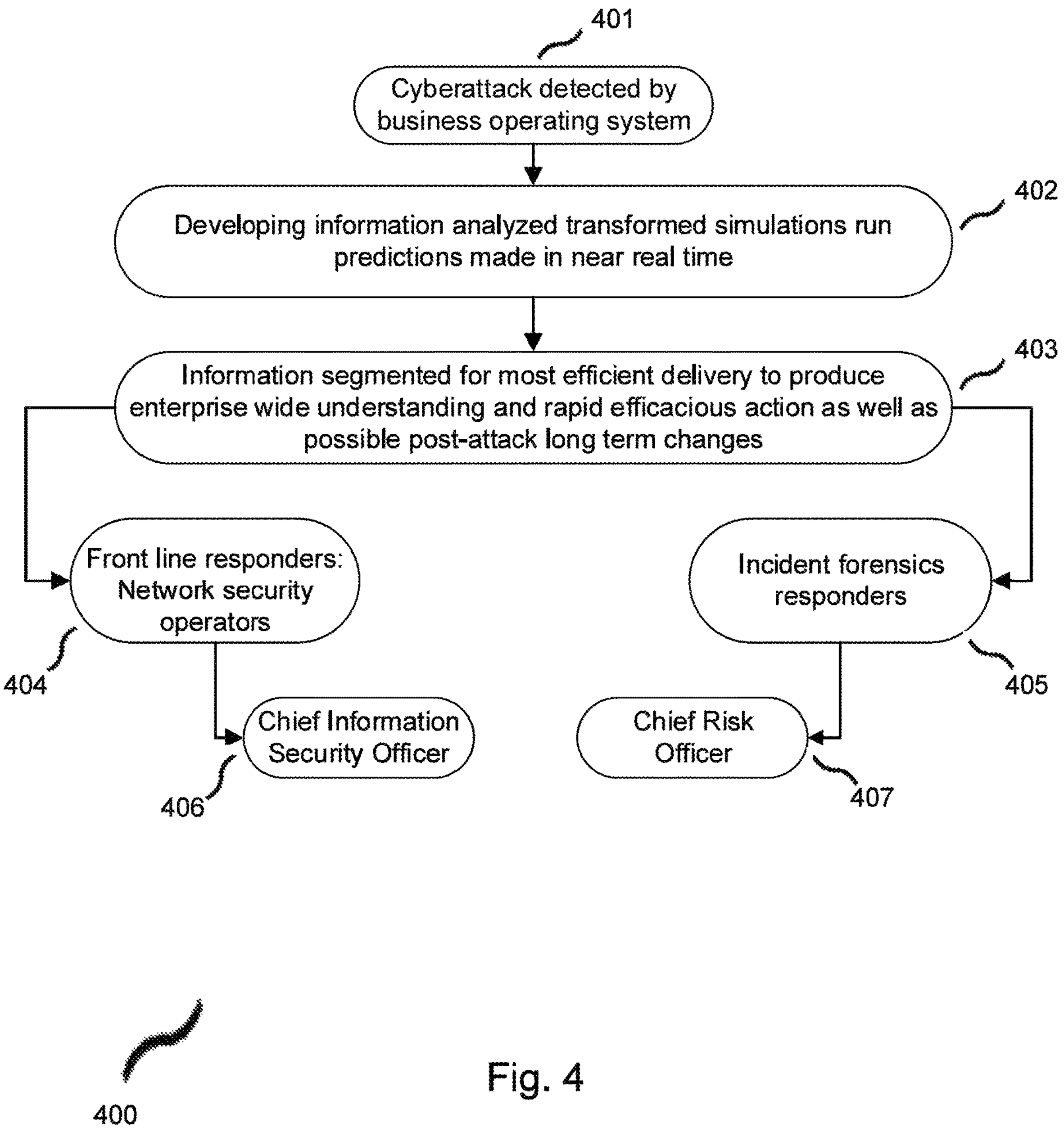
FIG. 4 is a process flow diagram of a method for segmenting cyberattack information to appropriate corporation parties.

FIG. 4 is a process flow diagram of a method for segmenting cyberattack information to appropriate corporation parties 400. As previously disclosed 200, 351, one of the strengths of the advanced cyber-decision platform is the ability to finely customize reports and dashboards to specific audiences, concurrently is appropriate. This customization is possible due to the devotion of a portion of the business operating system's programming specifically to outcome presentation by modules which include the observation and state estimation service 140 with its game engine 140*a* and script interpreter 140*b*. In the setting of cybersecurity, issuance of specialized alerts, updates and reports may significantly assist in getting the correct mitigating actions done in the most timely fashion while keeping all participants informed at predesignated, appropriate granularity. Upon the detection of a cyberattack by the system 401 all available information about the ongoing attack and existing cybersecurity knowledge are analyzed, including through predictive simulation in near real time 402 to develop both the most accurate appraisal of current events and actionable recommendations concerning where the attack may progress and how it may be mitigated. The information generated in totality is often more than any one group needs to perform their mitigation tasks. At this point, during a cyberattack, providing a single expansive and all-inclusive alert, dashboard image, or report may make identification and action upon the crucial information by each participant more difficult, therefore the cybersecurity focused arrangement may create multiple targeted information streams each concurrently designed to produce most rapid and efficacious action throughout the enterprise during the attack and issue follow-up reports with and recommendations or information that may lead to long term changes afterward 403. Examples of groups that may receive specialized information streams include but may not be limited to front line responders during the attack 404, incident forensics support both during and after the attack 405, chief information security officer 406 and chief risk officer 407 the information sent to the latter two focused to appraise overall damage and to implement both mitigating strategy and preventive changes after the attack. Front line responders may use the cyber-decision platform's analyzed, transformed and correlated information specifically sent to them 404 to probe the extent of the attack, isolate such things as: the predictive attacker's entry point onto the enterprise's network, the systems involved or the predictive ultimate targets of the attack and may use the simulation capabilities of the system to investigate alternate methods of successfully ending the attack and repelling the attackers in the most efficient manner, although many other queries known to those skilled in the art are also answerable by the invention. Simulations run may also include the predictive effects of any attack mitigating actions on normal and critical operation of the enterprise's IT systems and corporate users. Similarly, a chief information security officer may use the cyber-decision platform to predictively analyze 406 what corporate information has already been compromised, predictively simulate the ultimate information targets of the attack that may or may not have been compromised and the total impact of the attack what can be done now and in the near future to safeguard that information. Further, during retrospective forensic inspection of the attack, the forensic responder may use the cyber-decision platform 405*a* to clearly and completely map the extent of network infrastructure through predictive simulation and large volume data analysis. The forensic analyst may also use the platform's capabilities to perform a time series and infrastructural spatial analysis of the attack's progression with methods used to infiltrate the enterprise's subnets and servers. Again, the chief risk officer would perform analyses of what information 407*a* was stolen and predictive simulations on what the theft means to the enterprise as time progresses. Additionally, the system's predictive capabilities may be employed to assist in creation of a plan for changes of the IT infrastructure that should be made that are optimal for remediation of cybersecurity risk under possibly limited enterprise budgetary constraints in place at the company so as to maximize financial outcome.

Figure 5:
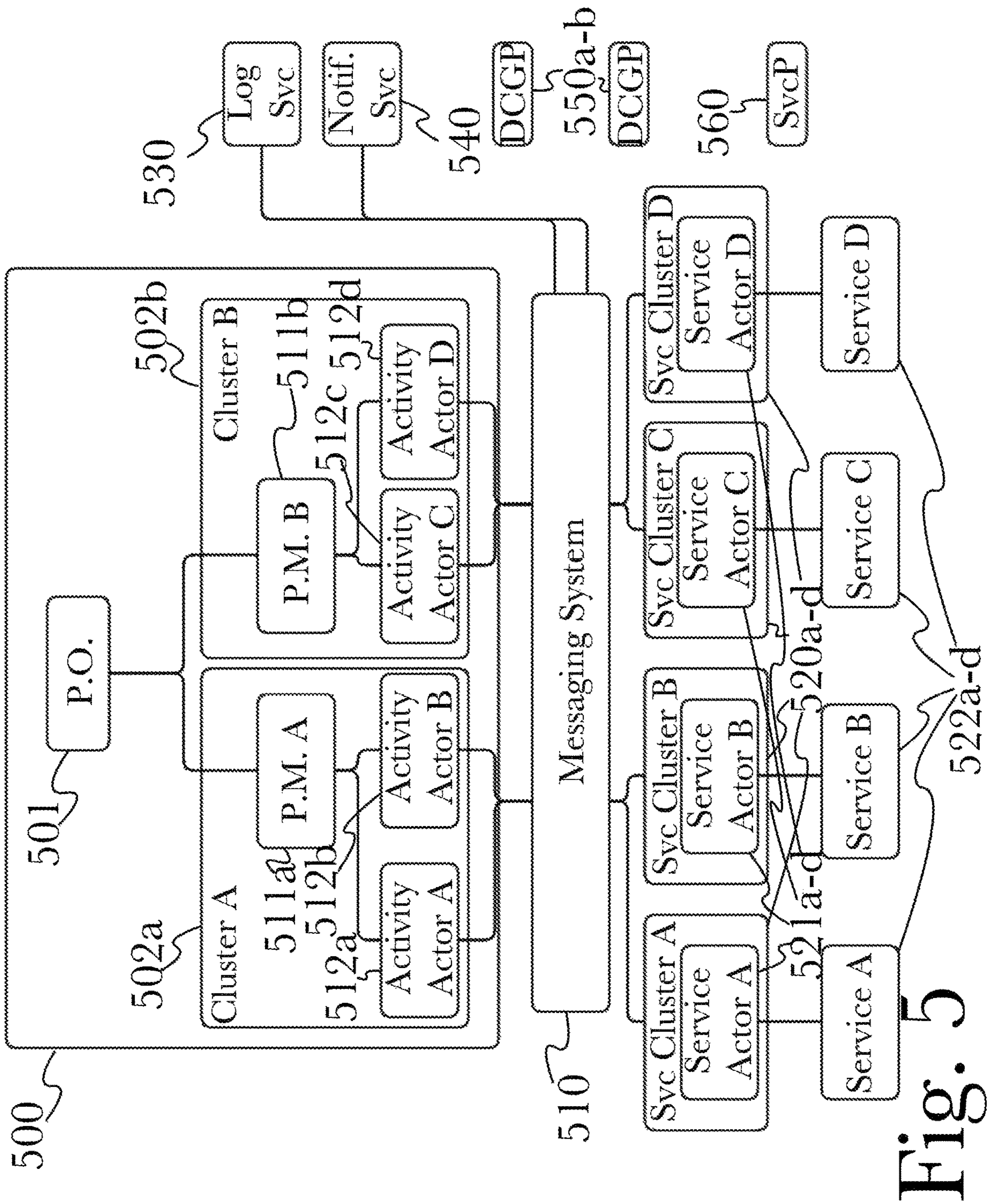
FIG. 5 is a diagram of an exemplary architecture for a system for rapid predictive analysis of very large data sets using an actor-driven distributed computational graph, according to one aspect.

FIG. 5 is a diagram of an exemplary architecture for a system for rapid predictive analysis of very large data sets using an actor-driven distributed computational graph 500, according to one aspect. According to the aspect, a DCG 500 may comprise a pipeline orchestrator 501 that may be used to perform a variety of data transformation functions on data within a processing pipeline, and may be used with a messaging system 510 that enables communication with any number of various services and protocols, relaying messages and translating them as needed into protocol-specific API system calls for interoperability with external systems (rather than requiring a particular protocol or service to be integrated into a DCG 500).

Pipeline orchestrator 501 may spawn a plurality of child pipeline clusters 502*a-b*, which may be used as dedicated workers for streamlining parallel processing. In some arrangements, an entire data processing pipeline may be passed to a child cluster 502*a* for handling, rather than individual processing tasks, enabling each child cluster 502*a-b* to handle an entire data pipeline in a dedicated fashion to maintain isolated processing of different pipelines using different cluster nodes 502*a-b*. Pipeline orchestrator 501 may provide a software API for starting, stopping, submitting, or saving pipelines. When a pipeline is started, pipeline orchestrator 501 may send the pipeline information to an available worker node 502*a-b*, for example using AKKA™ clustering. For each pipeline initialized by pipeline orchestrator 501, a reporting object with status information may be maintained. Streaming activities may report the last time an event was processed, and the number of events processed. Batch activities may report status messages as they occur. Pipeline orchestrator 501 may perform batch caching using, for example, an IGFS™ caching filesystem. This allows activities 512a-d within a pipeline 502a-b to pass data contexts to one another, with any necessary parameter configurations.

A pipeline manager 511a-b may be spawned for every new running pipeline, and may be used to send activity, status, lifecycle, and event count information to the pipeline orchestrator 501. Within a particular pipeline, a plurality of activity actors 512a-d may be created by a pipeline manager 511a-b to handle individual tasks, and provide output to data services 522a-d. Data models used in a given pipeline may be determined by the specific pipeline and activities, as directed by a pipeline manager 511a-b. Each pipeline manager 511a-b controls and directs the operation of any activity actors 512a-d spawned by it. A pipeline process may need to coordinate streaming data between tasks. For this, a pipeline manager 511a-b may spawn service connectors to dynamically create TCP connections between activity instances 512a-d. Data contexts may be maintained for each individual activity 512a-d, and may be cached for provision to other activities 512a-d as needed. A data context defines how an activity accesses information, and an activity 512a-d may process data or simply forward it to a next step. Forwarding data between pipeline steps may route data through a streaming context or batch context.

A client service cluster 530 may operate a plurality of service actors 521a-d to serve the requests of activity actors 512a-d, ideally maintaining enough service actors 521a-d to support each activity per the service type. These may also be arranged within service clusters 520a-d, in a manner similar to the logical organization of activity actors 512a-d within clusters 502a-b in a data pipeline. A logging service 530 may be used to log and sample DCG requests and messages during operation while notification service 540 may be used to receive alerts and other notifications during operation (for example to alert on errors, which may then be diagnosed by reviewing records from logging service 530), and by being connected externally to messaging system 510, logging and notification services can be added, removed, or modified during operation without impacting DCG 500. A plurality of DCG protocols 550a-b may be used to provide structured messaging between a DCG 500 and messaging system 510, or to enable messaging system 510 to distribute DCG messages across service clusters 520a-d as shown. A service protocol 560 may be used to define service interactions so that a DCG 500 may be modified without impacting service implementations. In this manner it can be appreciated that the overall structure of a system using an actor-driven DCG 500 operates in a modular fashion, enabling modification and substitution of various components without impacting other operations or requiring additional reconfiguration.

Figure 6:
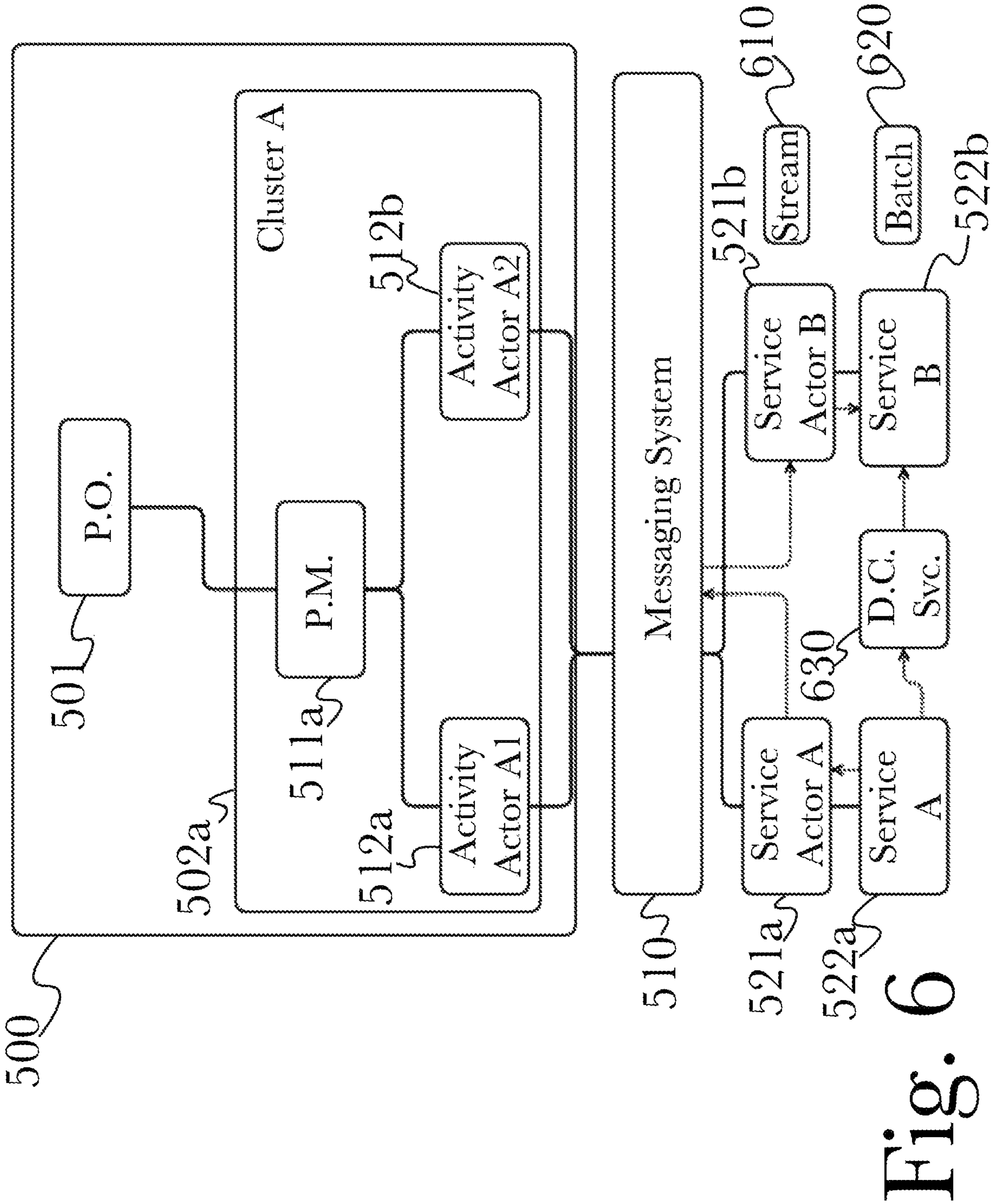
FIG. 6 is a diagram of an exemplary architecture for a system for rapid predictive analysis of very large data sets using an actor-driven distributed computational graph, according to one aspect.

FIG. 6 is a diagram of an exemplary architecture for a system for rapid predictive analysis of very large data sets using an actor-driven distributed computational graph 500, according to one aspect. According to the aspect, a variant messaging arrangement may utilize messaging system 510 as a messaging broker using a streaming protocol 610, transmitting and receiving messages immediately using messaging system 510 as a message broker to bridge communication between service actors 521a-b as needed. Alternately, individual services 522a-b may communicate directly in a batch context 620, using a data context service 630 as a broker to batch-process and relay messages between services 522a-b.

Figure 7:
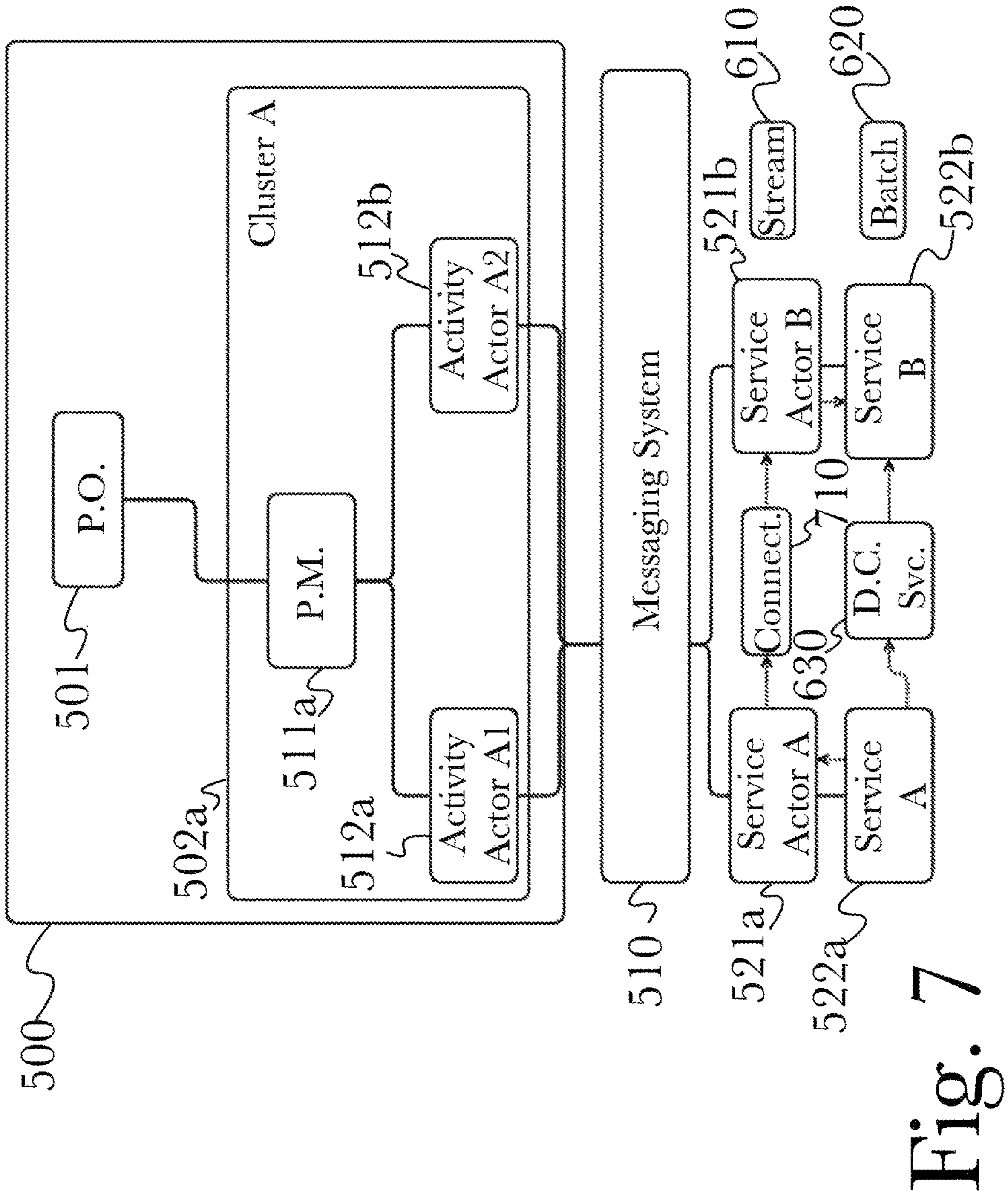
FIG. 7 is a diagram of an exemplary architecture for a system for rapid predictive analysis of very large data sets using an actor-driven distributed computational graph, according to one aspect.

FIG. 7 is a diagram of an exemplary architecture for a system for rapid predictive analysis of very large data sets using an actor-driven distributed computational graph 500, according to one aspect. According to the aspect, a variant messaging arrangement may utilize a service connector 710 as a central message broker between a plurality of service actors 521a-b, bridging messages in a streaming context 610 while a data context service 630 continues to provide direct peer-to-peer messaging between individual services 522a-b in a batch context 620.

It should be appreciated that various combinations and arrangements of the system variants described above (referring to FIGS. 1-7) may be possible, for example using one particular messaging arrangement for one data pipeline directed by a pipeline manager 511a-b, while another pipeline may utilize a different messaging arrangement (or may not utilize messaging at all). In this manner, a single DCG 500 and pipeline orchestrator 501 may operate individual pipelines in the manner that is most suited to their particular needs, with dynamic arrangements being made possible through design modularity as described above in FIG. 5.

Figure 19:
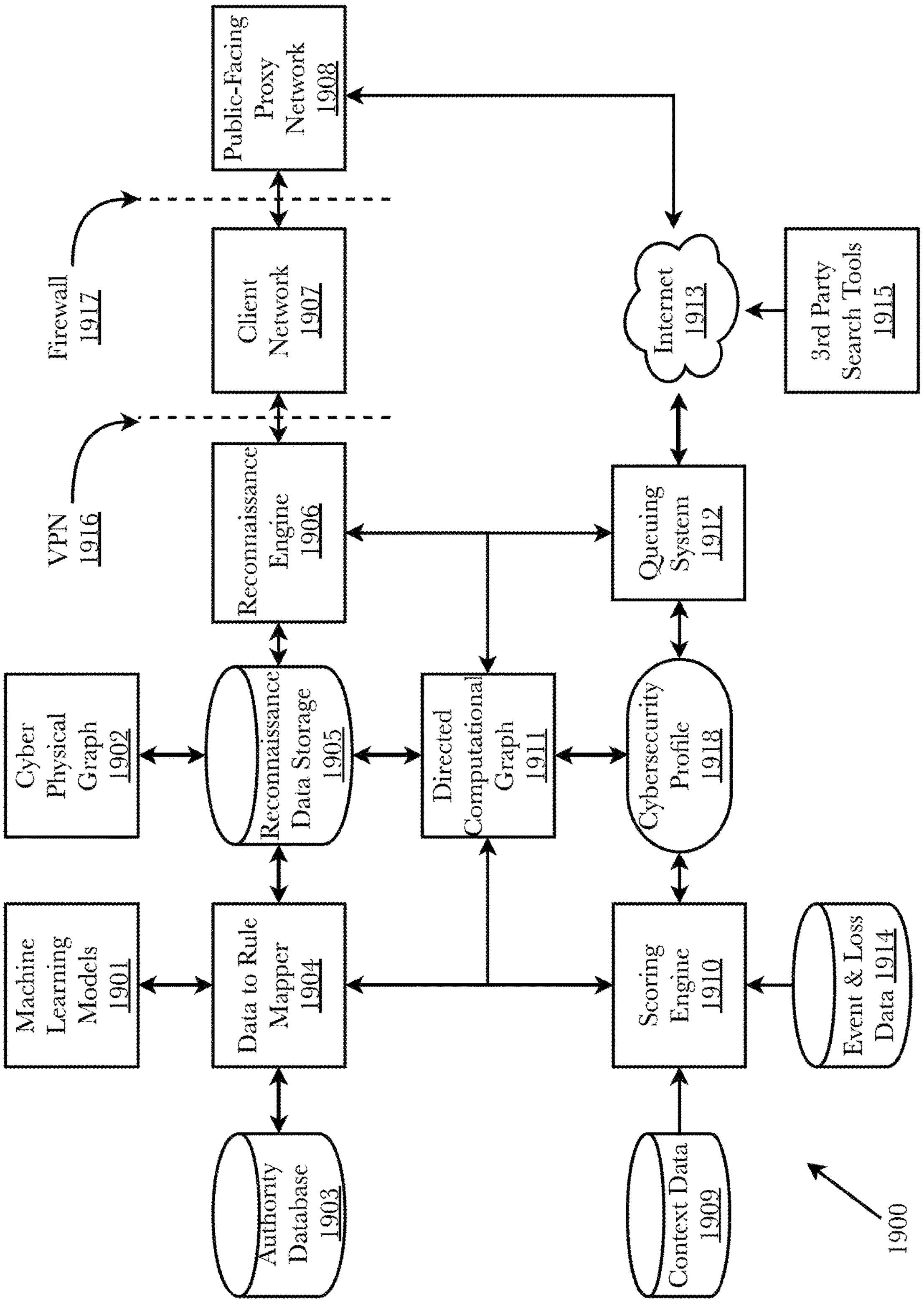
FIG. 19 is a block diagram showing an exemplary system architecture for a system for cybersecurity profiling and rating.

FIG. 19 is block diagram showing an exemplary system architecture 1900 for a system for cybersecurity profiling and rating. The system in this example contains a cyber-physical graph 1902 which is used to represent a complete picture of an organization's infrastructure and operations including, importantly, the organization's computer network infrastructure particularly around system configurations that influence cybersecurity protections and resiliency. The system further contains a directed computational graph 1911, which contains representations of complex processing pipelines and is used to control workflows through the system such as determining which 3$^{rd}$ party search tools 1915 to use, assigning search tasks, and analyzing the cyber-physical graph 1902 and comparing results of the analysis against reconnaissance data received from the reconnaissance engine 1906 and stored in the reconnaissance data storage 1905. In some embodiments, the determination of which 3$^{rd}$ party search tools 1915 to use and assignment of search tasks may be implemented by a reconnaissance engine 1906. The cyber-physical graph 1902 plus the analyses of data directed by the directed computational graph on the reconnaissance data received from the reconnaissance engine 1906 are combined to represent the cyber-security profile of the client organization whose network 1907 is being evaluated. A queuing system 1912 is used to organize and schedule the search tasks requested by the reconnaissance engine 1906. A data to rule mapper 1904 is used to retrieve laws, policies, and other rules from an authority database 1903 and compare reconnaissance data received from the reconnaissance engine 1906 and stored in the reconnaissance data storage 1905 against the rules in order to determine whether and to what extent the data received indicates a violation of the rules. Machine learning models 1901 may be used to identify patterns and trends in any aspect of the system, but in this case are being used to identify patterns and trends in the data which would help the data to rule mapper 1904 determine whether and to what extent certain data indicate a violation of certain rules. A scoring engine 1910 receives the data analyses performed by the directed computational graph 1911, the output of the data to rule mapper 1904, plus event and loss data 1914 and contextual data 1909 which defines a context in which the other data are to be scored and/or rated. A public-facing proxy network 1908 is established outside of a firewall 1917 around the client network 1907 both to control access to the client network from the Internet 1913, and to provide the ability to change the outward presentation of the client network 1907 to the Internet 1913, which may affect the data obtained by the reconnaissance engine 1906. In some embodiments, certain components of the system may operate outside the client network 1907 and may access the client network through a secure, encrypted virtual private network (VPN) 1916, as in a cloud-based or platform-as-a-service implementation, but in other embodiments some or all of these components may be installed and operated from within the client network 1907.

As a brief overview of operation, information is obtained about the client network 1907 and the client organization's operations, which is used to construct a cyber-physical graph 1902 representing the relationships between devices, users, resources, and processes in the organization, and contextualizing cybersecurity information with physical and logical relationships that represent the flow of data and access to data within the organization including, in particular, network security protocols and procedures. The directed computational graph 1911 containing workflows and analysis processes, selects one or more analyses to be performed on the cyber-physical graph 1902. Some analyses may be performed on the information contained in the cyber-physical graph, and some analyses may be performed on or against the cyber-physical graph using information obtained from the Internet 1913 from reconnaissance engine 1906. The workflows contained in the directed computational graph 1911 select one or more search tools to obtain information about the organization from the Internet 1915, and may comprise one or more third party search tools 1915 available on the Internet. As data are collected, they are fed into a reconnaissance data storage 1905, from which they may be retrieved and further analyzed. Comparisons are made between the data obtained from the reconnaissance engine 1906, the cyber-physical graph 1902, the data to rule mapper, from which comparisons a cybersecurity profile of the organization is developed. The cybersecurity profile is sent to the scoring engine 1910 along with event and loss data 1914 and context data 1909 for the scoring engine 1910 to develop a score and/or rating for the organization that takes into consideration both the cybersecurity profile, context, and other information.

Figure 24:
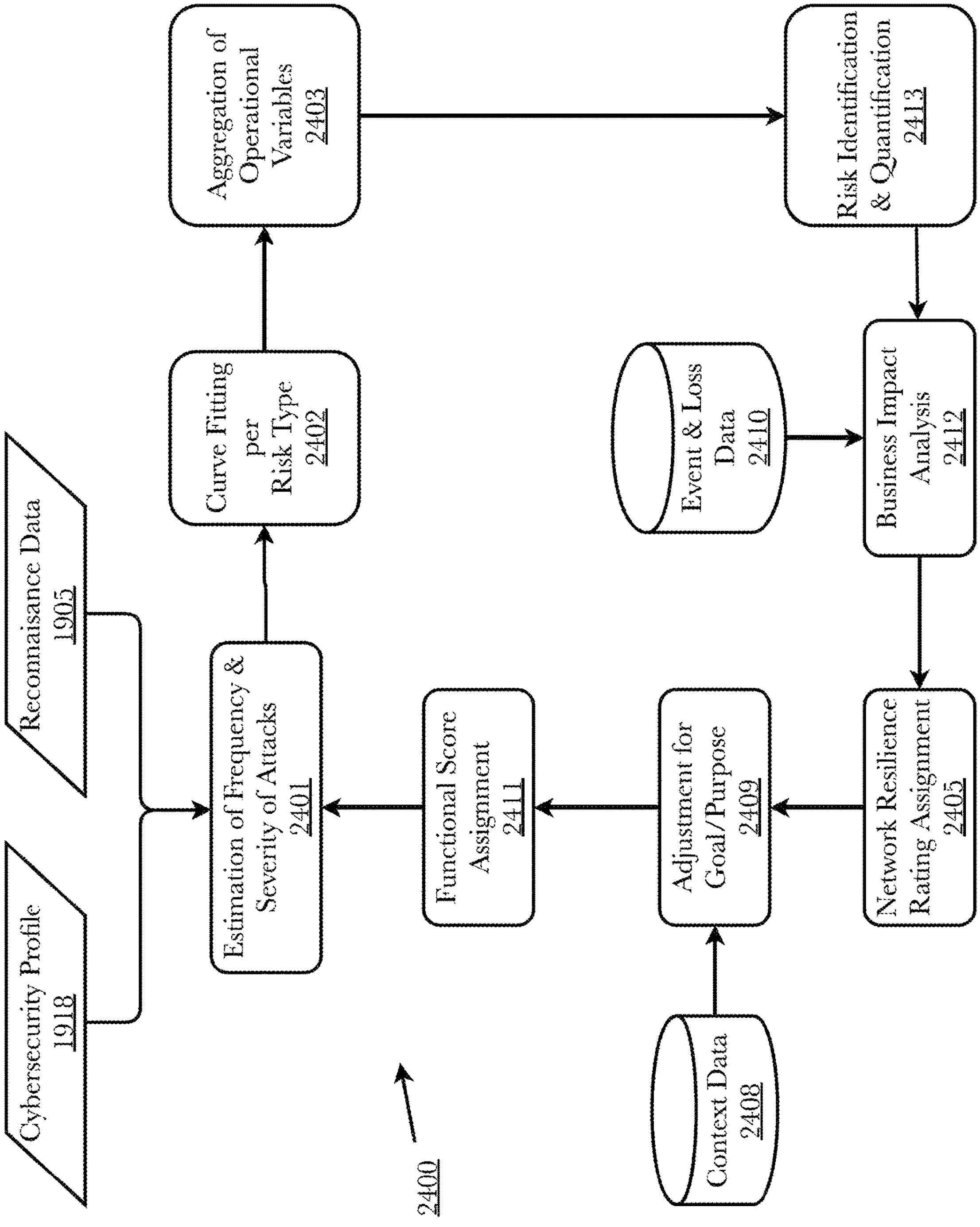
FIG. 24 is a block diagram showing an exemplary architecture diagram for a scoring engine.

FIG. 24 is a block diagram showing an exemplary architecture 2400 for a scoring engine. Data fed into the scoring engine comprise the cybersecurity profile 1918 and reconnaissance data 1905 developed at earlier stages of system operation. Based on these data, a frequency and severity of attack is estimated 2408. For each risk type, curve fitting 2402 may be performed on the data points to assign a "best fit" function along the range of data points, which captures trends in the data and allows for predictions of how similar data will behave in the future. Aggregations of operational variables 2403 may be applied to identify maxima, minima, counts, sums, and standard deviations of the data. Risk identification and quantification is then performed 2413, and a business impact analysis is performed 2412 based on a totality of the predicted risks, their severity, business dependencies reflected in the cyber-physical graph, and prior event and loss data 2410, among other variables. From this analysis of business impact 2412, a network resilience rating is assigned 2405, representing a weighted and adjusted total of relative exposure the organization has to various types of risks, each of which may be assigned a sub-rating. The network resilience rating 2405 may be a single score for all factors, a combination of scores, or a score for a particular risk or area of concern. The network resilience rating 2411 may then be adjusted or filtered depending on the context in which it is to be used 2409. For example, context data received 2408 may indicate that the scores are to be used for compliance with internal theft policies, but the factors associated with the network resilience rating indicate that the highest risks are associated with cyber-attacks from external systems, which may cause the adjustment for goal/purpose 2409 to filter out the factors of the network resilience rating associated with risks from external cyber-attacks or reduce their contribution to a functional score. Finally, a functional cybersecurity score 2411 is assigned which takes into account the adjusted factors of the network resilience score and the context in which the functional score is to be applied. The process may be iterative, in that the network resilience rating 2405 from previous analyses may be fed back into the start of the process at estimation of frequency and severity of attacks 2401.

Figure 25:
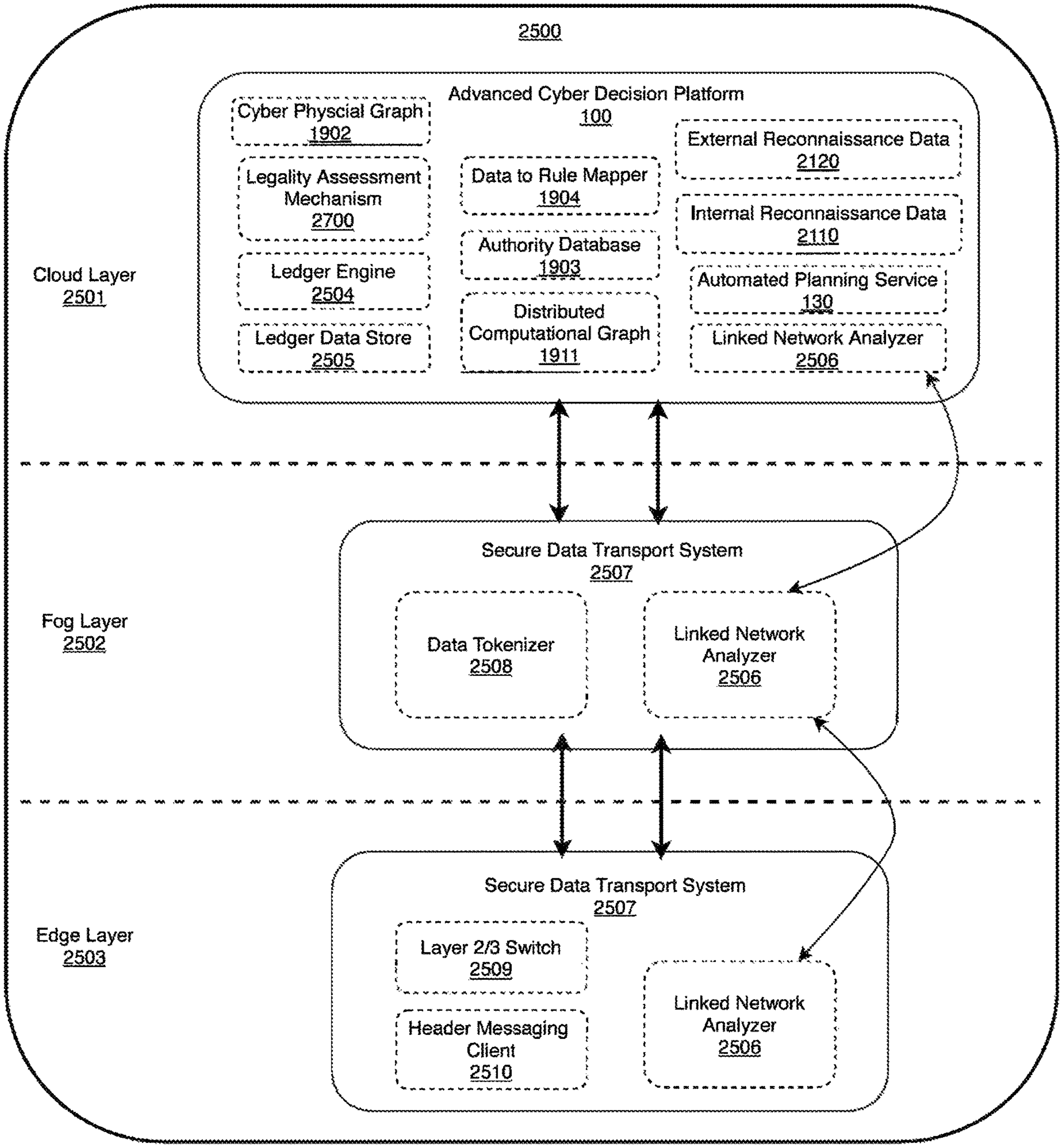
FIG. 25 is a block diagram of an exemplary architecture of an auditable policy-compliance platform.

FIG. 25 is a block diagram showing an exemplary architecture of an auditable policy-compliant processing and transport system 2500. In one such embodiment, a request for regulated data is created on an edge computing device, such as a network node in a secure data transport system 2507, in the edge layer 2503. In the cloud layer 2501, an advanced cyber decision platform (ACDP) 100 comprised of a ledger engine 2504 begins the immediate cataloging of all the data request's associated metadata into a ledger data store 2505 from a multitude of network data sources such as internal reconnaissance data 2110, external reconnaissance data 2120, and linked network analyzers 2506. Linked network analyzers 2506 may include, but are not limited to, physical or virtual terminal access points (TAP) such as Azure virtual network TAP™, Gigamon Visibility and Analytics Fabric™, or Zeek™ for roles such as analyzing, monitoring, and optimizing network traffic. In this example, the linked network analyzers 2506 are a contiguous web of sensors that continuously monitor and report on all transactions regarding data requests to the ledger engine 2504. The metadata gathered by the ledger engine 2504 may be comprised of administrative metadata (rights and reproduction tracking, legal access requirements, location information), descriptive metadata (version differentiation, hyperlinked relationships, annotations), preservation metadata (changes during digitization, data refreshing, data migration), technical metadata (hardware and software versions, formats, compression ratios, security data), and use metadata (circulation records, reuse and multi-versioning information, searches and indexing). In the edge layer 2503, the header messaging client 2510, which is one variation of a data packet manager, manages data packets known in the art as protocol data units (PDU). In this case, the header messaging client 2510 connects with an authority database 1903 within the ACDP 100 to retrieve information pertaining to the restrictions of the data request. The authority database 1903 works in tandem with a data to rule mapper 1904 to send metadata attributes to a distributed computational graph 1911. The distributed computational graph 1911 uses nodes and edges known in the art of graph theory to provide vectorized data to the automated planning service 130. The automated planning service 130 utilizes technical metadata and the vectorized data to automatically decide on the most efficient policy compliant path for the data request. This path includes considering both hardware, software, and user access policy compliance. The computed path from the automated planning service 130 is directed to the data packet manager which adds instructional headers into the frame and packet layers of the PDU as a means for enforcing where computation or persistence may occur. The header messaging client 2510 then releases the PDU for transmission through the network. The frame is then read by layer 2 switches 2509 and the packet read by layer 3 switches 2509 which confirm authority to further process or transmit the PDU. The transactions occurring on the switches 2509 and routing pathways are monitored and sent to the ledger engine 2504 by the linked network analyzers 2506. A data tokenizer 2508 within the fog layer 2502 receives the data packets before further transmission to the cloud layer 2501 and algorithmically generates tokens replacing the sensitive data request. Upon the data request reaching the destination, the request is detokenized and processed. The auditable policy-compliant processing and transport system 2500 treats the return of data to the requester in the same manner using strict policy-controlled processing and comprehensive provenance logging. The system may further employ a legality assessment mechanism 2700 for enhanced policy compliance of data restrictions with regards to business and legal documents for risk mitigation, avoidance, and auditing.

Figure 26:
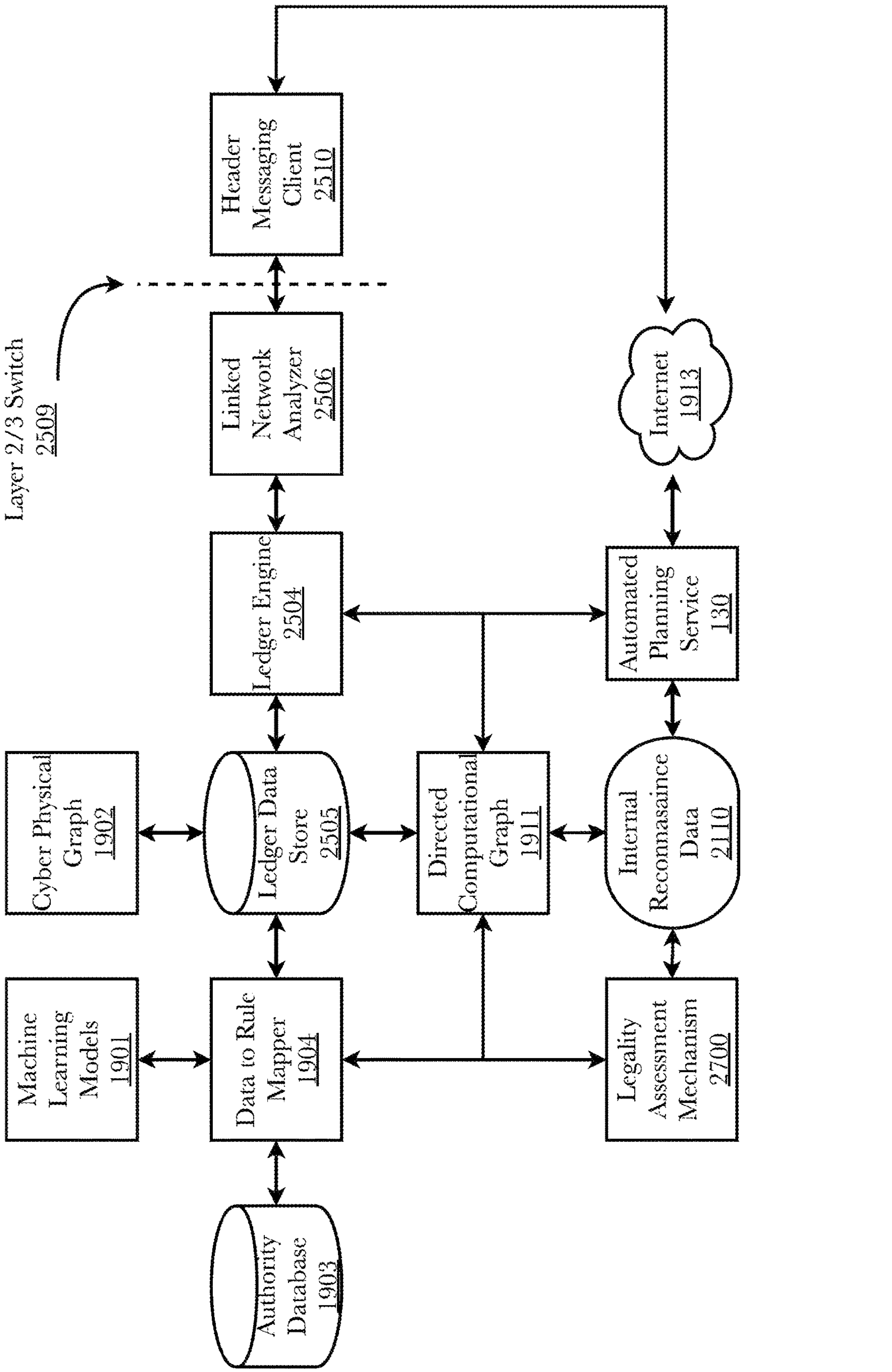
FIG. 26 is a block diagram showing an exemplary system architecture for an evidentiary compliant data provenance ledger system.

FIG. 26 is a block diagram showing an exemplary system architecture for an auditable compliance platform. The system in this example contains a header messaging client 2510 which establishes a request for regulated data through layer 2 and layer 3 switches 2509 connected to the Internet 1913. Internal/external reconnaissance data 2110/2120 provides persistent transactional metadata to the ledger engine 2504. The linked network analyzer 2506 continuously monitors and reports the real time pass-through traffic to the auditable compliance platform. A cyber-physical graph 1902 is used to represent a complete picture of the metadata and the relations between the mapped rules stored in the authority database 1903. This cyber-physical graph 1902 creates meaningful connections and relationships important to ascertaining data provenance such as source, destination, processing hardware, intermediate transformation steps, human/machine interactions, transmissions paths, use, cyberattacks, and access request information among others and provides vectorized data for fast computation to the automated planning service 130. The system further contains a directed computational graph 1911, when used in conjunction with the automated planning service 130, contains representations of complex processing pipelines and is used to control workflows through the system such as determining optimal policy compliant routing hardware, and analyzing the cyber-physical graph 1902 and comparing results of the analysis against ledger data received from the ledger engine 2504 and stored in the ledger data storage 2505. The directed computational graph 1911 in this example may also rely on a separate set of queries and rules to optionally balance record-level or object-level relationships consistent with well-known data access control techniques in the art. A data to rule mapper 1904 is used to retrieve laws, policies, and other rules from an authority database 1903 and compare ledger data received from the ledger engine 2504 and stored in the ledger data storage 2505 against the rules in order to determine whether and to what extent the data received indicates a violation of the rules. Furthermore, the data to rule mapper 1904 in sync with the legality assessment mechanism 2700 is used to provide the directed computational graph (DCG) 1911 with information in order to determine the impact and loss data due to irregular data sets. Machine learning models 1901 may be used to identify patterns and trends in any aspect of the system, but in this case are being used to identify patterns and trends in the data which would help the data to rule mapper 1904 determine whether and to what extent certain data indicate a violation of certain rules and to support the DCG in assessing the impact of the violations. The DCG 1911 in assessing impact and loss concerning irregular data sets directly provides resilience quantification and dependency analysis information upon demand.

Figure 27:
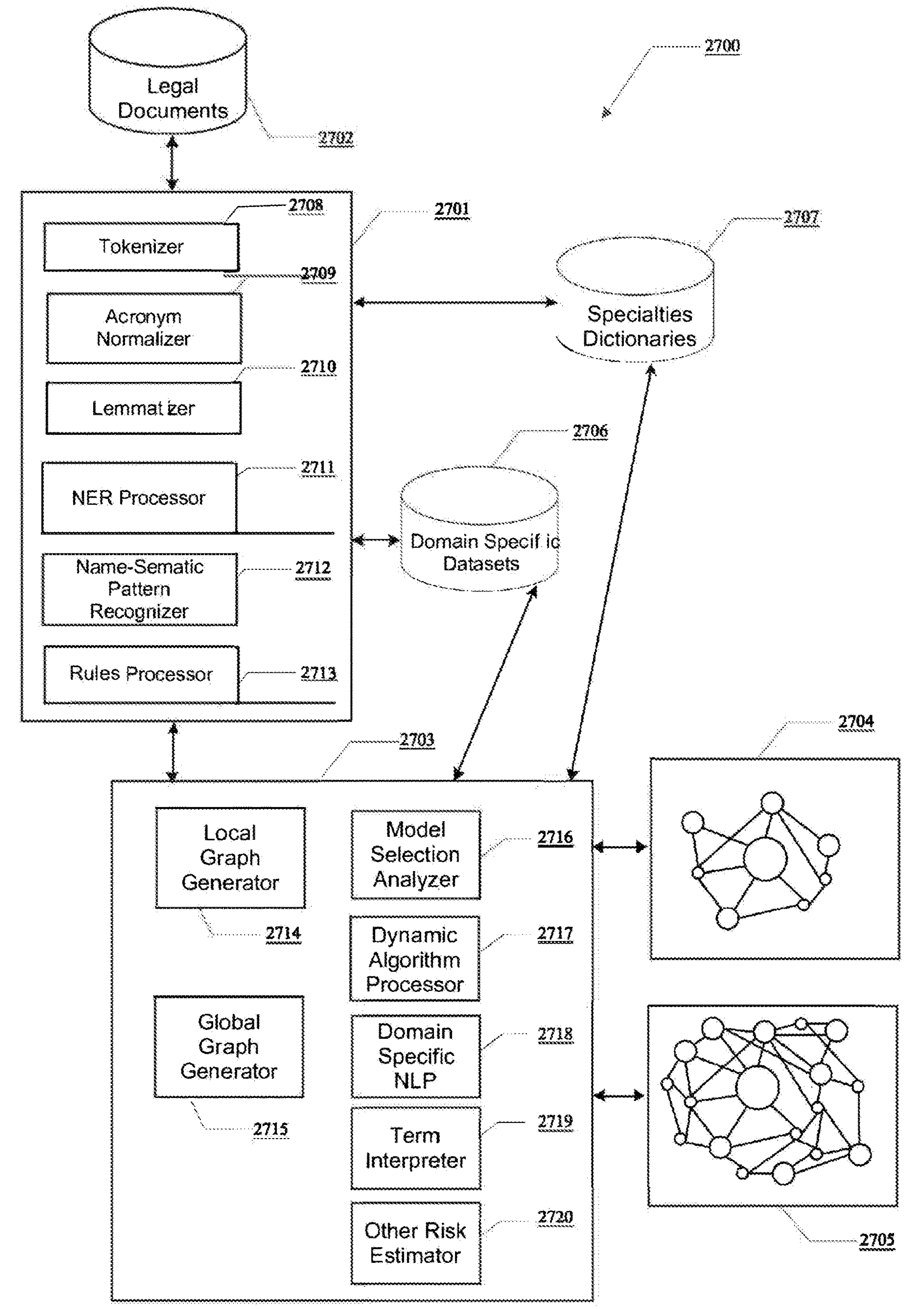
FIG. 27 is an architecture diagram illustrating an exemplary system for automated analysis of legal documents within and across different fields, according to aspect.

FIG. 27 is an architecture diagram illustrating an exemplary system 2700 for the legal assessment mechanism aspect of an auditable policy-compliant processing and transport system, as more fully described in co-pending application Ser. No. 16/654,309. The legal assessment mechanism 2700 comprises two main functions: a hierarchical extraction and semantification processor 2701 to identify, extract knowledge from data contained in legal documents 2702 and transform it into a common data form and an analyzer 2703 a development of the local 2704 and global knowledge graphs 2705 containing the key entities, relationships and concepts encoded in the text.

Extraction processor 2701 performs a set of systematic natural language processing (NLP)-based data extraction single-purpose generic micro-functions including Tokenizer 2708, Acronym Normalizer 2709, Lemmatizer 2710, Name Entity Recognizer (NER) 2711, pattern recognizer 2713, and a rules processor 2713. Tokenizer 2708, given a character sequence and a defined document unit, tokenizes the character sequence up into pieces, called tokens, and optionally discards certain characters such as punctuation. Acronym Normalizer 2709 transforms all acronyms found in the incoming legal documents into standard set of terms applicable to all the data regardless of source. Lemmatizer 2710 transforming language within the documents to properly use a vocabulary and morphological analysis of words, normally aiming to remove inflectional endings only, and to return the base or dictionary form of a word. Name Entity Recognizer (NER) 2711 identifies references to known people and entities within the documents, regardless of the form of the name. For example, reference to IBM or Apple and IBM Corp. and Apple Inc. will be identified as referring to the same respective entities. Similar variations in references to an individual's name, including use or omission of middle initials or Jr. Pattern recognizer 2712 performs other structured term-extraction features to document-wide semantic NLP pattern recognition macro-functions including sentiment and topic extraction, as well as targeted word/sentence clustering and information retrieval. Rules processor 2713 performs system and user defined data transformation and orchestration workflows.

The results of hierarchical extraction and semantification processor 2701 allow a model selection analyzer 2716, within analysis processor 2703, to perform dynamic model selection based on a series of more efficient classification types of algorithms which look at estimating the domain, age, legal jurisdictions, etc., associated with a document and applying relevant NER, gazetteers, and ontologies. This dynamic model selection enables a dynamic algorithm processor 2717 to effectively query a catalogue of available models 2706 and recommend an available model to best extract, parse, interpret, schematize, normalize, and then semantify the data with a specialized natural language processor 2718, term interpreter 2719, and risk estimator 2720. The recommended model may have been trained already or is dynamically trained on available source data and labels.

Domain specific NLP processor 2718 may feed legal and domain-specific technical data into workflows for both knowledge graph enrichment and dataset contextualization, together with a local and global graph generator 2714, 2715.

Such graph generators 2714, 2715 take data and the results of processes done by other components in an analysis processor 2716-2720 and may produce localized knowledge graphs for specific groups of data, or global graphs for wider ranges of data and graph-edges. These processes are only possible by using NLP-based tagging and mapping capabilities to provide a bridge between raw/semi-processed datasets and context-aware graph ontologies. Ultimately, the analysis processor 2703 continuously enhance these knowledge bases through feedback loops with new data from systematic events, so that the development of local 2704 and global knowledge graphs 2705 can be both informed by, and inform, the extraction and analysis processes.

System 2700 leverages the hierarchical extraction and semantification processor 2701 to map raw legal document data to our domain specific languages (DSL). Use of the DSLs allows for capturing individual different levels of granularity in the knowledge graphs 2704-2705 within specific investment products in legal, finance, or multi-level risk insurance policies. Within these DSLs, and at each of these levels, the analysis processor 2703 tags individual clauses or terms with contextual information, and flags problematic terms according to both endogenous ambiguity where historical information or legal precedent isn't accessible or existent, as well as exogenous risk dimensions that are specific to these industries.

Domain-language ambiguity is addressed by establishing an array of more clear-cut interpretations of a vague clause, using likelihood values that estimate a valuation distribution based on the document's language. Specific dictionaries 2707 for each legal specialty provide additional data and term definition for use in processing any particular legal document. System 2700 captures systemic risk changes through time-varying pattern analysis where the system can map a cross-sectional snapshot of the current state of the system's events, be it natural catastrophe incidents, political & market sentiment or regulatory and macro-prudential policy changes, to the clause or term affecting the valuation/pricing of a given product/policy. These approaches explore the state space of pricing/valuation possibilities with a dimensionality beyond what individual agents can scale to, utilizing rule-based thresholds to make efficient use of human capital to review a targeted subset of valuation or loss estimation results.

Detailed Description of Exemplary Aspects

Figure 8:
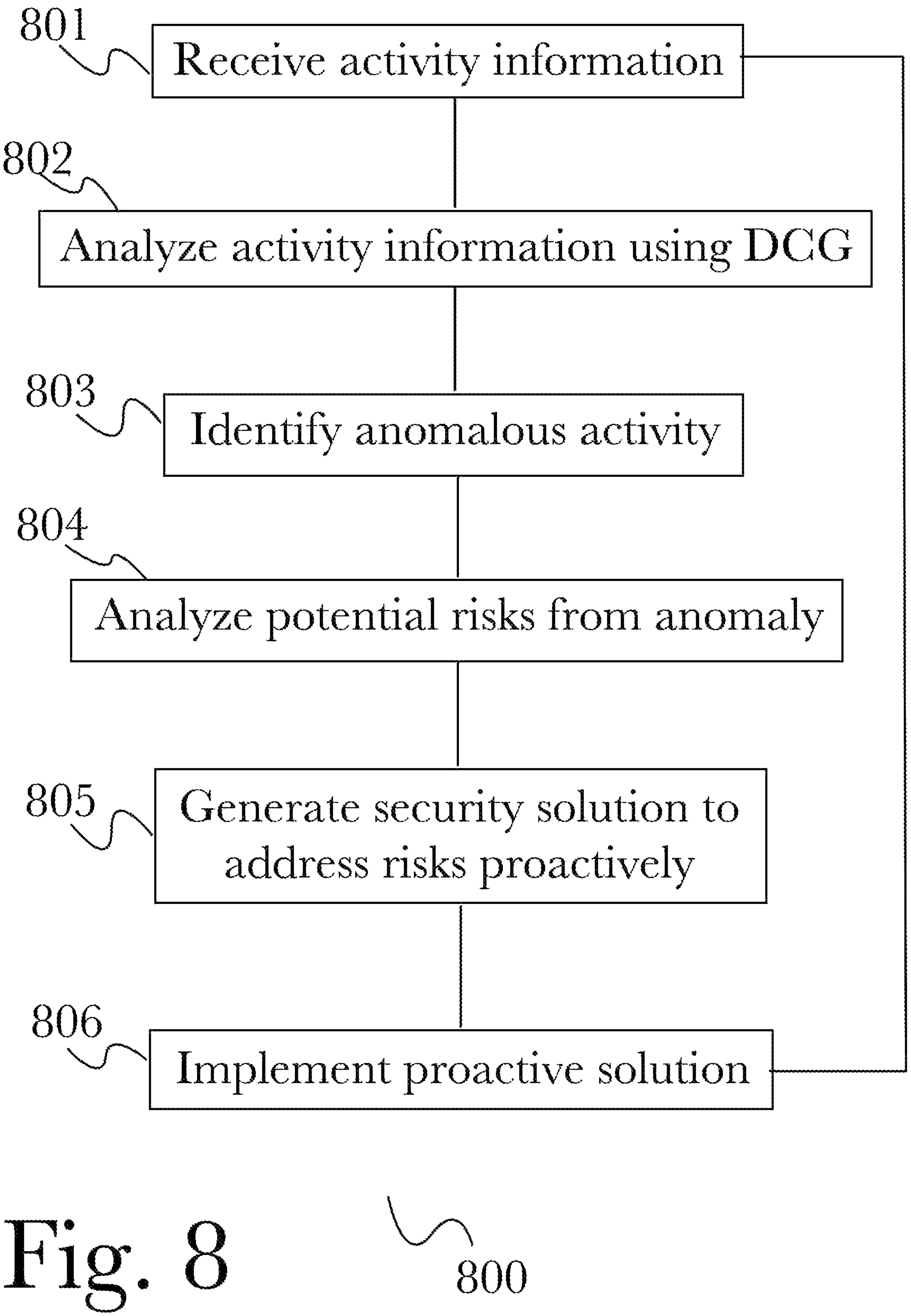
FIG. 8 is a flow diagram of an exemplary method for cybersecurity behavioral analytics, according to one aspect.

FIG. 8 is a flow diagram of an exemplary method 800 for cybersecurity behavioral analytics, according to one aspect. According to the aspect, behavior analytics may utilize passive information feeds from a plurality of existing endpoints (for example, including but not limited to user activity on a network, network performance, or device behavior) to generate security solutions. In an initial step 801, a web crawler 115 may passively collect activity information, which may then be processed 802 using a DCG 155 to analyze behavior patterns. Based on this initial analysis, anomalous behavior may be recognized 803 (for example, based on a threshold of variance from an established pattern or trend) such as high-risk users or malicious software operators such as bots. These anomalous behaviors may then be used 804 to analyze potential angles of attack and then produce 805 security suggestions based on this second-level analysis and predictions generated by an action outcome simulation module 125 to determine the likely effects of the change. The suggested behaviors may then be automatically implemented 806 as needed. Passive monitoring 801 then continues, collecting information after new security solutions are implemented 806, enabling machine learning to improve operation over time as the relationship between security changes and observed behaviors and threats are observed and analyzed.

This method 800 for behavioral analytics enables proactive and high-speed reactive defense capabilities against a variety of cyberattack threats, including anomalous human behaviors as well as nonhuman "bad actors" such as automated software bots that may probe for, and then exploit, existing vulnerabilities. Using automated behavioral learning in this manner provides a much more responsive solution than manual intervention, enabling rapid response to threats to mitigate any potential impact. Utilizing machine learning behavior further enhances this approach, providing additional proactive behavior that is not possible in simple automated approaches that merely react to threats as they occur.

Figure 9:
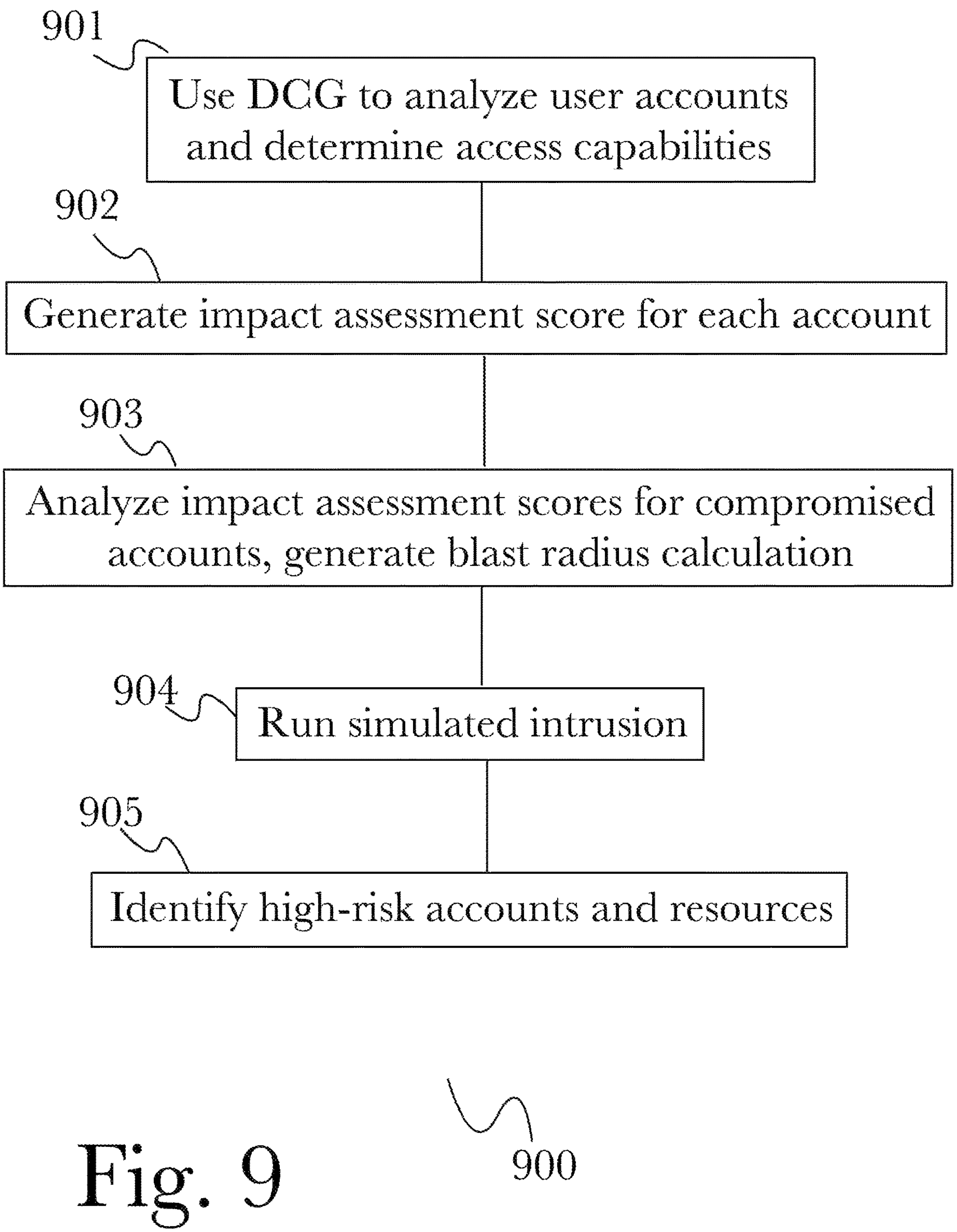
FIG. 9 is a flow diagram of an exemplary method for measuring the effects of cybersecurity attacks, according to one aspect.

FIG. 9 is a flow diagram of an exemplary method 900 for measuring the effects of cybersecurity attacks, according to one aspect. According to the aspect, impact assessment of an attack may be measured using a DCG 155 to analyze a user account and identify its access capabilities 901 (for example, what files, directories, devices or domains an account may have access to). This may then be used to generate 902 an impact assessment score for the account, representing the potential risk should that account be compromised. In the event of an incident, the impact assessment score for any compromised accounts may be used to produce a "blast radius" calculation 903, identifying exactly what resources are at risk as a result of the intrusion and where security personnel should focus their attention. To provide proactive security recommendations through a simulation module 125, simulated intrusions may be run 904 to identify potential blast radius calculations for a variety of attacks and to determine 905 high risk accounts or resources so that security may be improved in those key areas rather than focusing on reactive solutions.

Figure 10:
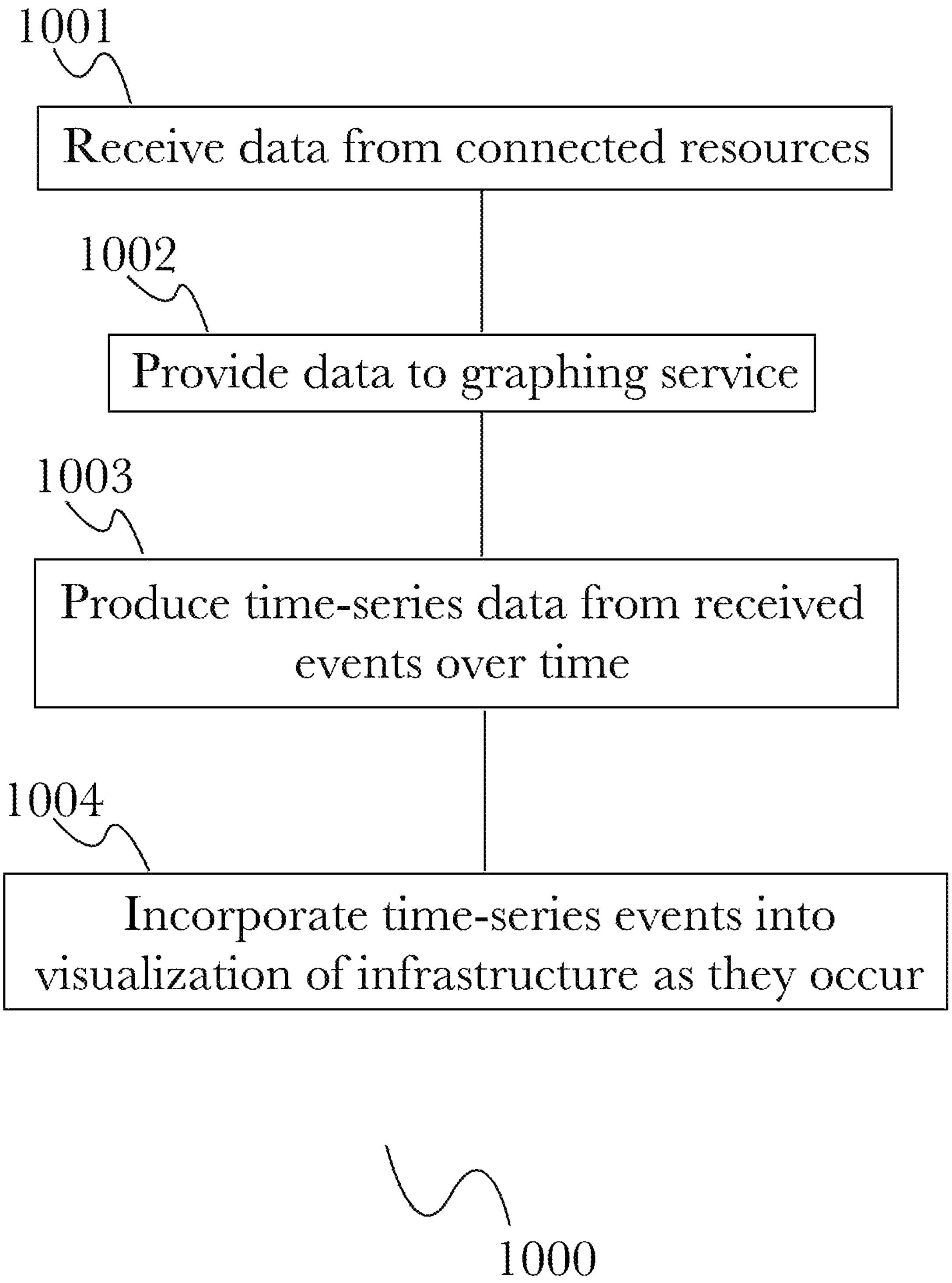
FIG. 10 is a flow diagram of an exemplary method for continuous cybersecurity monitoring and exploration, according to one aspect.

FIG. 10 is a flow diagram of an exemplary method 1000 for continuous cybersecurity monitoring and exploration, according to one aspect. According to the aspect, a state observation service 140 may receive data from a variety of connected systems 1001 such as (for example, including but not limited to) servers, domains, databases, or user directories. This information may be received continuously, passively collecting events and monitoring activity over time while feeding 1002 collected information into a graphing service 145 for use in producing time-series graphs 1003 of states and changes over time. This collated time-series data may then be used to produce a visualization 1004 of changes over time, quantifying collected data into a meaningful and understandable format. As new events are recorded, such as changing user roles or permissions, modifying servers or data structures, or other changes within a security infrastructure, these events are automatically incorporated into the time-series data and visualizations are updated accordingly, providing live monitoring of a wealth of information in a way that highlights meaningful data without losing detail due to the quantity of data points under examination.

Figure 11:
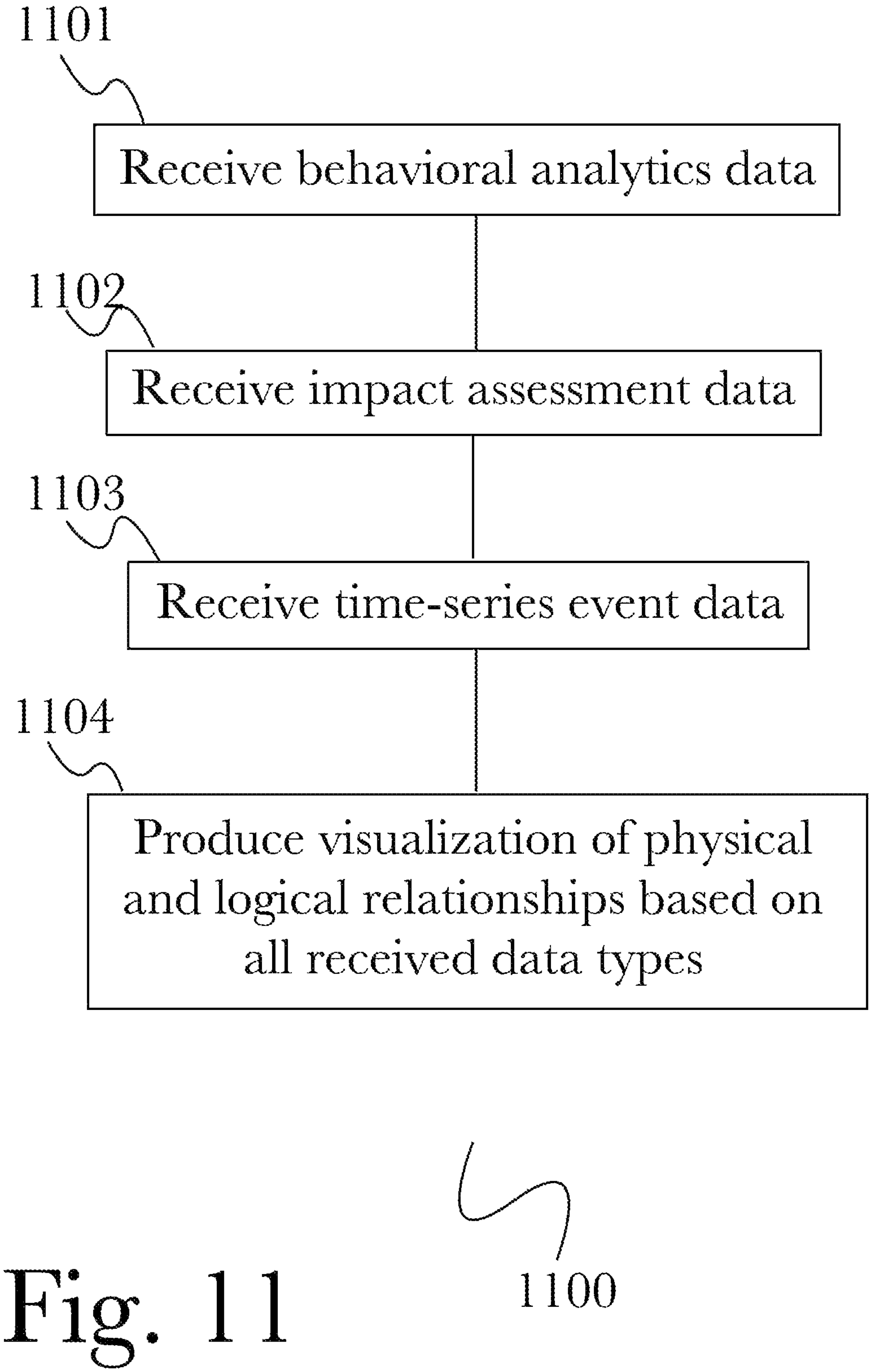
FIG. 11 is a flow diagram of an exemplary method for mapping a cyber-physical system graph, according to one aspect.

FIG. 11 is a flow diagram of an exemplary method 1100 for mapping a cyber-physical system graph (CPG), according to one aspect. According to the aspect, a cyber-physical system graph may comprise a visualization of hierarchies and relationships between devices and resources in a security infrastructure, contextualizing security information with physical device relationships that are easily understandable for security personnel, and users. In an initial step 1101, behavior analytics information (as described previously, referring to FIG. 8) may be received at a graphing service 145 for inclusion in a CPG. In a next step 1102, impact assessment scores (as described previously, referring to FIG. 9) may be received and incorporated in the CPG information, adding risk assessment context to the behavior information. In a next step 1103, time-series information (as described previously, referring to FIG. 10) may be received and incorporated, updating CPG information as changes occur and events are logged. This information may then be used to produce 1104 a graph visualization of users, servers, devices, and other resources correlating physical relationships (such as a user's personal computer or smartphone, or physical connections between servers) with logical relationships (such as access privileges or database connections), to produce a meaningful and contextualized visualization of a security infrastructure that reflects the current state of the internal relationships present in the infrastructure.

Figure 12:
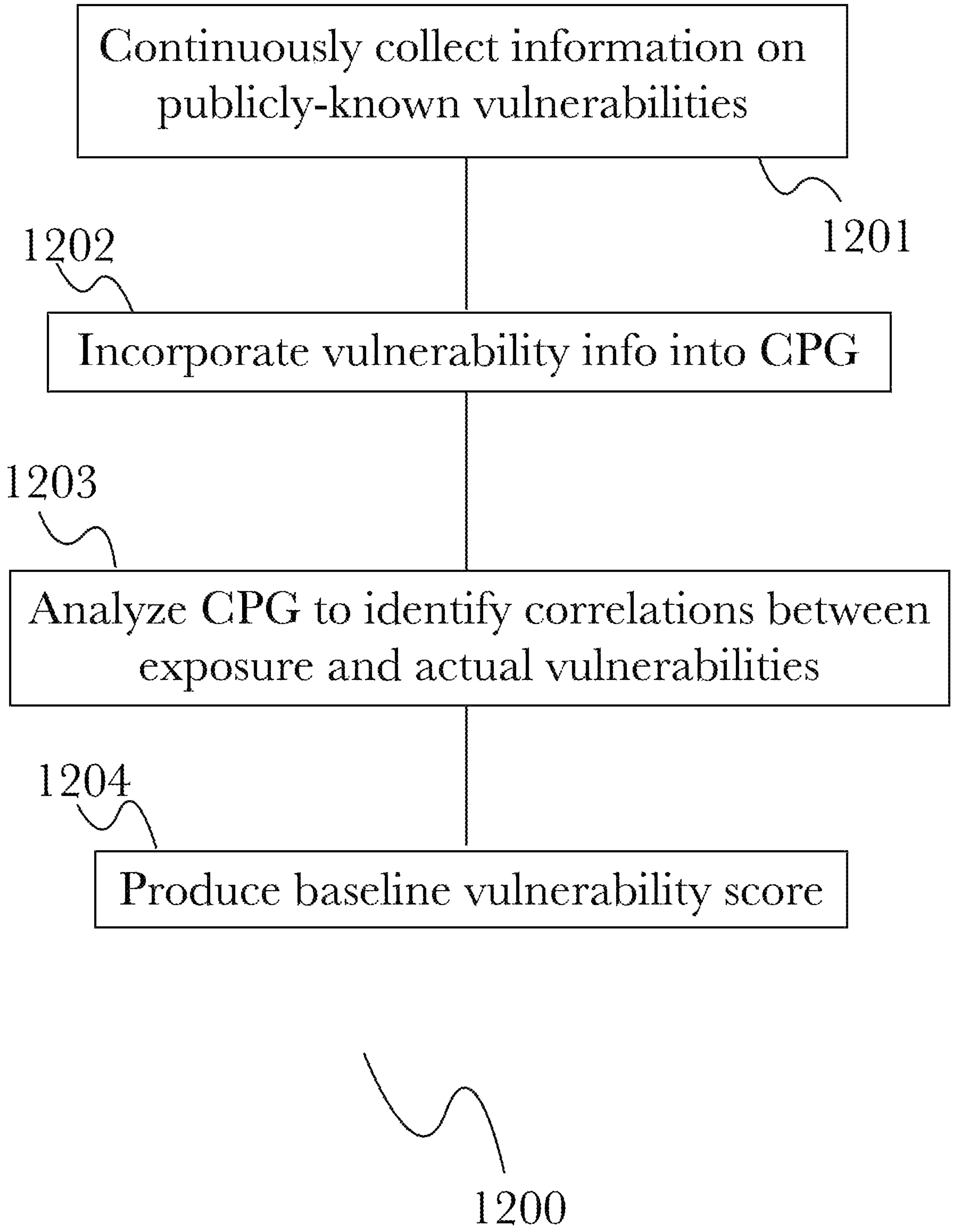
FIG. 12 is a flow diagram of an exemplary method for continuous network resilience rating, according to one aspect.

FIG. 12 is a flow diagram of an exemplary method 1200 for continuous network resilience rating, according to one aspect. According to the aspect, a baseline score can be used to measure an overall level of risk for a network infrastructure, and may be compiled by first collecting 1201 information on publicly-disclosed vulnerabilities, such as (for example) using the Internet or common vulnerabilities and exploits (CVE) process. This information may then 1202 be incorporated into a CPG as described previously in FIG. 11, and the combined data of the CPG and the known vulnerabilities may then be analyzed 1203 to identify the relationships between known vulnerabilities and risks exposed by components of the infrastructure. This produces a combined CPG 1204 that incorporates both the internal risk level of network resources, user accounts, and devices as well as the actual risk level based on the analysis of known vulnerabilities and security risks.

Figure 13:
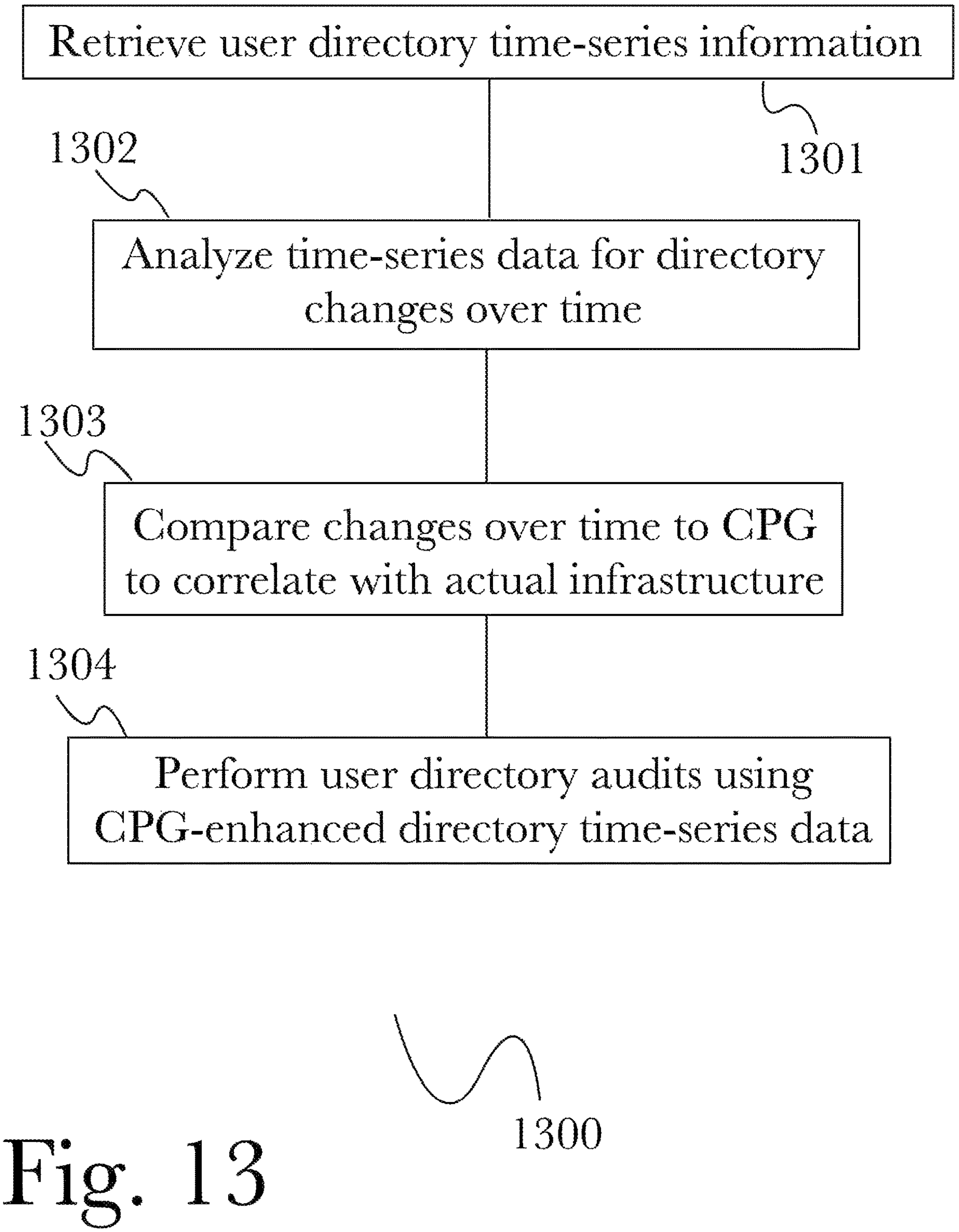
FIG. 13 is a flow diagram of an exemplary method for cybersecurity privilege oversight, according to one aspect.

FIG. 13 is a flow diagram of an exemplary method 1300 for cybersecurity privilege oversight, according to one aspect. According to the aspect, time-series data (as described above, referring to FIG. 10) may be collected 1301 for user accounts, credentials, directories, and other user-based privilege and access information. This data may then 1302 be analyzed to identify changes over time that may affect security, such as modifying user access privileges or adding new users. The results of analysis may be checked 1303 against a CPG (as described previously in FIG. 11), to compare and correlate user directory changes with the actual infrastructure state. This comparison may be used to perform accurate and context-enhanced user directory audits 1304 that identify not only current user credentials and other user-specific information, but changes to this information over time and how the user information relates to the actual infrastructure (for example, credentials that grant access to devices and may therefore implicitly grant additional access due to device relationships that were not immediately apparent from the user directory alone).

Figure 14:
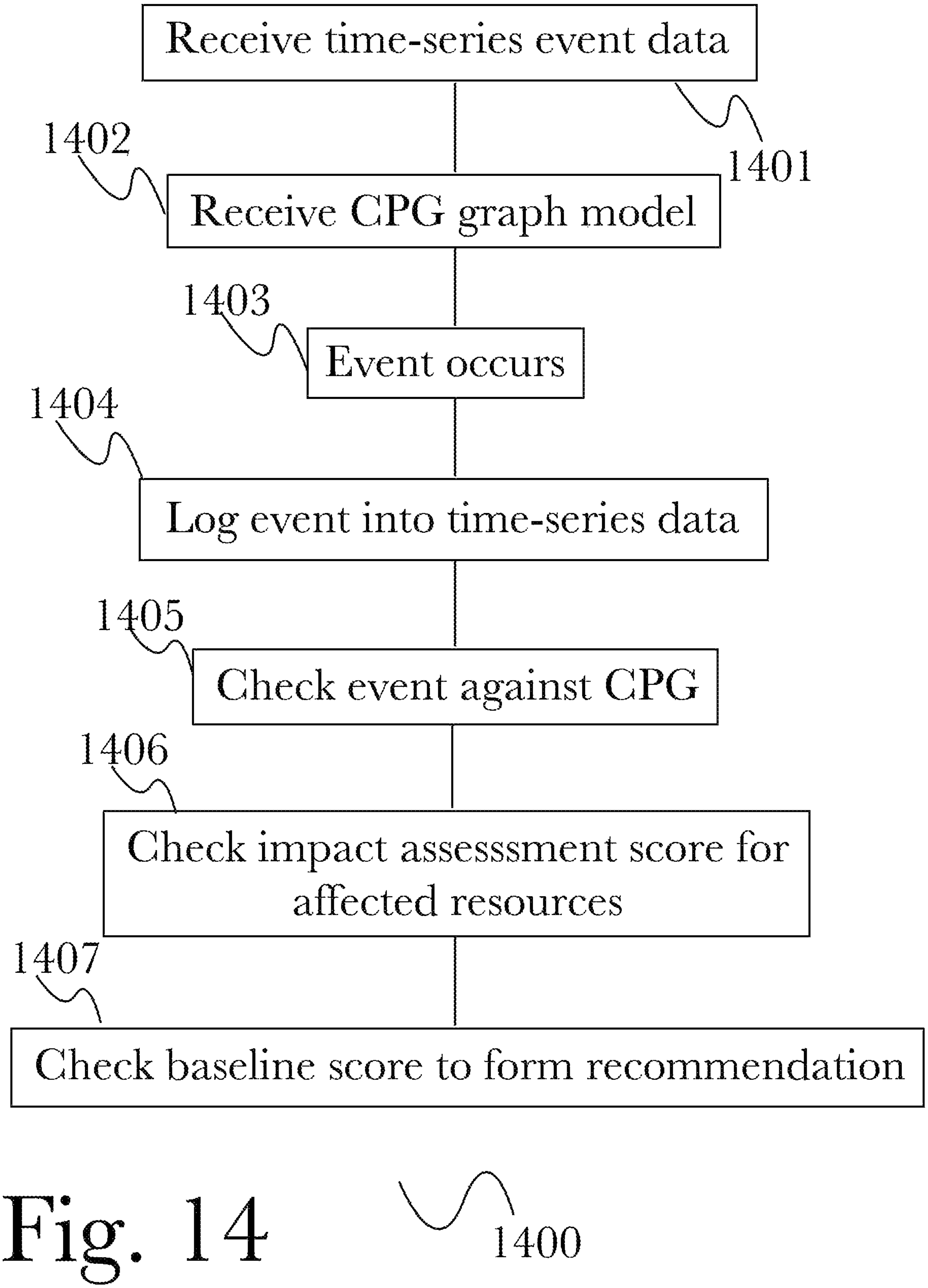
FIG. 14 is a flow diagram of an exemplary method for cybersecurity risk management, according to one aspect.

FIG. 14 is a flow diagram of an exemplary method 1400 for cybersecurity risk management, according to one aspect. According to the aspect, multiple methods described previously may be combined to provide live assessment of attacks as they occur, by first receiving 1401 time-series data for an infrastructure (as described previously, in FIG. 10) to provide live monitoring of network events. This data is then enhanced 1402 with a CPG (as described above in FIG. 11) to correlate events with actual infrastructure elements, such as servers or accounts. When an event (for example, an attempted attack against a vulnerable system or resource) occurs 1403, the event is logged in the time-series data 1404, and compared against the CPG 1405 to determine the impact. This is enhanced with the inclusion of impact assessment information 1406 for any affected resources, and the attack is then checked against a baseline score 1407 to determine the full extent of the impact of the attack and any necessary modifications to the infrastructure or policies.

Figure 15:
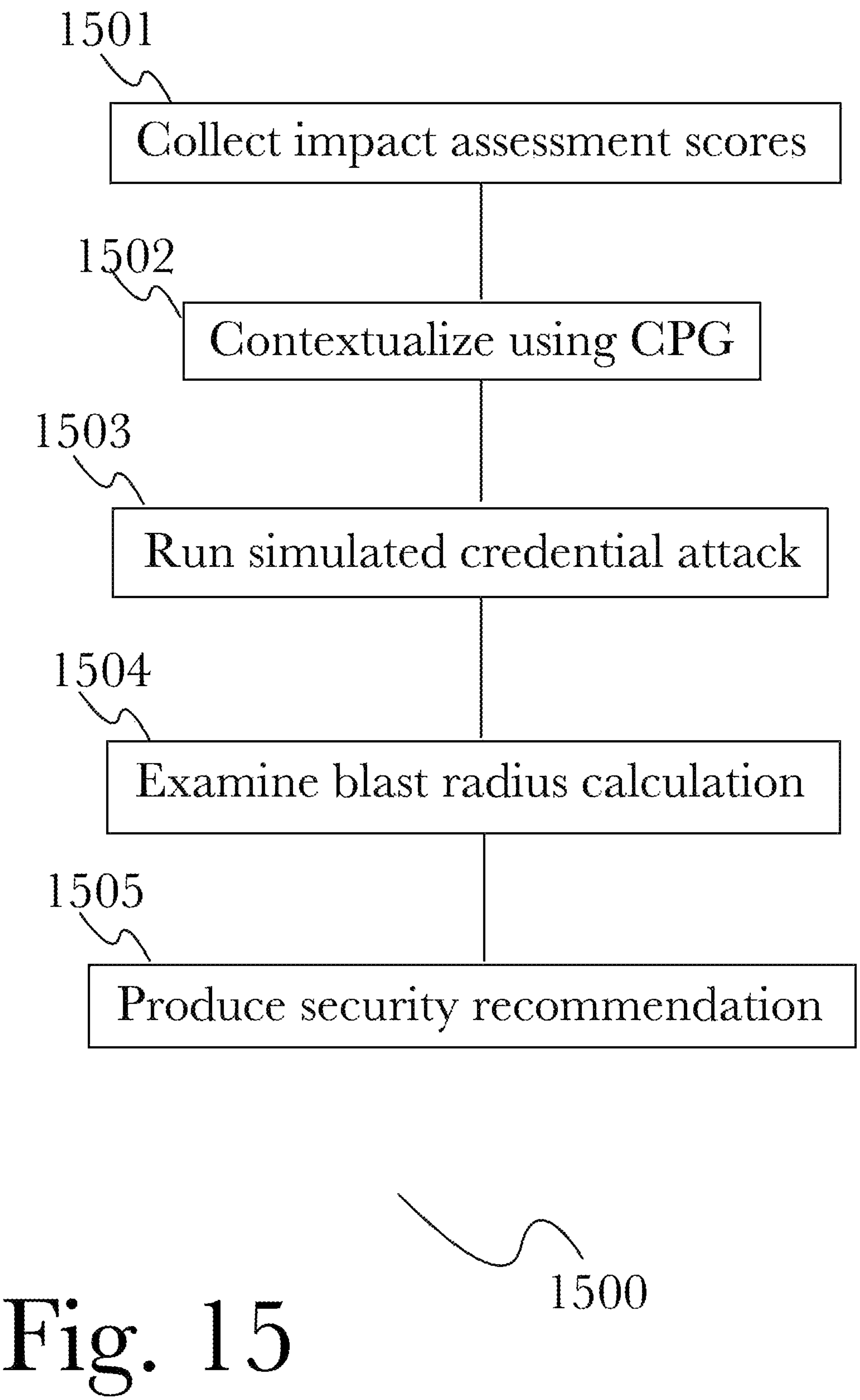
FIG. 15 is a flow diagram of an exemplary method for mitigating compromised credential threats, according to one aspect.

FIG. 15 is a flow diagram of an exemplary method 1500 for mitigating compromised credential threats, according to one aspect. According to the aspect, impact assessment scores (as described previously, referring to FIG. 9) may be collected 1501 for user accounts in a directory, so that the potential impact of any given credential attack is known in advance of an actual attack event. This information may be combined with a CPG 1502 as described previously in FIG. 11, to contextualize impact assessment scores within the infrastructure (for example, so that it may be predicted what systems or resources might be at risk for any given credential attack). A simulated attack may then be performed 1503 to use machine learning to improve security without waiting for actual attacks to trigger a reactive response. A blast radius assessment (as described above in FIG. 9) may be used in response 1504 to determine the effects of the simulated attack and identify points of weakness, and produce a recommendation report 1505 for improving and hardening the infrastructure against future attacks.

Figure 16:
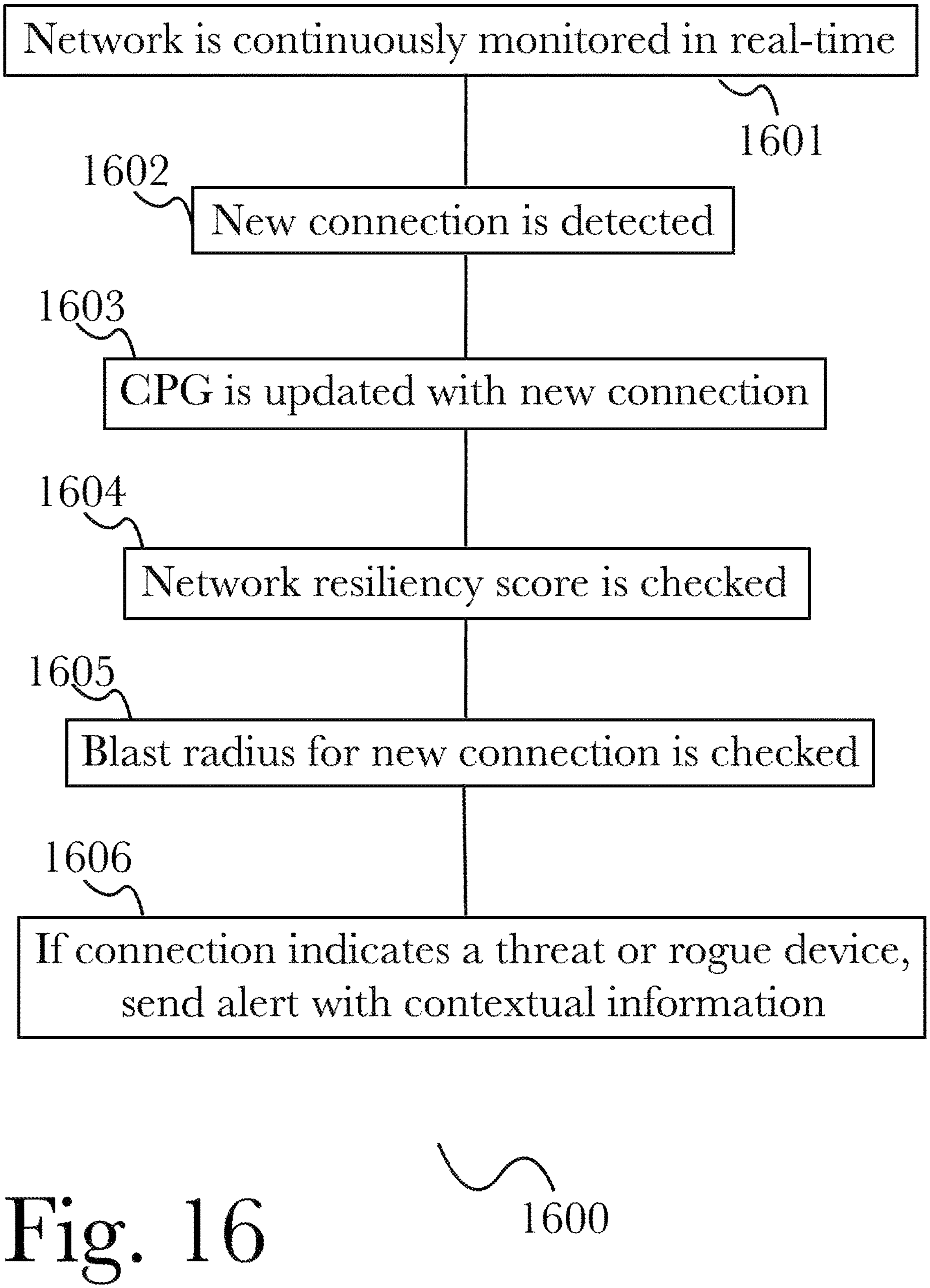
FIG. 16 is a flow diagram of an exemplary method for dynamic network and rogue device discovery, according to one aspect.

FIG. 16 is a flow diagram of an exemplary method 1600 for dynamic network and rogue device discovery, according to one aspect. According to the aspect, an advanced cyber decision platform may continuously monitor a network in real-time 1601, detecting any changes as they occur. When a new connection is detected 1602, a CPG may be updated 1603 with the new connection information, which may then be compared against the network's resiliency score 1604 to examine for potential risk. The blast radius metric for any other devices involved in the connection may also be checked 1605, to examine the context of the connection for risk potential (for example, an unknown connection to an internal data server with sensitive information may be considered a much higher risk than an unknown connection to an externally-facing web server). If the connection is a risk, an alert may be sent to an administrator 1606 with the contextual information for the connection to provide a concise notification of relevant details for quick handling.

Figure 17:
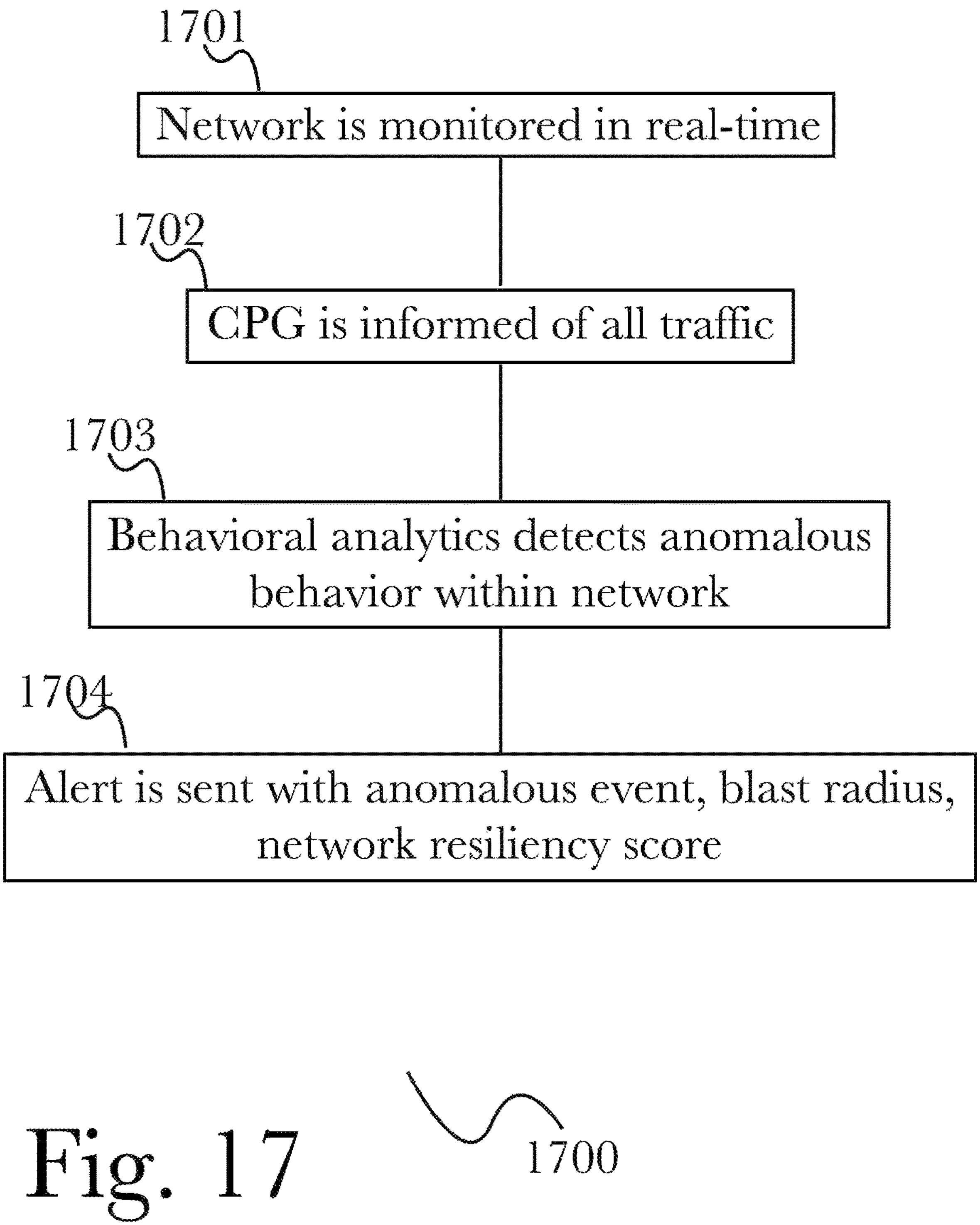
FIG. 17 is a flow diagram of an exemplary method for Kerberos "golden ticket" attack detection, according to one aspect.

FIG. 17 is a flow diagram of an exemplary method 1700 for Kerberos "golden ticket" attack detection, according to one aspect. Kerberos is a network authentication protocol employed across many enterprise networks to enable single sign-on and authentication for enterprise services. This makes it an attractive target for attacks, which can result in persistent, undetected access to services within a network in what is known as a "golden ticket" attack. To detect this form of attack, behavioral analytics may be employed to detect forged authentication tickets resulting from an attack. According to the aspect, an advanced cyber decision platform may continuously monitor a network 1701, informing a CPG in real-time of all traffic associated with entities in an organization, for example, people, places, devices, or services 1702. Machine learning algorithms detect behavioral anomalies as they occur in real-time 1703, notifying administrators with an assessment of the anomalous event 1704 as well as a blast radius score for the particular event and a network resiliency score to advise of the overall health of the network. By automatically detecting unusual behavior and informing an administrator of the anomaly along with contextual information for the event and network, a compromised ticket is immediately detected when a new authentication connection is made.

Figure 18:
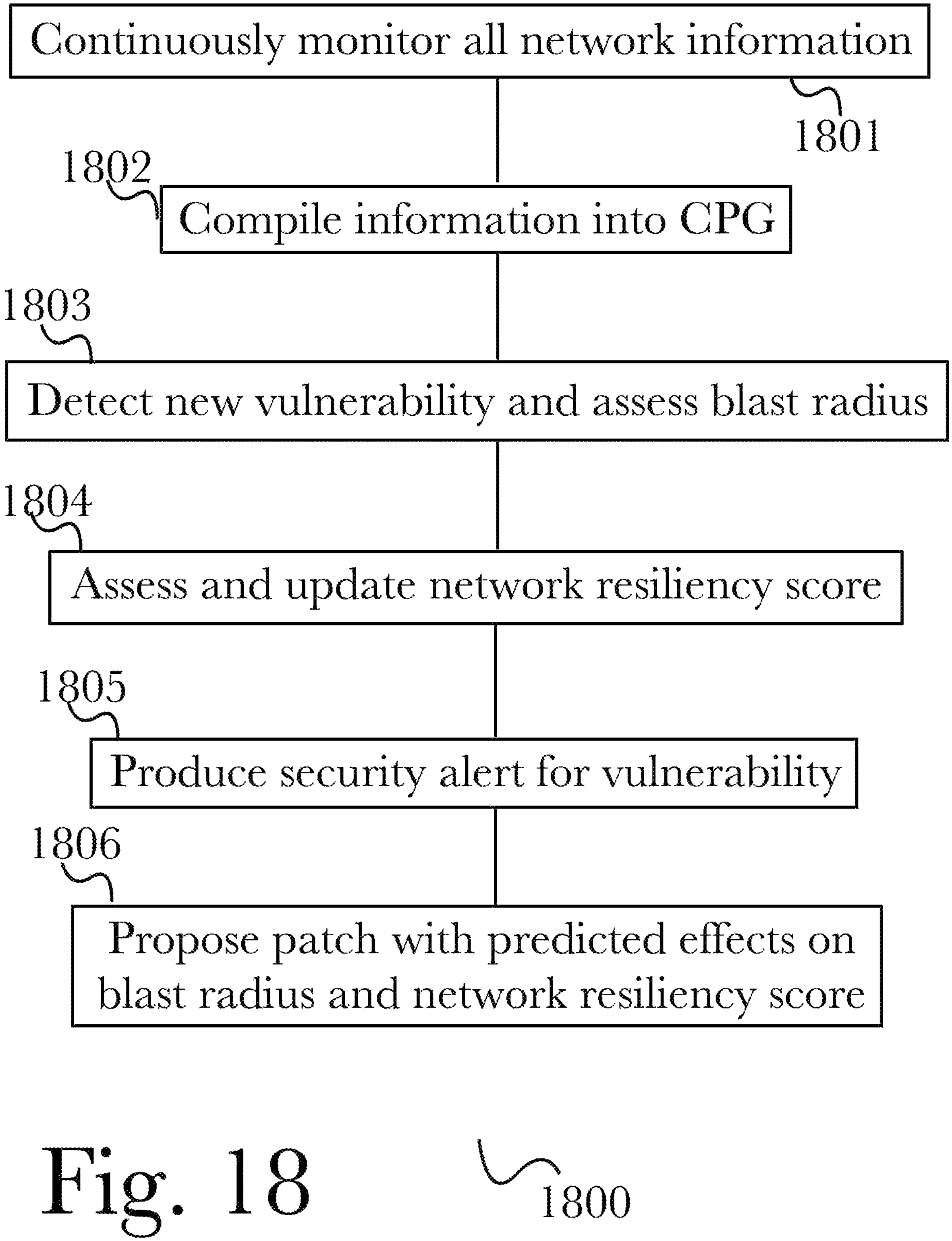
FIG. 18 is a flow diagram of an exemplary method for risk-based vulnerability and patch management, according to one aspect.

FIG. 18 is a flow diagram of an exemplary method 1800 for risk-based vulnerability and patch management, according to one aspect. According to the aspect, an advanced cyber decision platform may monitor all information about a network 1801, including (but not limited to) device telemetry data, log files, connections and network events, deployed software versions, or contextual user activity information. This information is incorporated into a CPG 1802 to maintain an up-to-date model of the network in real-time. When a new vulnerability is discovered, a blast radius score may be assessed 1803 and the network's resiliency score may be updated 1804 as needed. A security alert may then be produced 1805 to notify an administrator of the vulnerability and its impact, and a proposed patch may be presented 1806 along with the predicted effects of the patch on the vulnerability's blast radius and the overall network resiliency score. This determines both the total impact risk of any particular vulnerability, as well as the overall effect of each vulnerability on the network as a whole. This continuous network assessment may be used to collect information about new vulnerabilities and exploits to provide proactive solutions with clear result predictions, before attacks occur.

Figure 20:
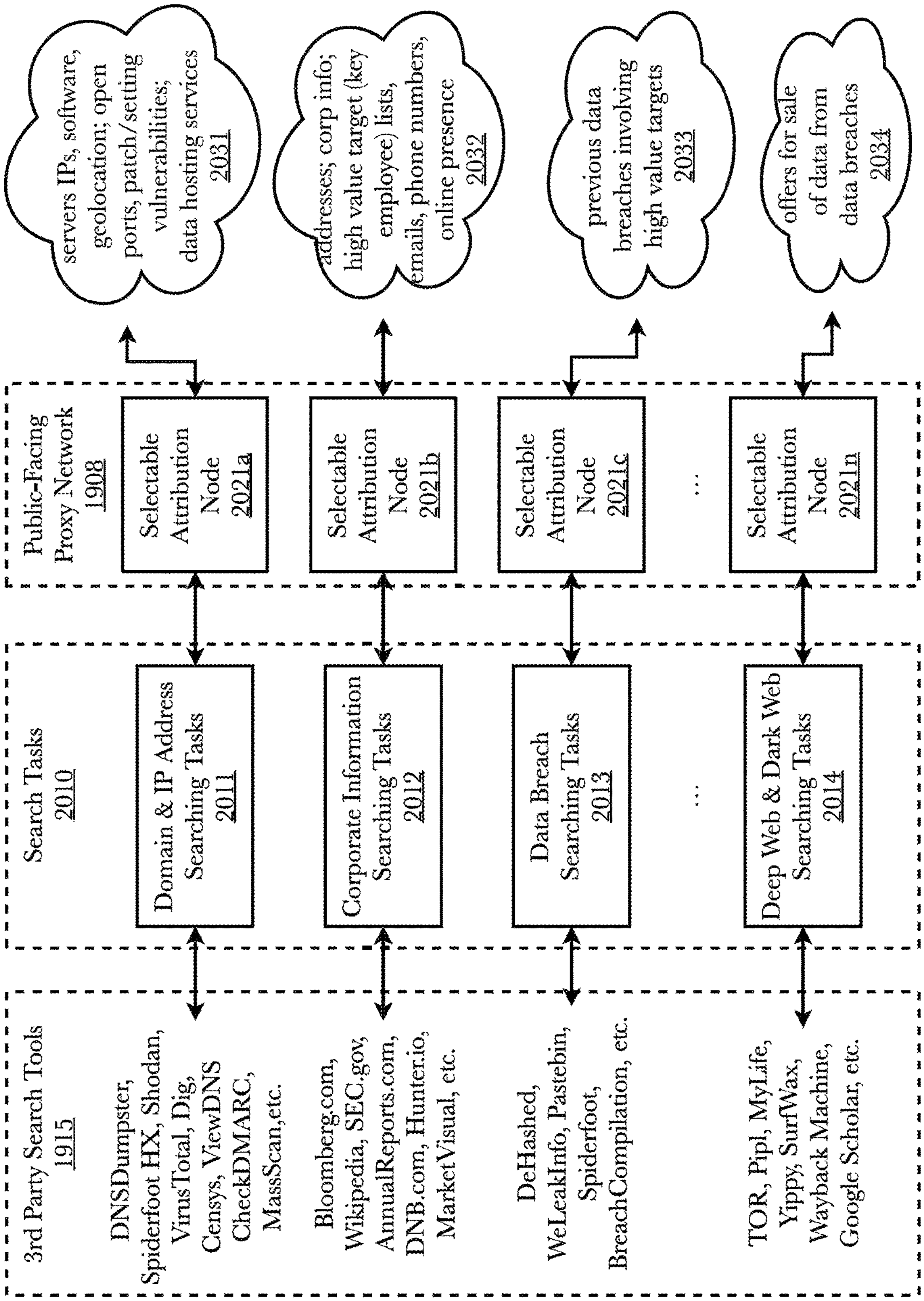
FIG. 20 is a relational diagram showing the relationships between exemplary 3rd party search tools, search tasks that can be generated using such tools, and the types of information that may be gathered with those tasks.

FIG. 20 is a relational diagram showing the relationships between exemplary 3$^{rd}$ party search tools 1915, search tasks 2010 that can be generated using such tools, and the types of information that may be gathered with those tasks 2011-2014, and how a public-facing proxy network 1908 may be used to influence the search task results. While the use of 3$^{rd}$ party search tools 1915 is in no way required, and proprietary or other self-developed search tools may be used, there are numerous 3$^{rd}$ party search tools 1915 available on the Internet, many of them available for use free of charge, that are convenient for purposes of performing external and internal reconnaissance of an organization's infrastructure. Because they are well-known, they are included here as examples of the types of search tools that may be used and the reconnaissance data that may be gathered using such tools. The search tasks 2010 that may be generated may be classified into several categories. While this category list is by no means exhaustive, several important categories of reconnaissance data are domain and internet protocol (IP) address searching tasks 2011, corporate information searching tasks 2012, data breach searching tasks 2013, and dark web searching tasks 2014. Third party search tools 1915 for domain and IP address searching tasks 2011 include, for example, DNSDumpster, Spiderfoot HX, Shodan, VirusTotal, Dig, Censys, ViewDNS, and CheckDMARC, among others. These tools may be used to obtain reconnaissance data about an organization's server IPs, software, gcolocation; open ports, patch/setting vulnerabilities; data hosting services, among other data 2031. Third party search tools 1915 for corporate information searching tasks 2012 include, for example, Bloomberg.com, Wikipedia, SEC.gov, AnnualReports.com, DNB.com, Hunter.io, and Market Visual, among others. These tools may be used to obtain reconnaissance data about an organization's addresses; corp info; high value target (key employee or key data assets) lists, emails, phone numbers, online presence 2032. Third party search tools 1915 for data breach searching tasks 2013 include, for example, DeHashed, WeLeakInfo, Pastebin, Spiderfoot, and BreachCompilation, among others. These tools may be used to obtain reconnaissance data about an organization's previous data breaches, especially those involving high value targets, and similar data loss information 2033. Third party search tools 1915 for deep web (reports, records, and other documents linked to in web pages, but not indexed in search results . . . estimated to be 90% of available web content) and dark web (websites accessible only through anonymizers such as TOR . . . estimated to be about 6% of available web content) searching tasks 2014 include, for example, Pipl, MyLife, Yippy, SurfWax, Wayback machine, Google Scholar, DuckDuckGo, Fazzle, Not Evil, and Start Page, among others. These tools may be used to obtain reconnaissance data about an organization's lost and stolen data such as customer credit card numbers, stolen subscription credentials, hacked accounts, software tools designed for certain exploits, which organizations are being targeted for certain attacks, and similar information 2034. A public-facing proxy network 1908 may be used to change the outward presentation of the organization's network by conducting the searches through selectable attribution nodes 2021*a-n*, which are configurable to present the network to the Internet in different ways such as, but not limited to, presenting the organization network as a commercial IP address, a residential IP address, or as an IP address from a particular country, all of which may influence the reconnaissance data received using certain search tools.

Figure 21:
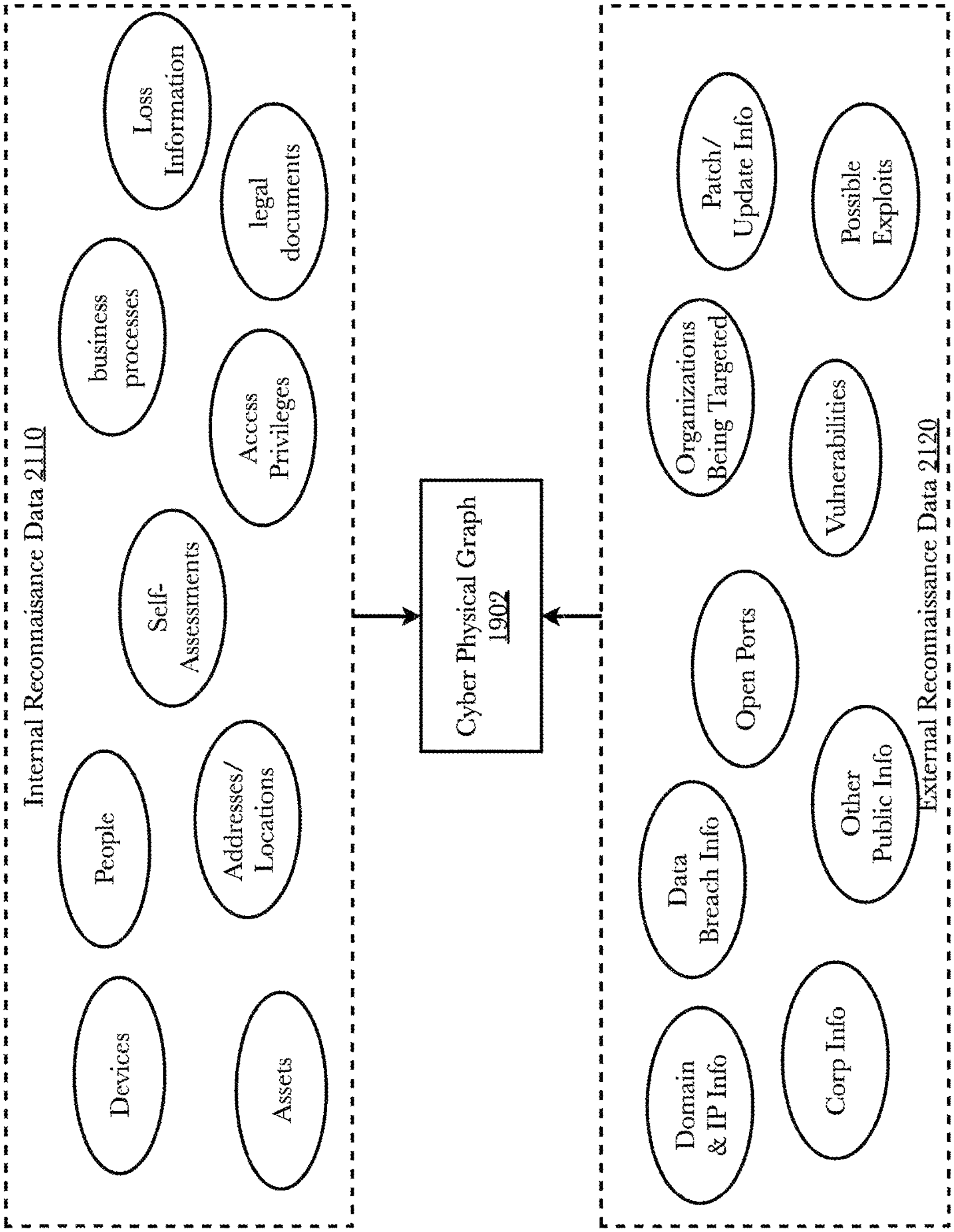
FIG. 21 is a relational diagram showing the exemplary types and classifications of information that may be used in constructing a cyber-physical graph of an organization's infrastructure and operations.

FIG. 21 is a relational diagram showing the exemplary types and classifications of information that may be used in constructing a cyber-physical graph 1902 of an organization's infrastructure and operations. The cyber-physical graph 1902 is a directed graph that represents a comprehensive picture of an organization's infrastructure and operations. A cyber-physical graph 1902 represents the relationships between entities associated with an organization, for example, devices, users, resources, groups, and computing services, the relationships between the entities defining relationships and processes in an organization's infrastructure, thereby contextualizing security information with physical and logical relationships that represent the flow of data and access to data within the organization including, in particular, network security protocols, and procedures. Data that may be incorporated into a cyber-physical graph may be any data relating to an organization's infrastructure and operations, and two primary categories of data that may be incorporated are internal reconnaissance data 2110 and external reconnaissance data 2120. Non-limiting examples of internal reconnaissance data 2110 include computers and devices, physical and intangible (data) assets, people (employees, contractors, etc.), addresses and locations of buildings, servers, etc., business processes, access privileges, loss information, legal documents, and self-assessments of cybersecurity. Non-limiting examples of external reconnaissance data 2120 include domains and IP information, data breach information, organization information such as corporate structures, key employees, etc., open port information, information regarding which organizations are current targets of cyber-attacks, network vulnerability information, system version and patch/update information, known and possible exploits, and publicly available information.

In an initial step 1101, behavior analytics information (as described previously, referring to FIG. 8) may be received at a graphing service 145 for inclusion in a CPG. In a next step 1102, impact assessment scores (as described previously, referring to FIG. 9) may be received and incorporated in the CPG information, adding risk assessment context to the behavior information. In a next step 1103, time-series information (as described previously, referring to FIG. 10) may be received and incorporated, updating CPG information as changes occur and events are logged. This information may then be used to produce 1104 a graph visualization of users, servers, devices, and other resources correlating physical relationships (such as a user's personal computer or smartphone, or physical connections between servers) with logical relationships (such as access privileges or database connections), to produce a meaningful and contextualized visualization of a security infrastructure that reflects the current state of the internal relationships present in the infrastructure.

Figure 22:
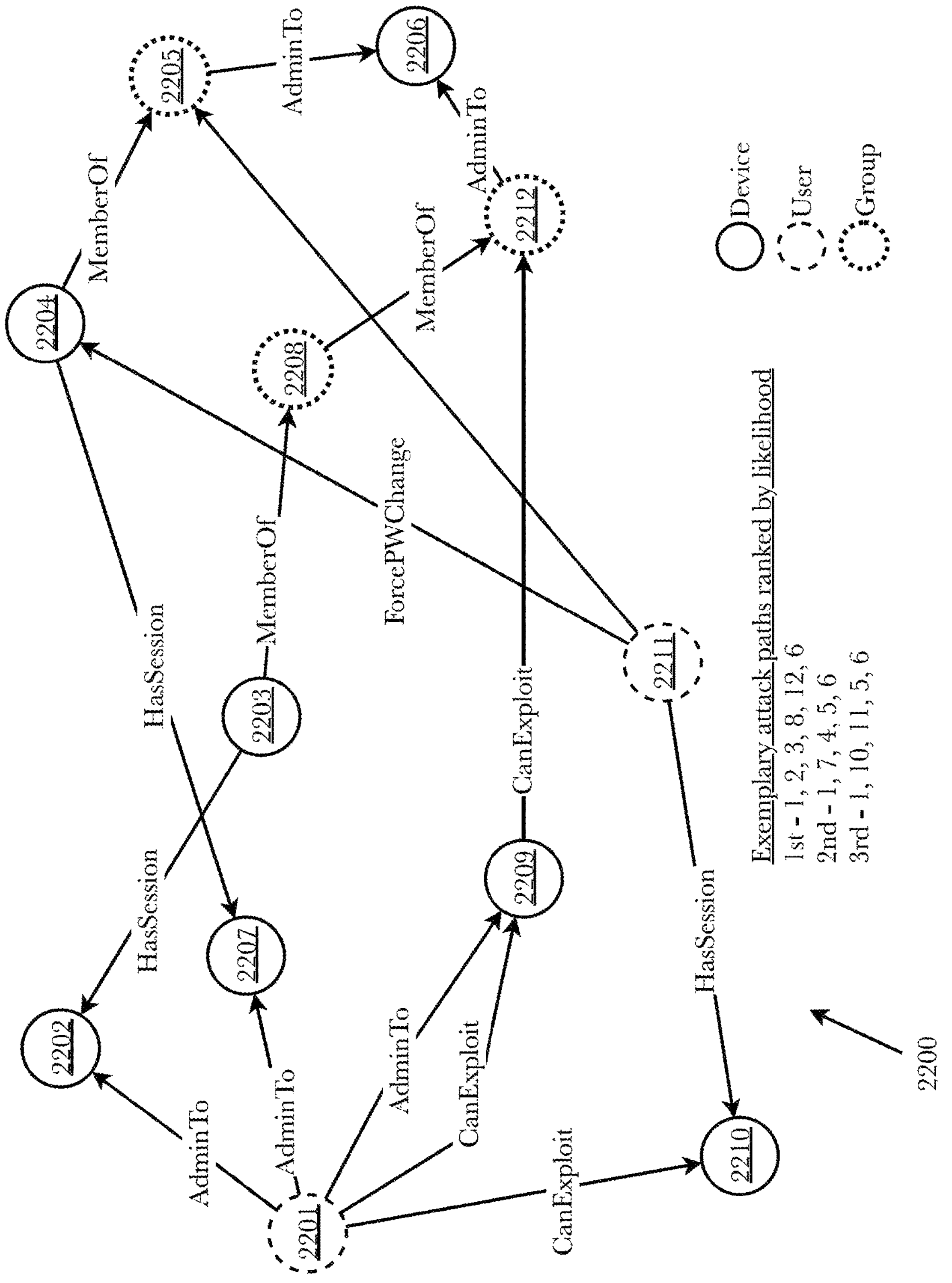
FIG. 22 is a directed graph diagram showing an exemplary cyber-physical graph and its possible use in analyzing cybersecurity threats.

FIG. 22 is a directed graph diagram showing an exemplary cyber-physical graph 2200 and its possible use in creating cybersecurity profiles and ratings. A cyber-physical graph 1902 represents the relationships between entities associated with an organization, for example, devices, users, resources, groups, and computing services, the relationships between the entities defining relationships and processes in an organization's infrastructure, thereby contextualizing security information with physical and logical relationships that represent the flow of data and access to data within the organization including, in particular, network security protocols and procedures. A cyber-physical graph, in its most basic form, represents the network devices comprising an organization's network infrastructure as nodes (also called vertices) in the graph and the physical or logical connections between them as edges between the nodes. The cyber-physical graph may be expanded to include network information and processes such as data flow, security protocols and procedures, and software versions and patch information. Further, human users and their access privileges to devices and assets may be included. A cyber-security graph may be further expanded to include internal process information such as business processes, loss information, and legal requirements and documents; external information such as domain and IP information, data breach information; and generated information such as open port information from external network scans, and vulnerabilities and avenues of attack. Thus, a cyber-physical graph may be used to represent a complete picture of an organization's infrastructure and operations.

In this example, which is necessarily simplified for clarity, the cyber-physical graph 2200 contains 12 nodes (vertices) comprising: seven computers and devices designated by solid circles 2202, 2203, 2204, 2206, 2207, 2209, 2210, two users designated by dashed-line circles 2201, 2211, and three functional groups designated by dotted-line circles 2205, 2208, and 2212. The edges (lines) between the nodes indicate relationships between the nodes, and have a direction and relationship indicator such as "AdminTo," "MemberOf," etc. While not shown here, the edges may also be assigned numerical weights or probabilities, indicating, for example, the likelihood of a successful attack gaining access from one node to another. Possible attack paths may be analyzed using the cyber-physical graph by running graph analysis algorithms such as shortest path algorithms, minimum cost/maximum flow algorithms, strongly connected node algorithms, etc. In this example, several exemplary attack paths are ranked by likelihood. In the most likely attack path, user 2201 is an administrator to device 2202 to which device 2203 has connected. Device 2203 is a member of functional group 2208, which has a member of group 2212. Functional group 2212 is an administrator to the target 2206. In a second most likely attack path, user 2201 is an administrator to device 2207 to which device 2204 has connected. Device 2204 is a member of functional group 2205, which is an administrator to the target device 2206. In a third most likely attack path, a flaw in the security protocols allow the credentials of user 2201 to be used to gain access to device 2210. User 2211 who is working on device 2210 may be tricked into providing access to functional group 2205, which is an administrator to the target device 2206.

FIG. 23 is a block diagram showing exemplary operation of a data to rule mapper. Laws, policies, standards, and other rules are gathered and stored in an authority database 1903. Non-limiting examples of such rules include federal, state, and local statutes, regulations, case law interpretations, and other laws 2310, business policies and procedures 2320, and industry standards (as one example, cybersecurity industry standards for network security) 2330. Reconnaissance data are stored in a database 1905. A data to rule mapper 1904 retrieves the reconnaissance data 1905 and matches it to rules from the authority database 1903. An example of this operation for statues/regulations 2310 is shown in 2311, where Article 33, paragraph 1 of the European Union's General Data Protection Regulation (GDPR) requires that an organization notify a cognizant authority of a data breach within 72 hours of knowledge of the breach. If a data point indicates that a data breach has been discovered because data of the organization is found online, the data point is associated with that rule, and tagged with the possible impact of fines if the rule is not followed. An example of this operation for business policies 2320 is shown in 2321, where a corporate policy prohibits access of the organization's systems using personal computers. If a data point indicates that an employee account is accessed using a non-business-owned computer, the data point is associated with the rule, and tagged with possible data theft and/or security breach. An example of this operation for industry standards 2330 is shown in 2331, where an industry standard prohibits open ports accessible from outside the network perimeter. If a data point indicates an open port, the data point is associated with the rule, and tagged with possible data loss and/or security breach.

Figure 28:
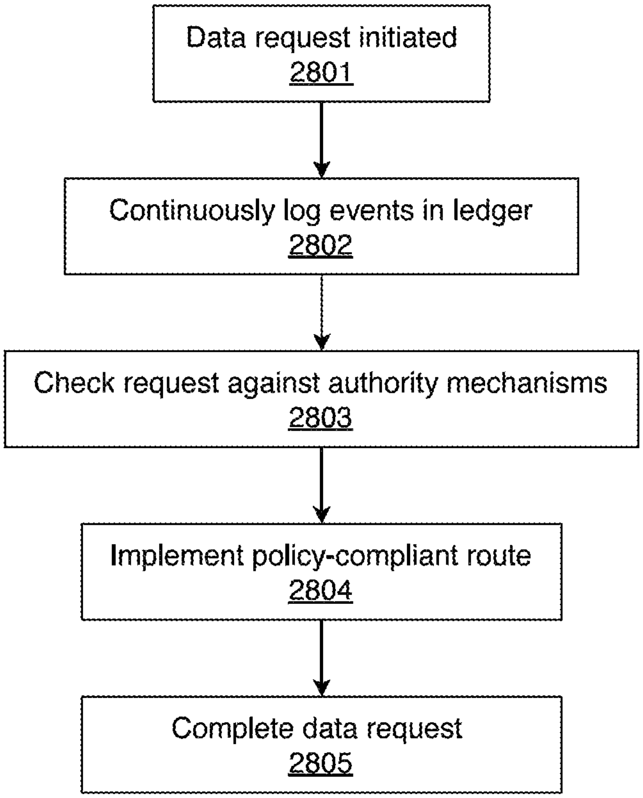
FIG. 28 is a flow diagram of an exemplary method for a ledger service configuration and data provenance chain, according to one aspect.

FIG. 28 is a flow diagram of an exemplary method 2450 for a ledger service configuration and data provenance chain, according to one aspect. A data request of any type is instantiated 2801 on a host machine within the purview of the secure system and is immediately and continuously logged 2802 by the ledger engine 2504. The data request is checked against all data restrictions and legality assessment mechanisms 2803 for planning and implementing a policy-compliant route 2804 enforcing that access and equipment associated with the request are fully conforming to regulatory guidelines. This can optionally include restrictions on routing or transport of such data (if feasible) to avoid specific transport via Autonomous Systems (ASs) or other attributes which are undesirable for security, legal, political, business, taxation, or other reasons. The entirety of the process is logged 2802 and completed 2805 when the data request is fulfilled or rejected, and the accompanying ledger is stored for evidential compliance. When considering this embodiment of the ADCP 100 in a ledger service configuration, all references in this document to "reconnaissance data" may be considered actionable metadata of and for ledger attributes. Such a vast and comprehensive metadata ledger provides evidential fulfillment and data versioning of intermediate steps for administrators, decision makers, analysts, and inspectors. The ledger engine 2504 capabilities coupled with a legality assessment mechanism 2700 should be considered to support the broadest mechanism for risk mitigation, avoidance, and policy compliance auditing.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 29:
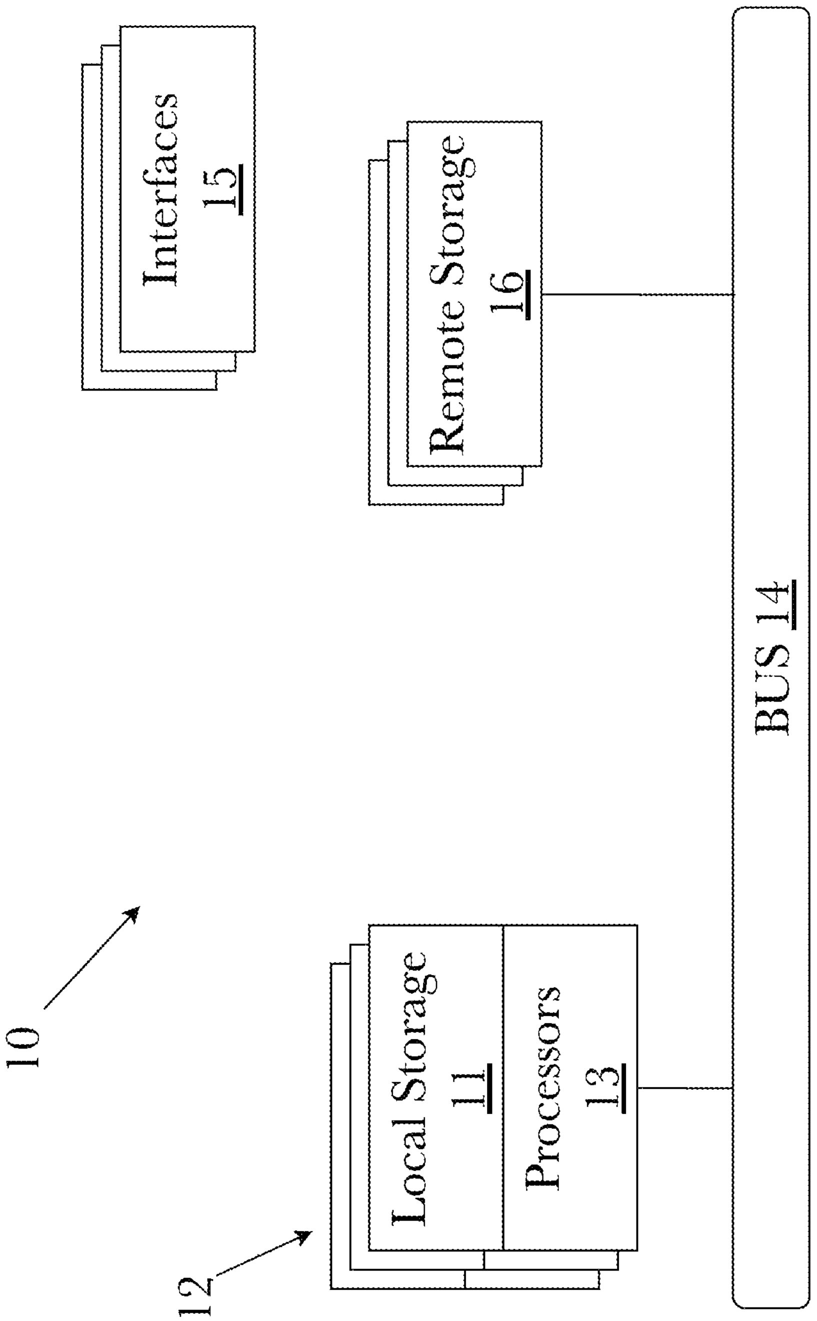
FIG. 29 is a block diagram illustrating an exemplary hardware architecture of a computing device.

Referring now to FIG. 29, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 29 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 30:
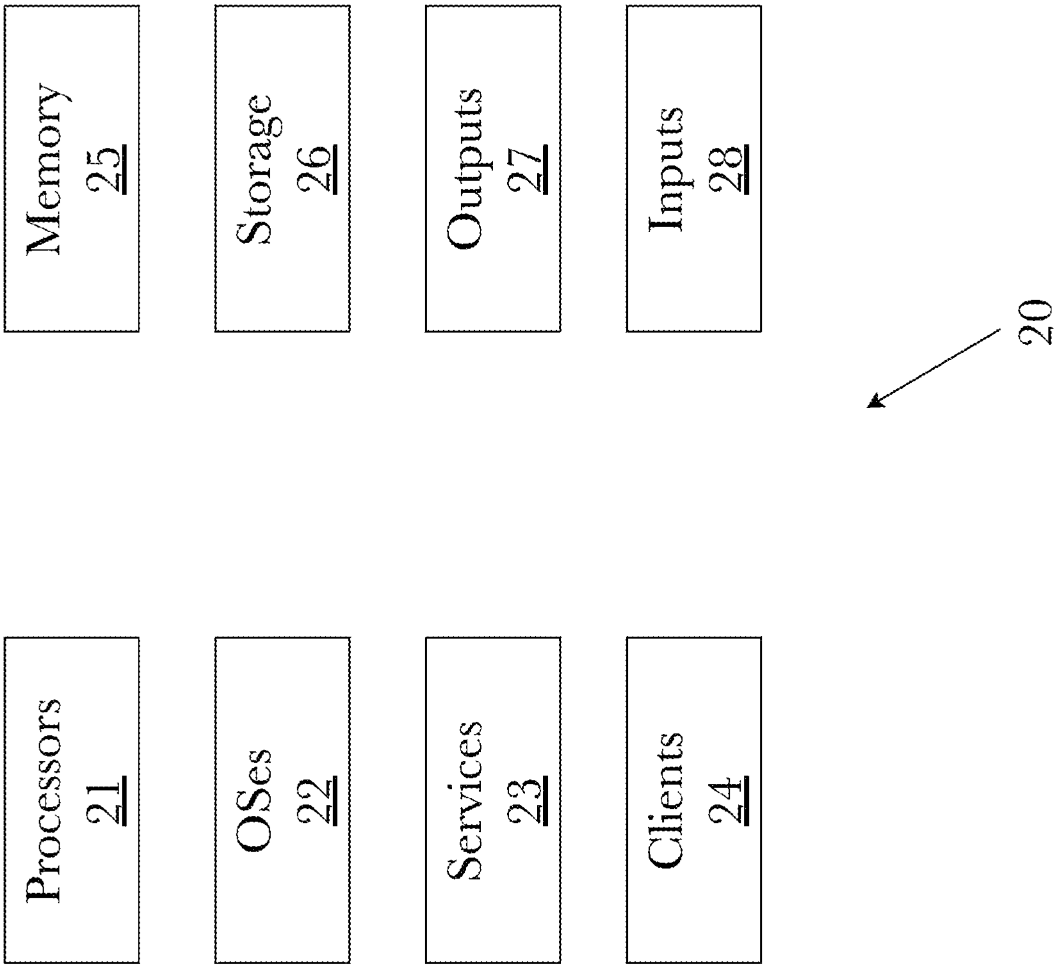
FIG. 30 is a block diagram illustrating an exemplary logical architecture for a client device.

In some aspects, systems may be implemented on a standalone computing system. Referring now to FIG. 30, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20 and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 29). Examples of storage devices 26 include flash memory, magnetic hard drive, CD-ROM, and/or the like.

Figure 31:
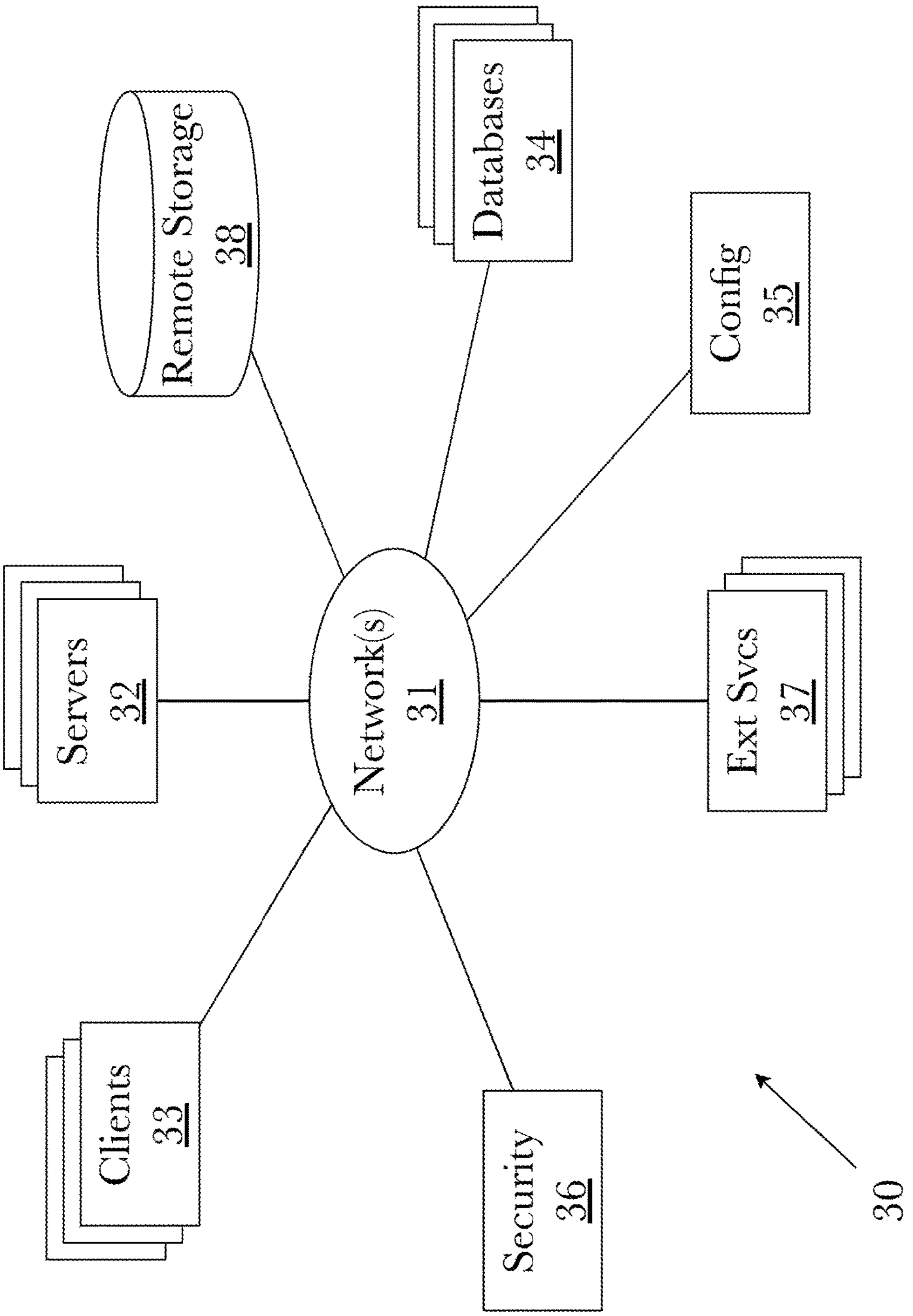
FIG. 31 is a block diagram illustrating an exemplary architectural arrangement of clients, servers, and external services.

In some aspects, systems may be implemented on a distributed computing network, such as one having any number of clients and/or servers. Referring now to FIG. 31, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 29. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as Wi-Fi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database," it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 32:
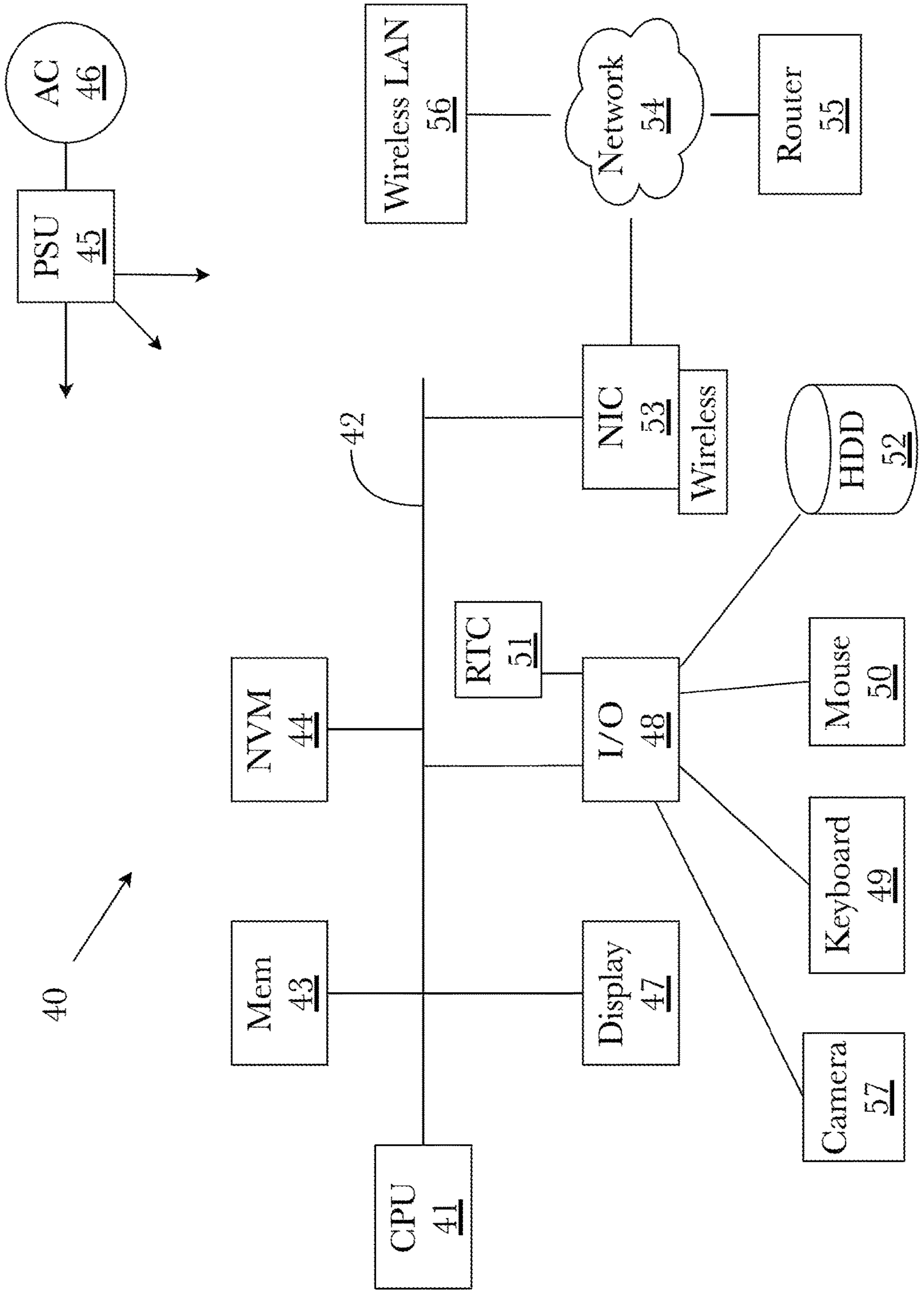
FIG. 32 is another block diagram illustrating an exemplary hardware architecture of a computing device.

FIG. 32 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A computing system for movement and manipulation of secure data employing a ledger, the computing system comprising:

one or more hardware processors configured for:

collecting computing system metadata comprising information about hardware and software on the computing system;

identifying a protocol data unit (PDU) on the network;

amending the PDU to allow enforcement of where computation or persistence of the PDU occurs in the network;

tokenizing the PDU;

extracting PDU metadata from the PDU, the PDU comprising a source and a destination;

sending the PDU metadata to a ledger comprising persistent transactional metadata;

retrieving a regulatory guideline from an authority database pertaining to the PDU based on the PDU metadata;

extracting a rule from the regulatory guideline applicable to the PDU based on the PDU metadata;

retrieving administrative metadata from the source of the PDU, the administrative data comprising an access log;

updating a cyber-physical graph with the PDU metadata, the administrative metadata, the computing system metadata, and the extracted rule, wherein the cyber-physical graph represents relations between data and rules stored in the authority database;

identifying, based on the cyber-physical graph, an optimal pathway for the tokenized PDU to travel, wherein the optimal pathway is selected from one or more computed policy-compliant pathways based on hardware, software, and user access;

when an optimal pathway is identified, transmitting the tokenized PDU along the optimal pathway; and when a rejection is received, rejecting further transmission of the tokenized PDU.

2. The computing system of claim 1, wherein the authority database is stored and accessed over a network of computing systems, rather than a singular computing system.

3. The computing system of claim 1, wherein the computing system is a networked group of computing devices, that may operate different parts of the system in tandem or discretely, to achieve the function of the whole system together over a network.

4. The computing system of claim 1, wherein the PDU metadata, the administrative metadata, the computing system metadata, and the extracted rule are maintained in a cache, and wherein the cache is maintained by a database, virtual memory caching system or operating system, content delivery network, or networked memory, rather than the computing system's memory.

5. The computing system of claim 1, wherein the optimal pathway is based at least on human and legal considerations.

6. The system of claim 1, wherein the authority database is stored and accessed over a network of computing systems, rather than a singular computing system.

7. The system of claim 1, wherein the system is a networked group of computing devices, that may operate different parts of the system in tandem or discretely, to achieve the function of the whole system together over a network.

8. The system of claim 1, wherein the PDU metadata, the administrative metadata, the computing system metadata, and the extracted rule are maintained in a cache, and wherein the cache is maintained by a database, virtual memory caching system or operating system, content delivery network, or networked memory, rather than the computing system's memory.

9. The system of claim 1, wherein the optimal pathway is based at least on human and legal considerations.

10. A computer-implemented method executed on a ledger for movement and manipulation of secure data, the computer-implemented method comprising:

collecting computing system metadata comprising information about hardware and software on the computing system;

identifying a protocol data unit (PDU) on the network;

amending the PDU to allow enforcement of where computation or persistence of the PDU occurs in the network;

tokenizing the PDU;

extracting PDU metadata from the PDU, the PDU comprising a source and a destination;

sending the PDU metadata to a ledger comprising persistent transactional metadata;

retrieving a regulatory guideline from an authority database pertaining to the PDU based on the PDU metadata;

extracting a rule from the regulatory guideline applicable to the PDU based on the PDU metadata;

retrieving administrative metadata from the source of the PDU, the administrative data comprising an access log;

updating a cyber-physical graph with the PDU metadata, the administrative metadata, the computing system metadata, and the extracted rule, wherein the cyber-physical graph represents relations between data and rules stored in the authority database;

identifying, based on the cyber-physical graph, an optimal pathway for the tokenized PDU to travel, wherein the optimal pathway is selected from one or more computed policy-compliant pathways based on hardware, software, and user access;

when an optimal pathway is identified, transmitting the tokenized PDU along the optimal pathway; and when a rejection is received, rejecting further transmission of the tokenized PDU.

11. The computer-implemented method of claim 10, wherein the authority database is stored and accessed over a network of computing systems, rather than a singular computing system.

12. The computer-implemented method of claim 10, wherein the PDU metadata, the administrative metadata, the computing system metadata, and the extracted rule are maintained in a cache, and wherein the cache is maintained by a database, virtual memory caching system or operating system, content delivery network, or networked memory, rather than the computing system's memory.

13. The computer-implemented method of claim 10, wherein the optimal pathway is based at least on human and legal considerations.

14. A system for movement and manipulation of secure data employing a ledger, comprising one or more computers with executable instructions that, when executed, cause the system to:

collect computing system metadata comprising information about hardware and software on the computing system;

identify a protocol data unit (PDU) on the network;

amend the PDU to allow enforcement of where computation or persistence of the PDU occurs in the network;

tokenize the PDU;

extract PDU metadata from the PDU, the PDU comprising a source and a destination;

send the PDU metadata to a ledger comprising persistent transactional metadata;

retrieve a regulatory guideline from an authority database pertaining to the PDU based on the PDU metadata;

extract a rule from the regulatory guideline applicable to the PDU based on the PDU metadata;

retrieve administrative metadata from the source of the PDU, the administrative data comprising an access log;

update a cyber-physical graph with the PDU metadata, the administrative metadata, the computing system metadata, and the extracted rule, wherein the cyber-physical graph represents relations between data and rules stored in the authority database;

identify, based on the cyber-physical graph, an optimal pathway for the tokenized PDU to travel, wherein the optimal pathway is selected from one or more computed policy-compliant pathways based on hardware, software, and user access;

when an optimal pathway is identified, transmitting the tokenized PDU along the optimal pathway; and when a rejection is received, rejecting further transmission of the tokenized PDU.

15. Non-transitory, computer-readable storage media having computer-executable instructions embodied thereon that, when executed by one or more processors of a computing system employing a ledge for movement and manipulation of secure data, cause the computing system to:

collect computing system metadata comprising information about hardware and software on the computing system;

identify a protocol data unit (PDU) on the network;

amend the PDU to allow enforcement of where computation or persistence of the PDU occurs in the network;

tokenize the PDU;

extract PDU metadata from the PDU, the PDU comprising a source and a destination;

send the PDU metadata to a ledger comprising persistent transactional metadata;

retrieve a regulatory guideline from an authority database pertaining to the PDU based on the PDU metadata;

extract a rule from the regulatory guideline applicable to the PDU based on the PDU metadata;

retrieve administrative metadata from the source of the PDU, the administrative data comprising an access log;

update a cyber-physical graph with the PDU metadata, the administrative metadata, the computing system metadata, and the extracted rule, wherein the cyber-physical graph represents relations between data and rules stored in the authority database;

identify, based on the cyber-physical graph, an optimal pathway for the tokenized PDU to travel, wherein the optimal pathway is selected from one or more computed policy-compliant pathways based on hardware, software, and user access;

when an optimal pathway is identified, transmitting the tokenized PDU along the optimal pathway; and when a rejection is received, rejecting further transmission of the tokenized PDU.

16. The non-transitory, computer-readable storage media of claim 15, wherein the authority database is stored and accessed over a network of computing systems, rather than a singular computing system.

17. The non-transitory, computer-readable storage media of claim 15, wherein the computing system is a networked group of computing devices, that may operate different parts of the system in tandem or discretely, to achieve the function of the whole system together over a network.

18. The non-transitory, computer-readable storage media of claim 15, wherein the PDU metadata, the administrative metadata, the computing system metadata, and the extracted rule are maintained in a cache, and wherein the cache is maintained by a database, virtual memory caching system or operating system, content delivery network, or networked memory, rather than the computing system's memory.

19. The non-transitory, computer-readable storage media of claim 15, wherein the optimal pathway is based at least on human and legal considerations.

* * * * *